(12) United States Patent
Kim et al.

(10) Patent No.: US 11,284,020 B2
(45) Date of Patent: Mar. 22, 2022

(54) APPARATUS AND METHOD FOR DISPLAYING GRAPHIC ELEMENTS ACCORDING TO OBJECT

(71) Applicant: Samsung Electronics Co., Ltd., Suwon-si (KR)

(72) Inventors: Kyunghwa Kim, Suwon-si (KR); Saebyuk Sheen, Suwon-si (KR); Chunhyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/986,518

(22) Filed: Aug. 6, 2020

(65) Prior Publication Data

US 2021/0044762 A1    Feb. 11, 2021

(30) Foreign Application Priority Data

Aug. 6, 2019  (KR) .................. 10-2019-0095767

(51) Int. Cl.
*H04N 5/272*     (2006.01)
*H04N 5/232*     (2006.01)
(Continued)

(52) U.S. Cl.
CPC ............ *H04N 5/272* (2013.01); *G06T 11/60* (2013.01); *H04N 5/23219* (2013.01); *H04N 5/232935* (2018.08); *H04N 5/2621* (2013.01)

(58) Field of Classification Search
CPC ............ H04N 5/272; H04N 5/232935; H04N 5/23219; H04N 5/2621; H04N 5/232939;
(Continued)

(56) References Cited

U.S. PATENT DOCUMENTS

2009/0312065 A1   12/2009  Wang et al.
2011/0304607 A1*  12/2011  Ito .......................... G06T 7/251
                                                          345/419
(Continued)

FOREIGN PATENT DOCUMENTS

EP    2 394 714 A1    12/2011
JP    H10-276397 A    10/1998
(Continued)

OTHER PUBLICATIONS

International Search Report dated Nov. 11, 2020, issued in International Patent Application No. PCT/KR2020/010445.
(Continued)

*Primary Examiner* — Yogesh K Aggarwal
(74) *Attorney, Agent, or Firm* — Jefferson IP Law, LLP

(57) ABSTRACT

An electronic device and a method of operating the same are provided. The electronic device includes a camera module, a display, a memory, and a processor configured to be operatively connected to the camera module, the display, and the memory, wherein the processor is further configured to display a preview image obtained from the camera module on the display, to recognize an object from the preview image, to detect a drawing input based on the object, to generate a graphic element by the detected drawing input, and to display the graphic element to correspond to the object by tracking the object. In addition, various embodiments are possible.

18 Claims, 38 Drawing Sheets

(51) Int. Cl.
*G06T 11/60* (2006.01)
*H04N 5/262* (2006.01)

(58) Field of Classification Search
CPC ........... H04N 5/23229; H04N 5/23245; H04N 5/23218; G06T 11/60; G06T 7/20; G06F 3/04845; G06F 3/0304; G06F 3/04842; G06F 3/04883; G06F 3/0488; G06K 9/00261; G06K 9/2081; G06K 9/22; G06K 9/00255; G06K 9/00624
See application file for complete search history.

(56) References Cited

U.S. PATENT DOCUMENTS

| | | |
|---|---|---|
| 2017/0030716 A1* | 2/2017 | Ali .................... G06K 9/00845 |
| 2018/0182149 A1 | 6/2018 | Chong et al. |
| 2018/0267993 A1 | 9/2018 | Lee et al. |
| 2020/0177823 A1 | 6/2020 | Zhu et al. |
| 2021/0034872 A1 | 2/2021 | Choi et al. |

FOREIGN PATENT DOCUMENTS

| | | |
|---|---|---|
| KR | 10-2014-0066557 A | 6/2014 |
| KR | 10-2016-0012362 A | 2/2016 |
| KR | 10-2017-0041098 A | 4/2017 |
| KR | 10-2018-0082825 A | 7/2018 |
| KR | 10-2018-0108541 A | 10/2018 |
| KR | 10-1944112 B1 | 4/2019 |
| KR | 10-2021-0014892 A | 2/2021 |
| WO | 2019/024750 A1 | 2/2019 |

OTHER PUBLICATIONS

Extended European Search Report dated Jan. 15, 2021, issued in European Patent Application No. 20189899.6.

* cited by examiner (630)

(930)

(950)

[970]

[1110]

(1130)

(1230)

[1410]

APPARATUS AND METHOD FOR DISPLAYING GRAPHIC ELEMENTS ACCORDING TO OBJECT

CROSS-REFERENCE TO RELATED APPLICATION(S)

This application is based on and claims priority under 35 U.S.C. § 119(a) of a Korean patent application number 10-2019-0095767, filed on Aug. 6, 2019, in the Korean Intellectual Property Office, the disclosure of which is incorporated by reference herein in its entirety.

BACKGROUND

1. Field

The disclosure relates to a method and apparatus for displaying a graphic element corresponding to an object.

2. Description of the Related Art

With the development of digital technology, various types of electronic devices such as mobile communication terminals, personal digital assistants (PDAs), electronic notebooks, smart phones, tablet personal computers (PCs), wearable devices, etc., are widely used. In order to support and increase functions of the electronic devices, hardware parts and/or software parts of the electronic devices are continuously being improved.

For example, the electronic device improves camera performance (e.g., pixel, wide-angle, telephoto, and optical zoom) in a hardware manner according to user's needs, improves image correction (improvement) technique in a software manner, or diversifies photographing technique (e.g., panorama or 360-degree shooting). For example, the electronic device provides a function for a user to directly decorate and correct a subject (e.g., a person) photographed through a camera.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for recognizing an object from a preview image to add a graphic element by drawing to the object, and tracking the object in real time from the preview image to variably display the graphic element corresponding to the object.

Additional aspects will be set forth in part in the description which follows and, in part, will be apparent from the description, or may be learned by practice of the presented embodiments.

In accordance with an aspect of the disclosure, an electronic device is provided. The electronic device includes a camera module, a display, a memory, and a processor configured to be operatively connected to the camera module, the display, and the memory, wherein the processor may be configured to display a preview image obtained from the camera module on the display, recognize an object from the preview image, detect a drawing input based on the object, generate a graphic element based on the detected drawing input, and display the graphic element to correspond to the object by tracking the object.

In accordance with another aspect of the disclosure, a method of operating an electronic device is provided. The method includes displaying a preview image obtained from a camera module of the electronic device on a display of the electronic device, recognizing an object from the preview image, detecting a drawing input based on the object, generating a graphic element by the detected drawing input, and displaying the graphic element to correspond to the object by tracking the object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
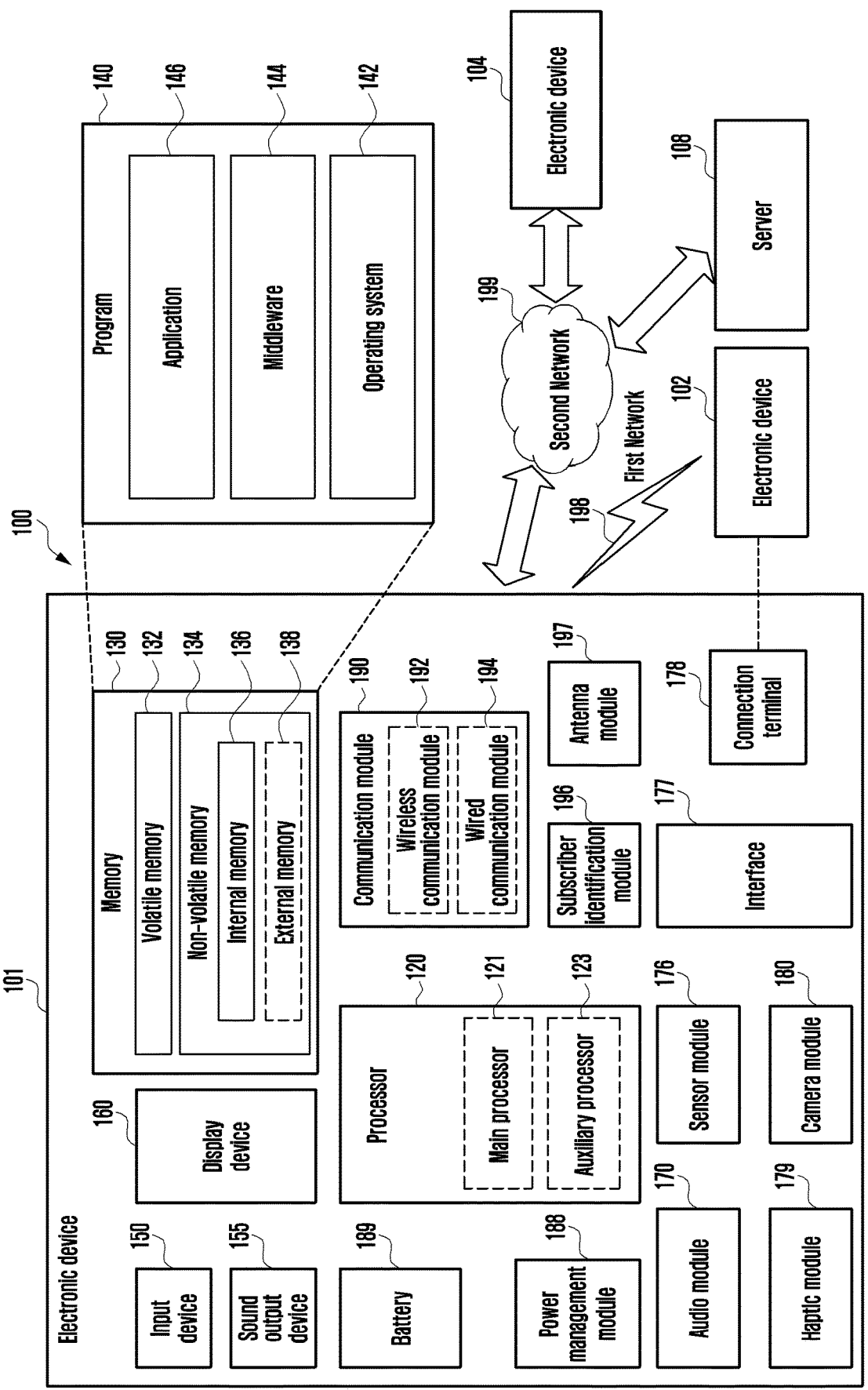
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
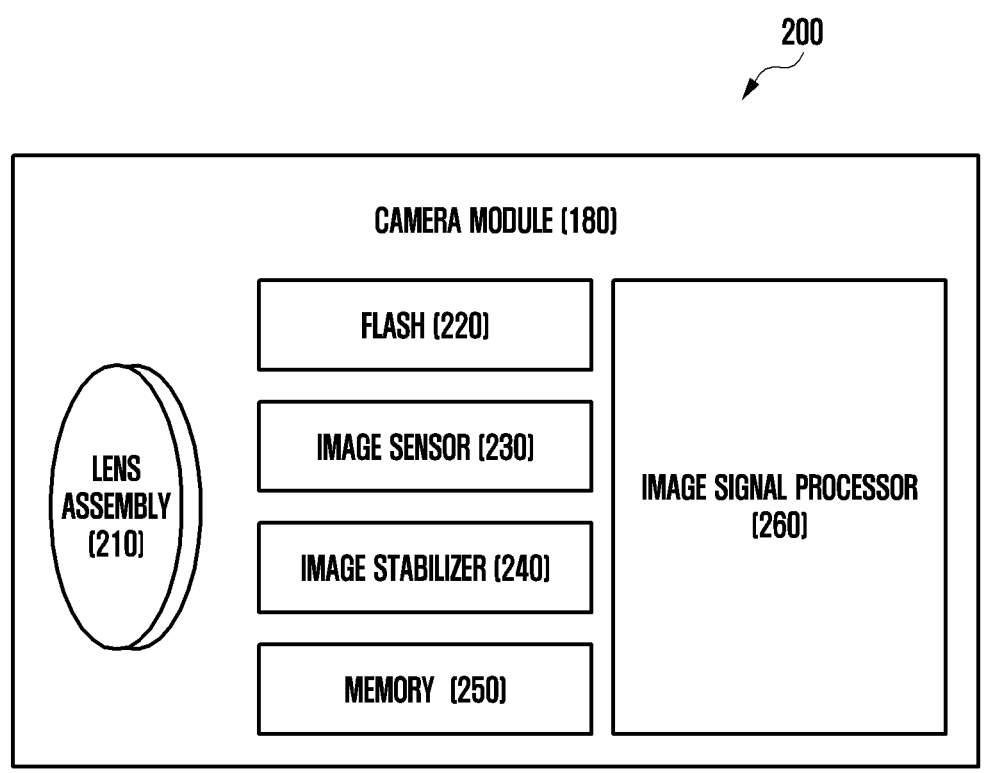
FIG. 2 is a block diagram illustrating a camera module according to an embodiment of the disclosure.

FIG. 2 is a block diagram illustrating a camera module according to an embodiment of the disclosure.

Referring to FIG. 2, in a diagram 200, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
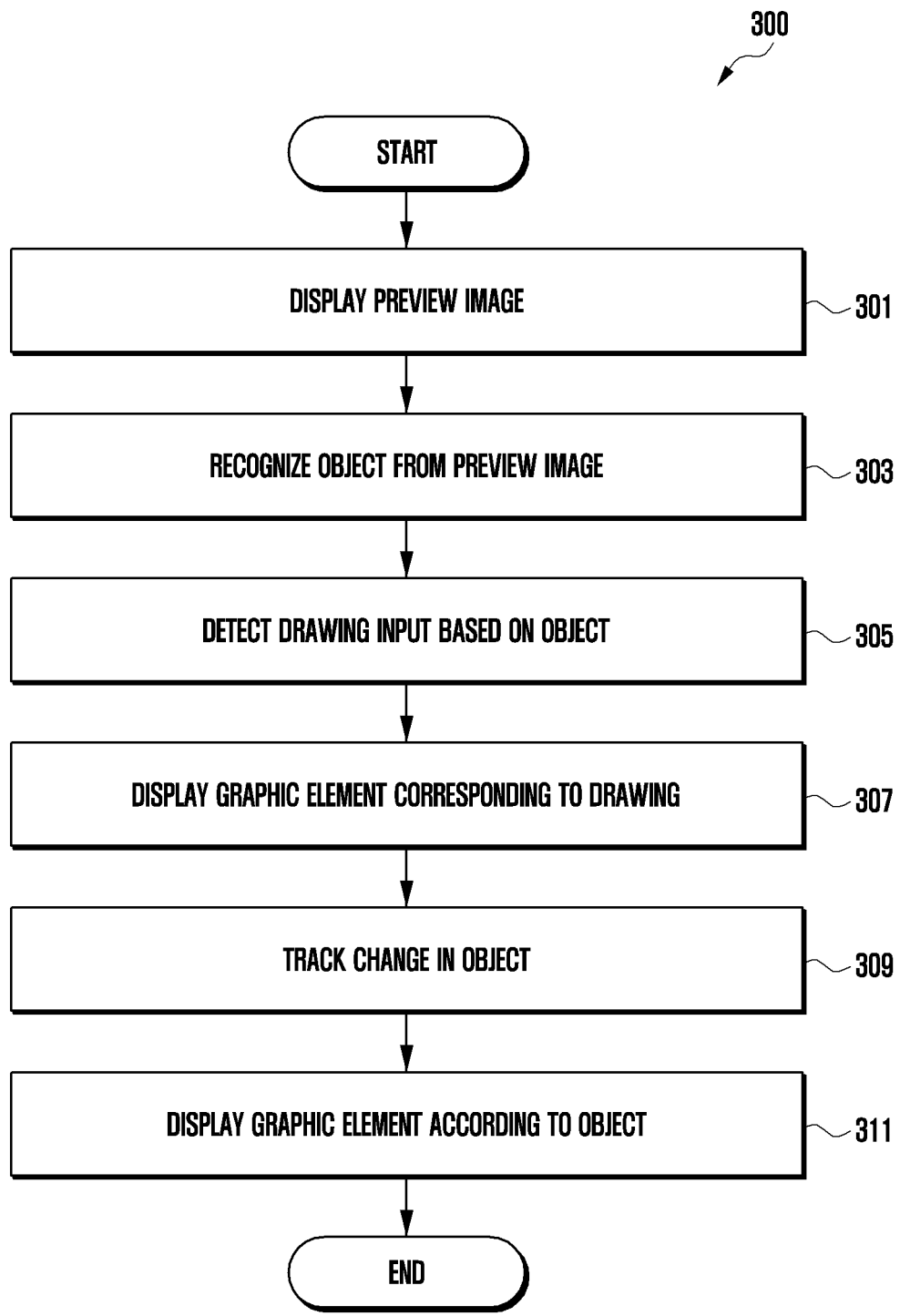
FIG. 3 is a flowchart illustrating a method of operating an electronic device according to an embodiment of the disclosure.

FIG. 3 is a flowchart illustrating a method of operating an electronic device according to an embodiment of the disclosure.

Referring to FIG. 3, in a method 300, in operation 301, a processor (e.g., the processor 120 of FIG. 1) of an electronic device (e.g., the electronic device 101 of FIG. 1) may display a preview image. The processor 120 may execute a camera application installed in the electronic device 101 according to a user's request, and may acquire a preview image from a camera module (e.g., the camera module 180 of FIG. 1) by the executed camera application. The processor 120 may execute the camera application by receiving an input for selecting a camera image (e.g., an icon) displayed on a home screen of the electronic device 101 from the user, or an input for selecting a camera application from a recent execution list. The preview image may refer to an image (or video) acquired in real time from the camera module 180. The processor 120 may display the preview image on a display (e.g., the display device 160 of FIG. 1). Hereinafter, the preview image obtained in real time will be described as an example, but it may be applicable to images or videos (or moving image) stored in a photo album.

According to various embodiments, at least one camera module 180 may be installed on front and rear surfaces of the electronic device 101, respectively. The processor 120 may drive (or activate) either a front camera or a rear camera based on a history of using the camera module 180 previously. For example, if a user stops (or terminates) the camera application immediately after using the front camera, the processor 120 may drive the front camera according to a request to execute the camera application. Alternatively, if a user stops the camera application immediately after using the rear camera, the processor 120 may drive the rear camera according to a request to execute the camera application. Alternatively, the processor 120 may drive either the front camera or the rear camera according to the setting of the electronic device 101 or the user's setting, regardless of the camera usage history. The processor 120 may provide a user interface differently according to whether the front camera or the rear camera is driven. Alternatively, the processor 120 may provide the same user interface regardless of driving the front camera or driving the rear camera.

In operation 303, the processor 120 may recognize (or identify) an object from the preview image. The processor 120 may recognize the object when a user input for executing (or calling) a doodle function is detected while the preview image is displayed. The user input may include at least one of a designated button (e.g., a doodle function button) touch, a designated voice input, or a designated gesture input. For example, the processor 120 may recognize the object based on a user input in which a photographing mode is a 'photo mode' and a button associated with the doodle function is selected (or touched). Alternatively, the processor 120 may change the photographing mode to a 'video mode' and may recognize the object as the doodle function button is selected. The photographing mode refers to a mode (or function) associated with camera photographing, and may include, for example, at least one of a picture (or normal or auto), video, selfie, rear selfie, live focus, slow motion, pro, or panorama.

The object may include a person (or a human) or a thing (e.g., an article or an object). For example, the processor 120 may recognize a person or a thing as an object regardless of whether the front camera or the rear camera is driven. Alternatively, the processor 120 may recognize the 'person' as an object when the front camera is driven and the 'person' or 'thing' as an object when the rear camera is driven. When the rear camera is driven, the processor 120 may recognize either a 'person' or a 'thing' as an object according to a user's selection. For example, the processor 120 may identify how many persons are recognized from the preview image for each recognized person. When a person is recognized as the object, the processor 120 may recognize each person differently according to a face recognition algorithm. The face recognition may mean that a first person and a second person are differently recognized when two persons are recognized from the preview image. The processor 120 may recognize a thing as an object when a person is not recognized from the preview image.

According to various embodiments, the processor 120 may provide (or display) a visual cue for each object. The visual cue may be displayed on each object recognized from the preview image, and may guide the application of the doodle function or the fact that drawing is possible. The visual cue may include at least one of a figure (e.g., a circle), text (e.g., a name or a contact), or an image (e.g., an image stored in a contact or photo album). The visual cue may be displayed identically or differently for each recognized object. For example, the processor 120 may display a color or shape of a figure provided as the visual cue differently for each object, or may display identification information (e.g., a text or an image) differently. The identification information may be displayed at an edge portion of the object or a specific designated position.

For example, when one person is recognized from the preview image, the processor 120 may provide a circle including the face of the recognized one person as the visual cue. The processor 120 may provide text or an image as the visual cue when information for identifying the recognized person exists. The processor 120 may provide the text or the image together with the circle including the recognized person's face. For example, when identification information is input (or registered) at least once with respect to the recognized person, the processor 120 may provide the text or the image as the visual cue. When identification information for the person is input, the processor 120 may store the identification information in a memory (e.g., the memory 130 of FIG. 1). Thereafter, when the identification information for the recognized person from the preview image is stored in the memory 130, the processor 120 may provide the identification information as the visual cue.

According to various embodiments, the processor 120 may display a drawable region after displaying the visual cue. The processor 120 may display the drawable region when the attribute of the object is a person. The drawable region may refer to a region in which a drawing input is possible based on a person's face. The drawable region may be larger than the visual cue. For example, the visual cue may be displayed along the outline of a person's face, and the drawable region may include a person's upper body. The processor 120 may gradually display the displayed visual cue to display the visual cue as the drawable region. The processor 120 may not display (e.g., remove or delete) the drawable region after a predetermined time (e.g., 3 seconds or 5 seconds) has elapsed after displaying the drawable region.

According to various embodiments, the processor 120 may determine whether to display the drawable region based on the recognized attribute of the object. When the object is a thing, the processor 120 may not display the drawable region. When the object is a thing, the processor 120 may display a visual cue according to the shape (or contour) of the thing, and may not display (e.g., remove) the visual cue after a predetermined time (e.g., 3 seconds or 5 seconds) has elapsed.

According to various embodiments, the processor 120 may perform operations after operation 303 by continuing to recognize the object from the preview image even after operation 303. When a new object is recognized while the processor 120 performs at least one of the operations after operation 303, the processor 120 may perform operations of displaying a visual cue for the newly recognized object, detecting drawing for the new object, and displaying a graphic element for the new object.

In operation 305, the processor 120 may detect a drawing input based on the recognized object. When the object is recognized, the processor 120 may provide a user interface capable of a drawing input. The drawing may refer to a user input such as drawing a picture. The drawing may mean that a user directly draws in the form of a point, line, or surface by using his or her body (e.g., finger or the like) or a pen (or an external drawing pen) included (or mounted) in the electronic device 101. The processor 120 may provide the user interface capable of a drawing input based on whether the pen is detached. The processor 120 may provide a user interface capable of changing attribute information (e.g., a form, a shape, a thickness (or size), or a color) of the pen (or drawing). The processor 120 may determine (or configure) the attribute information of the pen based on the user input, and may receive a drawing input for the object using the determined attribute information of the pen.

The processor 120 may display the drawable region when a point (or position) at which the drawing input is detected is outside the drawable region in a case in which the object is a person. The processor 120 may temporarily display the drawable region and may then remove the same, thereby guiding the user to which region the drawing input is possible. The processor 120 may recognize the object while performing operation 305 to detect the drawing input based on the newly recognized object.

According to various embodiments, the processor 120 may acquire (or calculate) coordinate information on which the drawing is detected based on the attribute of the object. For example, when the attribute of the object is a 'person', the processor 120 may acquire coordinate information on which the drawing is detected based on a feature point of the object. For example, the feature point of the object (e.g., a person) may include at least one of eyes, a nose, a mouth, ears, a forehead, cheeks, a chin, a facial contour, hair, a hairstyle, or a body (e.g., a neck, a shoulder, or an arm). The processor 120 may map the feature points of the object and the coordinate information of the drawing. Alternatively, when the attribute of the object is a 'thing', the processor 120 may acquire location information or posture information of the electronic device 101 at a time point at which the drawing is detected as a spatial coordinate value. The location information of the electronic device 101 may include at least one of latitude, longitude, or altitude. The posture information (or angle information) of the electronic device 101 may be sensing information detected by a sensor module (e.g., the sensor module 176 of FIG. 1), and may include, for example, acceleration data or gyro data.

According to various embodiments, a user may input a drawing differently for each object. For example, when the preview image includes a first person and a second person, the user may draw a crown on the first person and a ribbon on the second person. The processor 120 may recognize a difference between the first person and the second person through face recognition, and may analyze (or detect) to which person of the first person and the second person the drawing is input based on a point at which the drawing is detected.

In operation 307, the processor 120 may display a graphic element corresponding to the drawing. The processor 120 may display the graphic element corresponding to the drawing in the preview image acquired in real time from the camera module 180. The processor 120 may apply a method of displaying the graphic element differently based on the attribute of the object. For example, when the object is a person, the processor 120 may display the graphic element based on the feature point of the object. When the object is a thing, the processor 120 may display the graphic element based on a spatial coordinate value at which the drawing is detected. The processor 120 may display the graphic element in real time while the drawing input is detected. The graphic element may be at least one. The processor 120 may recognize the object even while performing operation 307.

According to various embodiments, when a drawing associated with the object is detected, the processor 120 may generate a graphic element according to the drawing. The graphic element may be generated (or added) by the detected drawing. When the graphic element is generated, the processor 120 may map (or associate) the graphic element with the object to generate relationship information between the feature point of the object and the graphic element. The relationship information may be obtained by associating the graphic element with the object based on the coordinate information on which the drawing is detected. The processor 120 may generate the relationship information by mapping coordinate information (or location) of the feature point included in the recognized object and the coordinate information on which the drawing is detected.

For example, when the detected drawing corresponds to a person's ball, the processor 120 may generate the relationship information by mapping coordinate information corresponding to the person's ball and the coordinate information of the drawing. The processor 120 may store the relationship information in a memory (e.g., the memory 130 of FIG. 1). The processor 120 may store the graphic element together with the relationship information. When stopping (or terminating) the camera application, the processor 120 may delete the relationship information or the graphic element from the memory 130. Alternatively, the processor 120 may maintain the relationship information or the graphic element without deleting it from the memory 130.

According to various embodiments, the processor 120 may store the graphic element as an image (e.g., sticker, emoticon, or emoji) in the memory 130 and may add the graphic element stored in the memory 130 to the recognized object according to a user request. For example, the processor 120 may provide a graphic list including one or more graphic elements such as a sticker, emoticon, and emoji, and may add and display the graphic element selected from the provided graphic list to the recognized object.

According to various embodiments, when the preview image includes a first person and a second person, the processor 120 may display the graphic element based on the point at which the drawing is detected. The user may identify the graphic element displayed in real time and may request a display of the drawable region corresponding to each person. For example, when the graphic element is applied to another person differently from a user's intention, the processor 120 may display the drawable region for a predetermined time according to a user's request and may remove the same.

In operation 309, the processor 120 may track a change in the object. The processor 120 may track the change in the object in the preview image acquired in real time from the camera module 180. The processor 120 may track the change in the object while detecting the drawing or displaying the graphic element. For example, when the object is a person, the processor 120 may track at least one of a presence or an absence, a size, an angle (or posture), or a location of the object in the preview image. When the object is a thing, the processor 120 may track a change in the electronic device 101. The change in the electronic device 101 may mean that at least one of location information or posture (or angle) information of the electronic device 101 is changed. The processor 120 may recognize the object even while performing operation 309.

In operation 311, the processor 120 may display the graphic element according to the object. The processor 120 may control the display of the graphic element based on the attribute of the object. For example, when the object is a person, the processor 120 may display the graphic element according to the tracked change in the object. When the object is a person, the processor 120 may control the display of the graphic element to follow the object. The processor 120 may control the display of the graphic element according to at least one of the presence or absence, size, angle (or posture), or location of the object. The processor 120 may recognize the object even while performing operation 311.

For example, when the object is identified in the preview image obtained from the camera module 180 in real time, the processor 120 may display the graphic element in association with the object, and when the object is not identified in the preview image, the processor 120 may not display the graphic element for the object. The fact that the object is not identified means that face recognition (or identification) is not performed. The processor 120 may vary and display the size, angle (or posture), or location of the graphic element in proportion to at least one of the size, angle (or posture), or location of the object in the preview image.

For example, when the size of the object is changed, the processor 120 may vary and display the size of the graphic element in proportion to the size of the object. When the angle of the object is changed, the processor 120 may vary and display the angle of the graphic element in proportion to the angle of the object. When the size and angle of the object are changed, the processor 120 may vary and display the size and angle of the graphic element in proportion to the size and angle of the object. When the location of the object is changed, the processor 120 may vary and display the size of the graphic element in proportion to the location of the object. When the size and location of the object is changed, the processor 120 may vary and display the size and location of the graphic element in proportion to the size and location of the object. When the angle and location of the object is changed, the processor 120 may vary and display the angle and location of the graphic element in proportion to the angle and location of the object.

Alternatively, when the preview image includes the first person and the second person, the processor 120 may display a first graphic element by drawing for the first person, and may display a second graphic element by drawing for the second person. When the first person does not exist or is not recognized in the preview image acquired in real time, the processor 120 may remove the first graphic element and may display the second graphic element for the second person.

Subsequently, when the first person and the second person can be identified from the preview image, the processor 120 may display the first graphic element for the first person and may display the second graphic element for the second person. Alternatively, when the first person is located in the center and moves to the left in the preview image, the processor 120 may display the first graphic element for the first person in the center according to the object and may then move to the left.

According to various embodiments, when the object is a thing, the processor 120 may display the graphic element according to a change in the electronic device 101. When the object is a thing, the processor 120 may control a display of the graphic element based on a spatial coordinate value of the graphic element generated by the drawing. For example, the spatial coordinate value of the graphic element corresponds to an absolute coordinate value, and may include location information or posture information of the electronic device 101. The processor 120 may control at least one of a size (or a thickness), a location, or an angle of displaying the graphic element according to a change (e.g., a longitude, a latitude, an altitude, or an angle) in the electronic device 101. The graphic element for a thing object may not correspond to an object (e.g., a thing) unlike the graphic element for a person object.

According to various embodiments, while performing operations 301 to 311, the processor 120 may take a video (i.e., a moving image) according to a user's request. For example, the processor 120 may record an image in which drawing is performed by a user while the preview image is displayed and in which a graphic element corresponding to the drawing moves along the object, or an image in which a graphic element is changed according to a change in the electronic device 101. The processor 120 may take a video including at least one of a pre-drawing image, a drawing image, or a post-drawing image. Alternatively, the processor 120 may record a pre-drawing image, and may then stop the recording while the drawing is performed. Next, after the drawing is completed, the processor 120 may record an image in which a graphic element corresponding to the drawing moves along the object or an image in which a graphic element is changed according to a change in the electronic device 101. The processor 120 may take a video including a pre-drawing image and a post-drawing image.

FIGS. 4A to 4G are diagrams illustrating examples of adding a graphic element to an object identified from a preview image in an electronic device according to various embodiments of the disclosure.

Figure 4A:
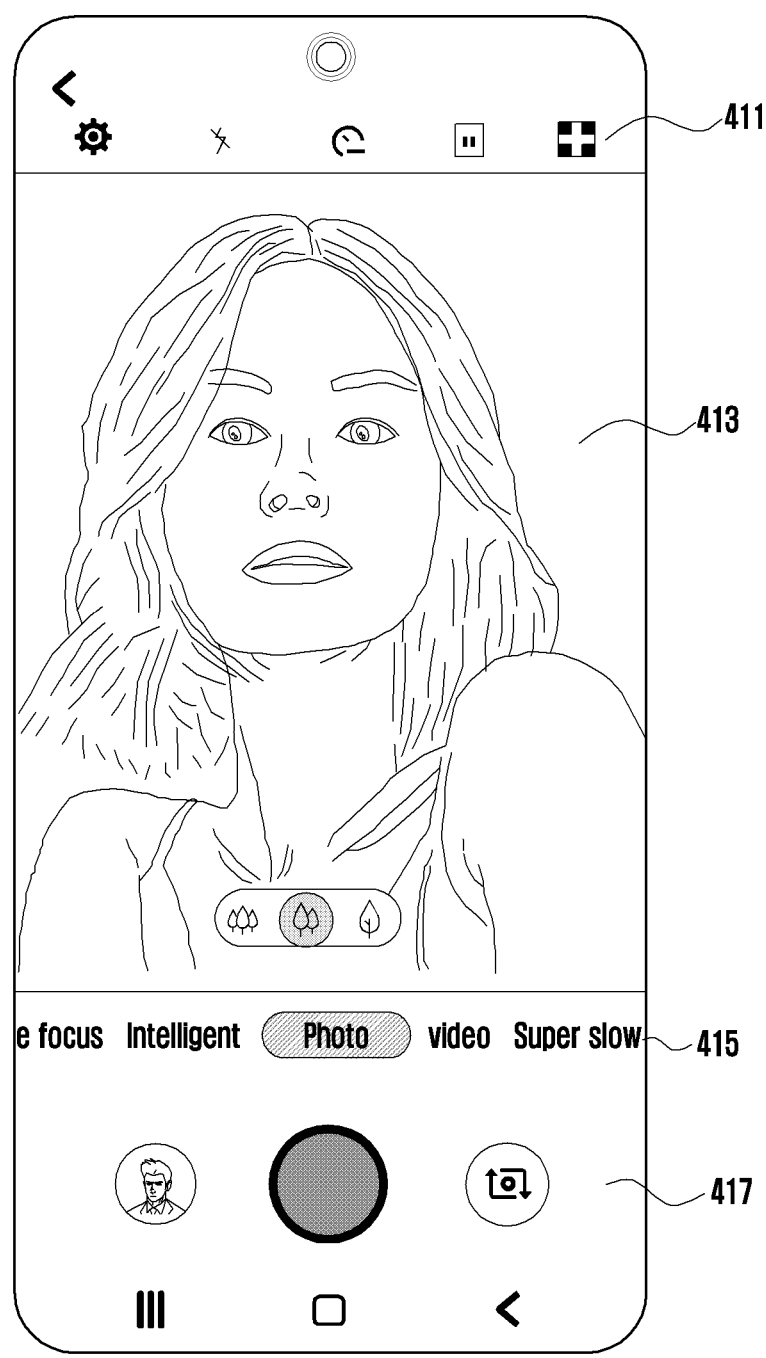
FIGS. 4A, 4B, 4C, 4D, 4E, 4F and 4G are diagrams illustrating examples of adding a graphic element to an object identified from a preview image in an electronic device according to various embodiments of the disclosure.

FIG. 4A is a diagram illustrating an example of displaying a preview image in an electronic device according to an embodiment of the disclosure.

Referring to FIG. 4A, a processor (e.g., the processor 120 of FIG. 1) of an electronic device (e.g., the electronic device 101) may display a first user interface 410 including a preview image 413 on a display (e.g., the display device 160 of FIG. 1). The first user interface 410 may include a doodle function button 411, a preview image 413, photographing mode information 415, or photographing control information 417. The doodle function button 411 may execute (or call) a function for adding a graphic element for each object. The preview image 413 may be obtained from a camera module (e.g., the camera module 180 of FIG. 1) by a camera application executed according to a user's request. The processor 120 may recognize an object from the preview image 413 when a user input touching the doodle function button 411 is detected. The photographing mode information 415 refers to a mode (or function) associated with camera photographing, and may include, for example, at least one of a photo, video, selfie, rear selfie, live focus, slow motion, pro, or panorama. The photographing control information 417 may include at least one of a recent picture viewing button, a photographing button, or a camera switching button (e.g., a front camera or a rear camera).

Figure 4B:
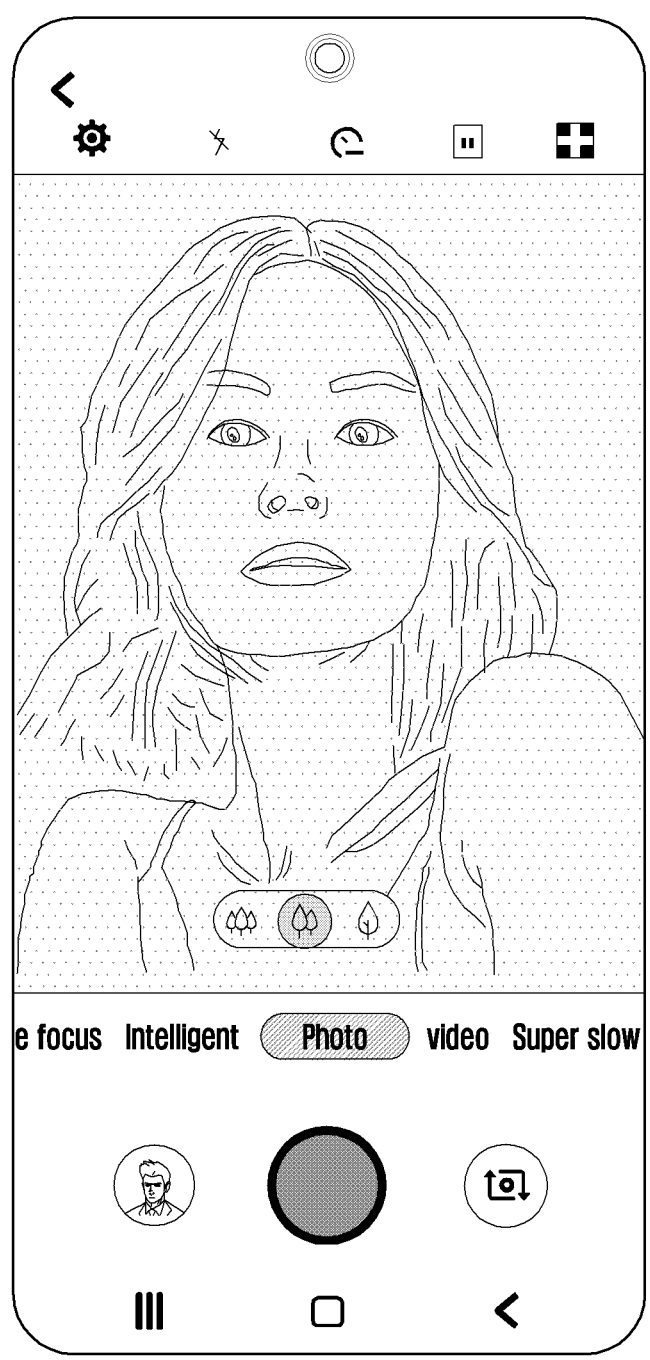

FIG. 4B is a diagram illustrating an example of recognizing an object from a preview image in an electronic device according to an embodiment of the disclosure.

Referring to FIG. 4B, when a user input for selecting the doodle function button 411 in the first user interface 410 is detected, the processor 120 may display a second user interface 420 on the display device 160. The second user interface 420 may identify an object from a preview image (e.g., the preview image 413) acquired in real time from the camera module 180. According to various embodiments, the processor 120 may blur the preview image while identifying the object from the preview image. Alternatively, the processor 120 may change the photographing mode to a 'video mode' in the first user interface 410 and may provide the second user interface 420 as the doodle function button 411 is selected.

According to various embodiments, although the user input for performing the doodle function is described as selecting the doodle function button 411 in FIG. 4B, the processor 120 may provide the second user interface 420 even when a designated voice input or designated gesture input for executing the doodle function is detected.

Figure 4C:
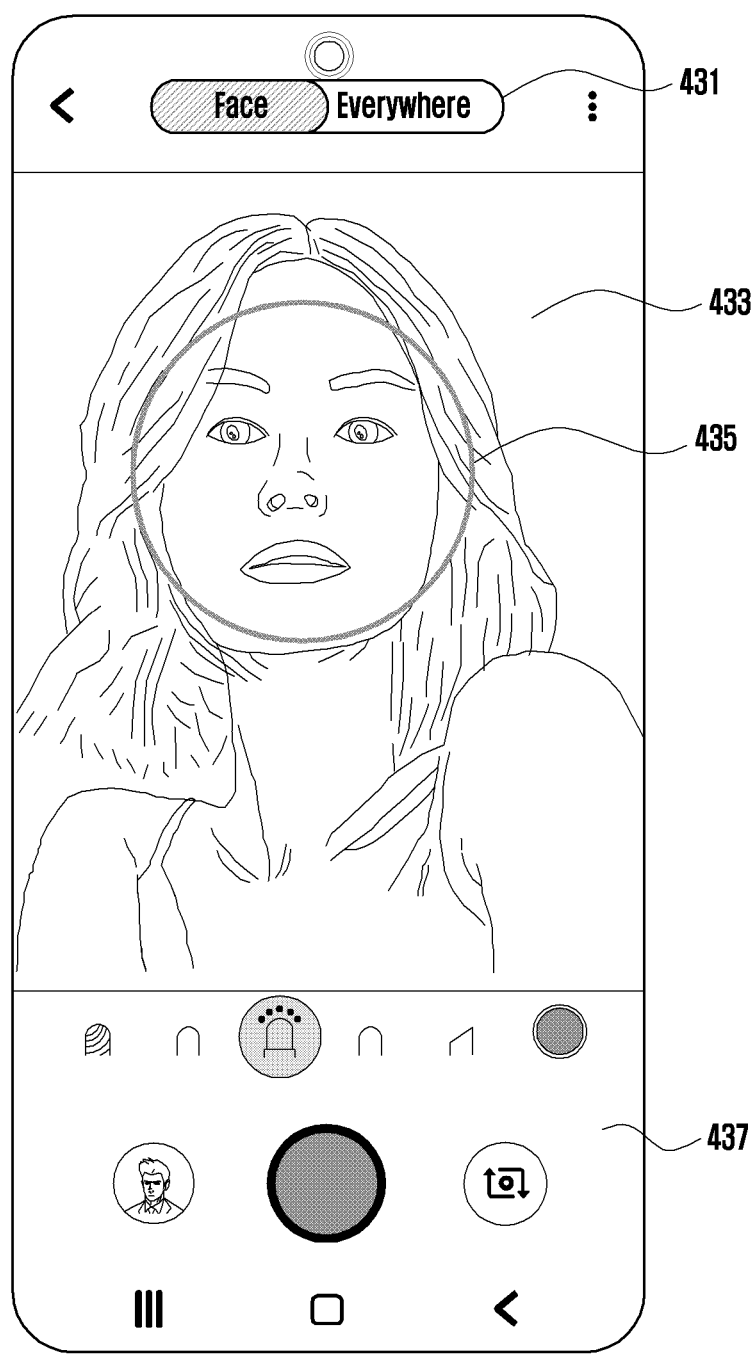

FIG. 4C is a diagram illustrating an example of displaying a visual cue to correspond to an object in an electronic device according to an embodiment of the disclosure.

Referring to FIG. 4C, when the object identification (or recognition) is completed, the processor 120 may display a third user interface 430 on the display device 160. The third user interface 430 may include an object attribute change button 431, a preview image 433, a visual cue 435, or pen (or drawing) attribute change information 437. The object attribute change button 431 is a button for changing the attribute of an object, and may be configured to one (a toggle method) of a person (e.g., a face) or a thing (e.g., everywhere). When the object attribute change button 431 is configured (or selected) to a person (e.g., a face), the processor 120 may recognize a person from the preview image 433. When the object attribute change button 431 is configured to a thing (e.g., everywhere), the processor 120 may recognize the object from the preview image 433. Alternatively, when the object attribute change button 431 is configured to a thing, the processor 120 may recognize all persons or things from the preview image 433.

The preview image 433 may be acquired in real time from the camera module 180. The visual cue 435 may be displayed on an object (e.g., a person) recognized from the preview image 433, respectively. The visual cue may include at least one of a figure (e.g., a circle), text (e.g., a name or a contact), or an image (e.g., an image stored in a contact or photo album). The processor 120 may display the visual cue 435 for a predetermined time, and may remove the visual cue 435 after a predetermined time. The pen attribute change information 437 can change the attributes of the pen, and may include, for example, information for changing the form of the pen (or drawing), the shape of the pen (or drawing), the thickness of the pen (or drawing), or the color of the pen (or drawing).

According to various embodiments, the processor 120 may configure the object attribute change button 431 as a person as a default value. Alternatively, the processor 120 may change a default value configured in the object attribute change button 431 based on a driven camera. The processor 120 may configure the object attribute change button 431 as a 'person' when the front camera is driven, and may configure the object attribute change button 431 as a 'thing' when the rear camera is driven. Alternatively, the processor 120 may determine whether to provide the object attribute change button 431 based on the driven camera. For example, the processor 120 may provide the object attribute change button 431 when the rear camera is driven, and may not provide the object attribute change button 431 when the front camera is driven.

Figure 4D:
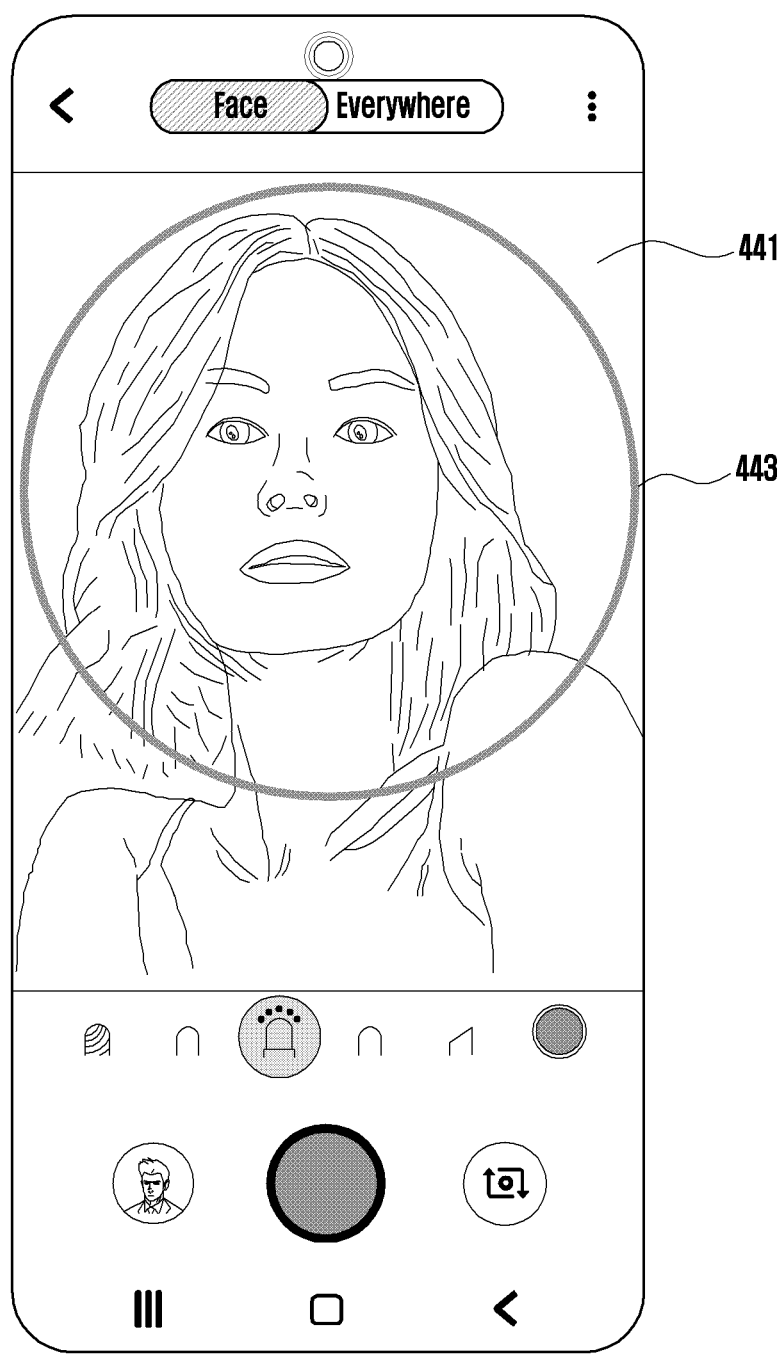

FIG. 4D is a diagram illustrating an example of displaying a drawable region to correspond to an object in an electronic device according to an embodiment of the disclosure.

Referring to FIG. 4D, after displaying the visual cue 435, the processor 120 may display a fourth user interface 440 on the display device 160. The fourth user interface 440 may include a preview image 441 or a drawable region 443. The preview image 441 may be acquired in real time from the camera module 180. The processor 120 may display the drawable region 443 when the attribute of an object recognized from the preview image 441 is a person. The drawable region 443 may refer to a region in which a drawing input is possible based on the face of the person. The drawable region 443 may be larger than the visual cue 435. For example, the visual cue 435 may be displayed along the facial contour of the person, and the drawable region 443 may include the upper body of the person. The processor 120 may gradually display the displayed visual cue 435 as the drawable region 443. The processor 120 may not display the drawable region 443 when a predetermined time (e.g., 3 seconds or 5 seconds) has elapsed after displaying the drawable region 443.

Figure 4E:
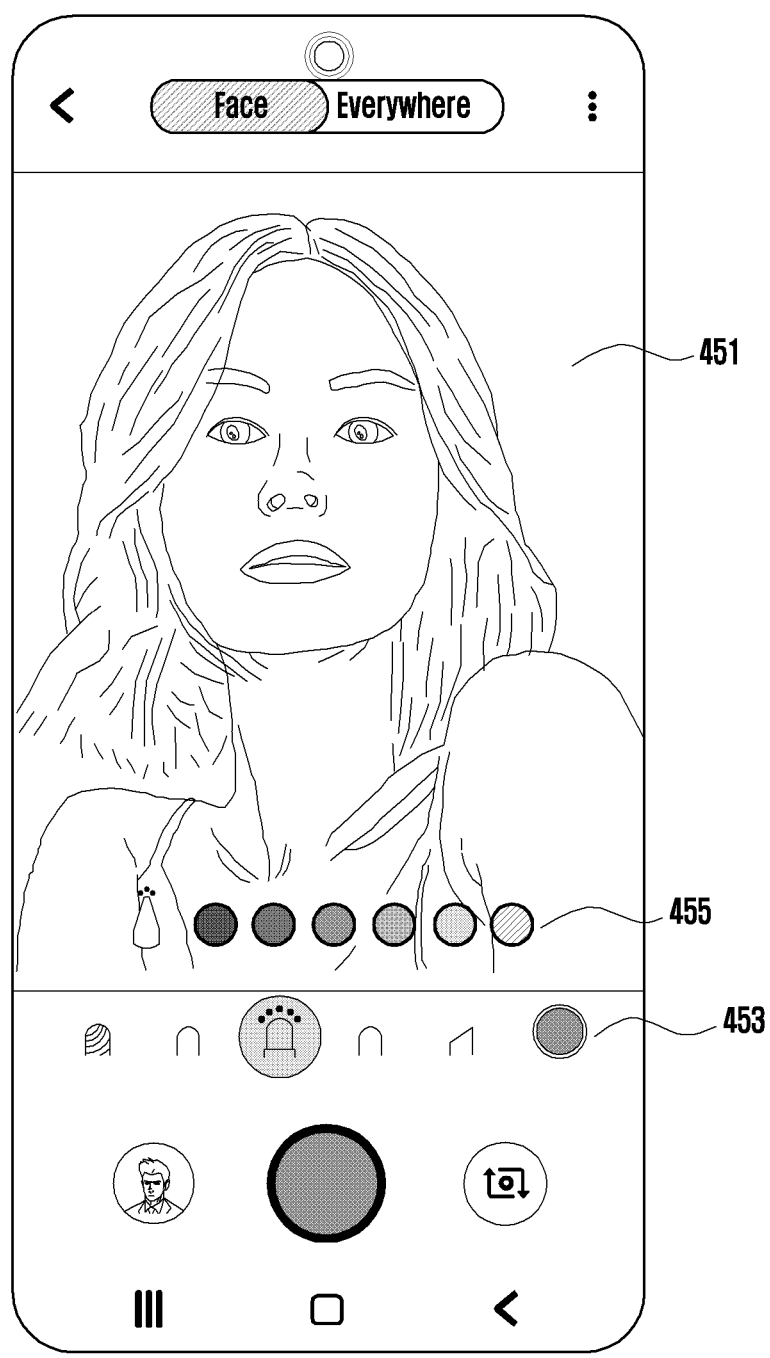

FIG. 4E is a diagram illustrating an example of changing pen attributes in an electronic device according to an embodiment of the disclosure.

Referring to FIG. 4E, when selecting the pen attribute change information 437, the processor 120 may display a fifth user interface 450 on the display device 160. The fifth user interface 450 may include a preview image 451 or pen attribute change information 453. The preview image 451 may be acquired in real time from the camera module 180. The processor 120 may provide color information 455 (e.g., black, pink, red, etc.) of the pen (or drawing) when a button for changing the color of the pen is selected from the pen attribute change information 453. Alternatively, the processor 120 may provide type information (e.g., fountain pen, pencil, brush, etc.) of the pen when a button for changing the type of the pen is selected from the pen attribute change information 453. When a button for changing the shape of the pen is selected from the pen attribute change information 453, the processor 120 may provide pen shape information (e.g., solid line, dotted line, water drop, etc.). When a button for changing the thickness of the pen is selected from the pen attribute change information 453, the processor 120 may provide pen thickness information (e.g., first thickness, second thickness, solid line, dotted line, water drop, etc.).

Figure 4F:
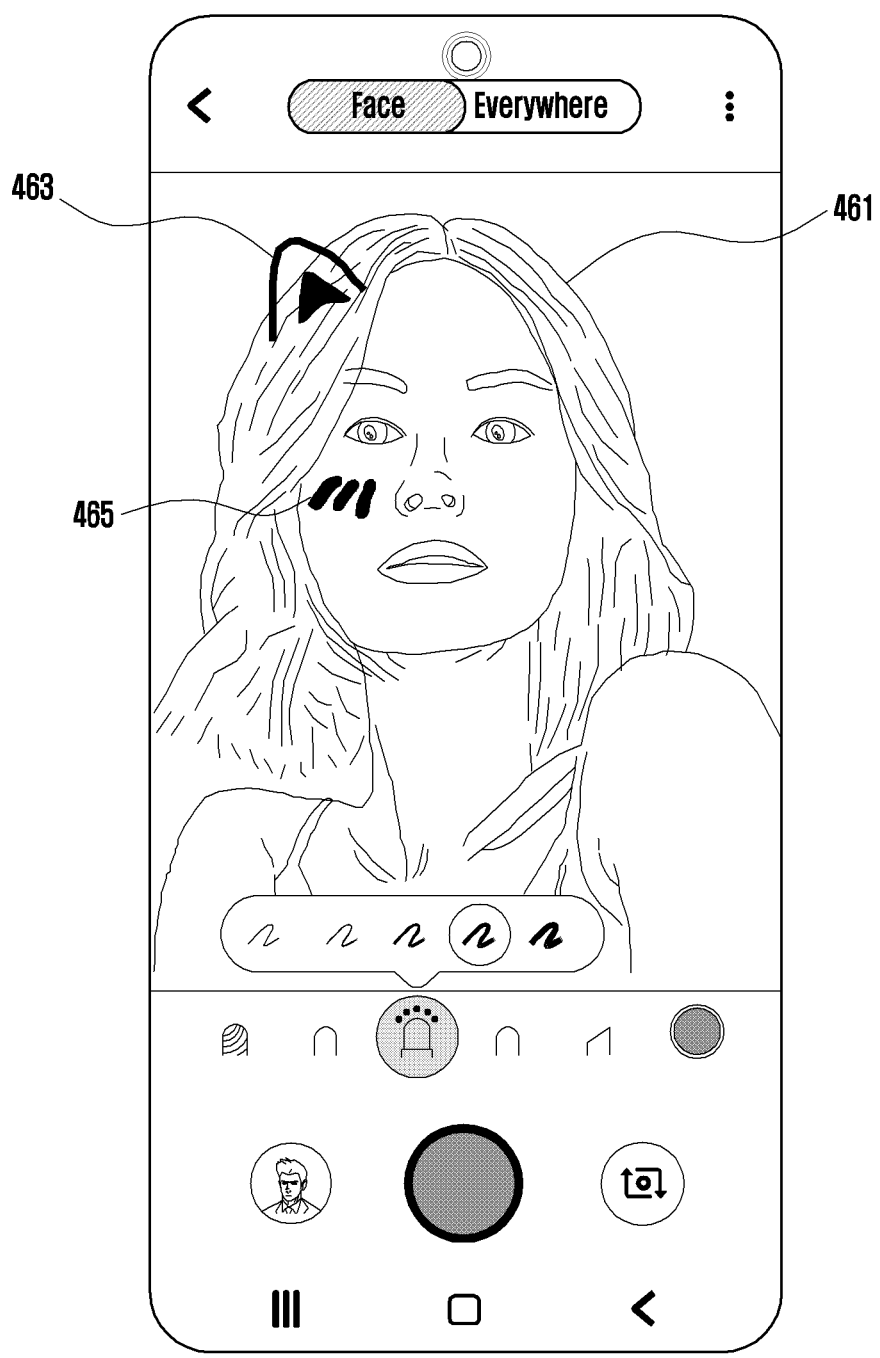

FIG. 4F is a diagram illustrating an example of detecting and displaying drawing in an electronic device according to an embodiment of the disclosure.

Referring to FIG. 4F, the processor 120 may detect a drawing input to display a sixth user interface 460 on the display device 160. The sixth user interface 460 may include an object 461, a first graphic element 463, or a second graphic element 465. The first graphic element 463 may be mapped to the left side of the head of the object 461 by a user's drawing. The second graphic element 465 may be mapped to the left cheek of the object 461 by the user's drawing. The processor 120 may generate first relationship information that associates the first graphic element 463 with the object 461 by mapping a feature point (left side of the head) of the object 461 and coordinate information of the drawing. The processor 120 may generate second relationship information that associates the second graphic element 465 with the object 461 by mapping a feature point (left cheek) of the object 461 and coordinate information of the drawing. The processor 120 may temporarily store the first graphic element 463, the second graphic element 465, the first relationship information, or the second relationship information in a memory (e.g., the memory 130 of FIG. 1).

Figure 4G:
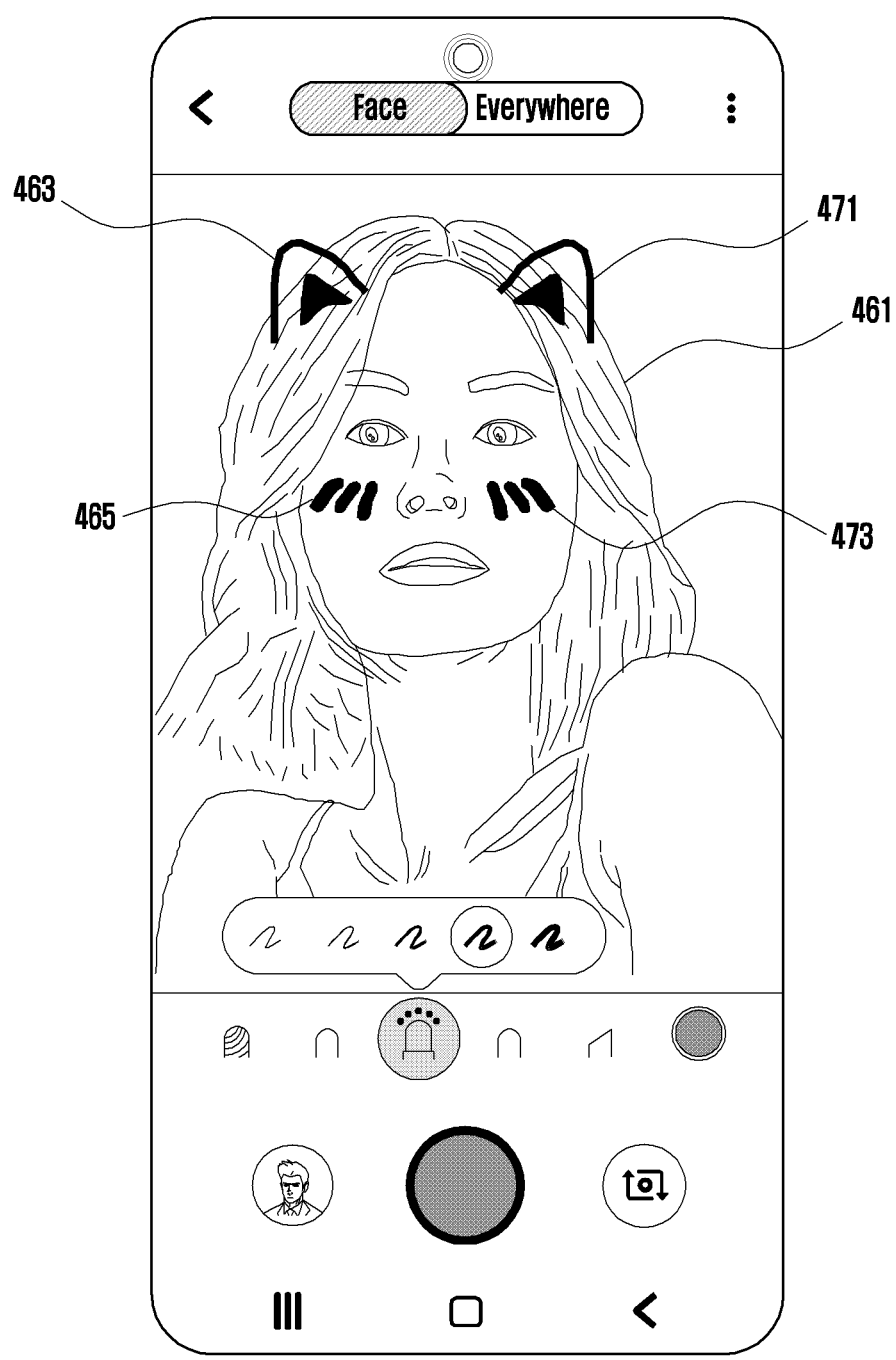

FIG. 4G is a diagram illustrating another example of detecting and displaying drawing in an electronic device according to an embodiment of the disclosure.

Referring to FIG. 4G, the processor 120 may detect a drawing input to display a seventh user interface 470 on the display device 160. The seventh user interface 470 may include an object 461, a third graphic element 471, or a fourth graphic element 473. The third graphic element 471 may be mapped to the right side of the head of the object 461 by a user's drawing. The fourth graphic element 473 may be mapped to the right cheek of the object 461 by a user's drawing. The processor 120 may generate third relationship information that associates the third graphic element 471 with the object 461 by mapping the feature point (right side of the head) of the object 461 and coordinate information of the drawing. The processor 120 may generate fourth relationship information that associates the fourth graphic element 473 with the object 461 by mapping the feature point (right cheek) of the object 461 and coordinate information of the drawing. The processor 120 may temporarily store the third graphic element 471, the fourth graphic element 473, the third relationship information, or the fourth relationship information in a memory (e.g., the memory 130 of FIG. 1).

According to various embodiments, the processor 120 may process the first graphic element 463, the second graphic element 465, the third graphic element 471, and the fourth graphic element 473 with respect to the object 461 as a single graphic element. The processor 120 may store, in the memory (e.g., the memory 130 of FIG. 1), the single graphic element (e.g., first user graphic) including the first graphic element 463, the second graphic element 465, the third graphic element 471, and the fourth graphic element 473. The processor 120 may also store display characteristics of the first user graphic. For example, the processor 120 may store display characteristics in such a manner that the first graphic element 463 and the third graphic element 471 are displayed on a person's hair and the second graphic element 465 and the fourth graphic element 473 are displayed on a person's cheek. Thereafter, the processor 120 may display the first user graphic on the recognized object in consideration of the display characteristics.

Figure 5:
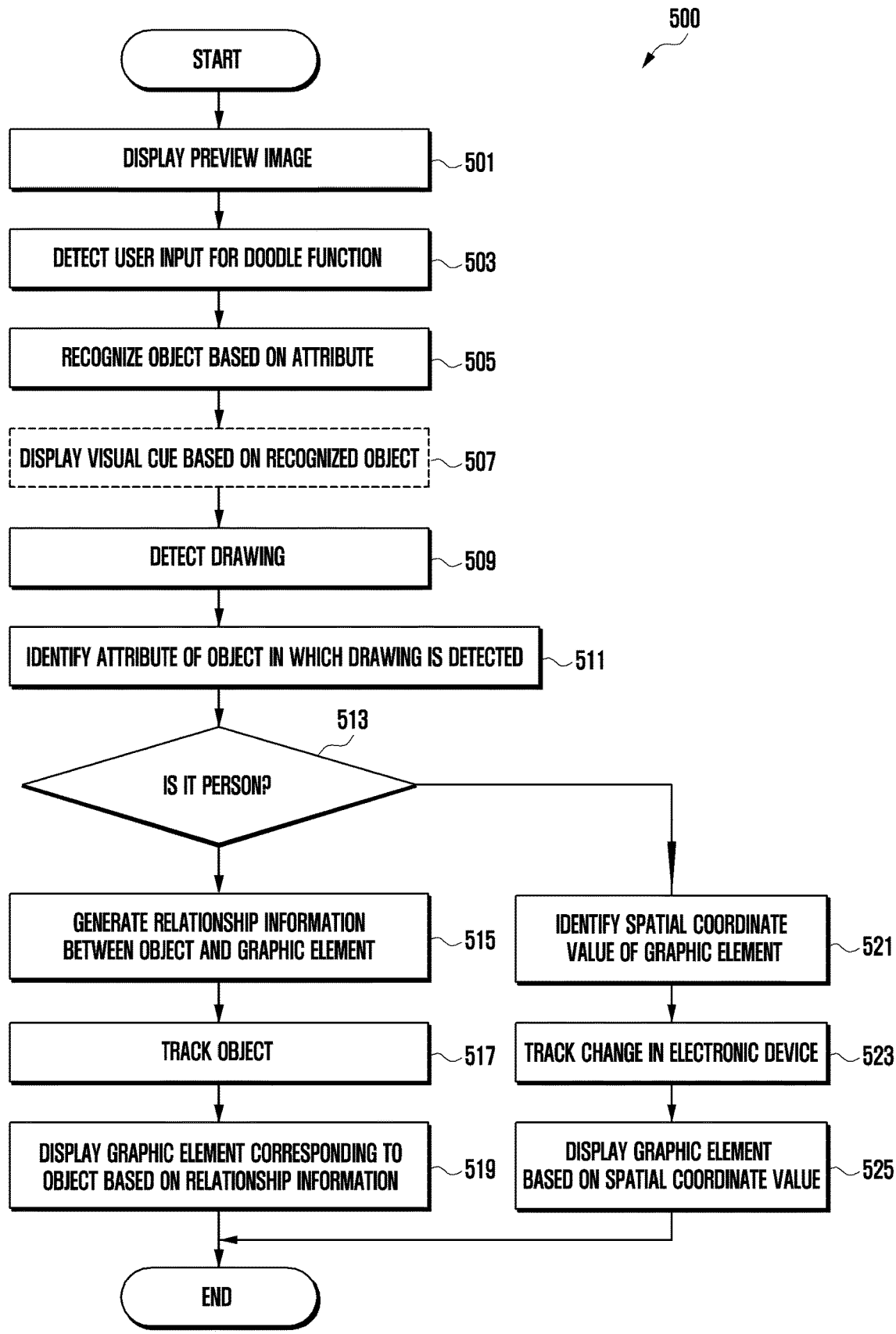
FIG. 5 is a flowchart illustrating a method of controlling a display of a graphic element for each attribute of an object in an electronic device according to an embodiment of the disclosure.

FIG. 5 is a flowchart illustrating a method of controlling a display of a graphic element for each attribute of an object in an electronic device according to an embodiment of the disclosure.

Referring to FIG. 5, in a method 500, in operation 501, a processor (e.g., the processor 120 of FIG. 1) of an electronic device (e.g., the electronic device 101 of FIG. 1) may display a preview image. The preview image may refer to an image (or video) acquired in real time from the camera module 180. The processor 120 may display the preview image on a display (e.g., the display device 160 of FIG. 1). Since operation 501 is the same or similar to operation 301 of FIG. 3, a detailed description thereof can be omitted.

In operation 503, the processor 120 may detect a user input for a doodle function. The processor 120 may detect a user input for executing (or calling) a doodle function while the preview image is displayed. The user input may include at least one of a designated button (e.g., a doodle function button) touch, a designated voice input, or a designated gesture input. For example, the processor 120 may detect the user input for the doodle function while a photographing mode is configured to be a 'photo mode' or 'video mode'.

According to various embodiments, the processor 120 may select an object attribute from a user. The object may include a person (or a human) or a thing (e.g., an article or an object). The processor 120 may configure object attributes through an object attribute change button (e.g., the object attribute change button 431 of FIG. 4C). For example, the processor 120 may select the attribute of the object as a 'person' or a 'thing' through the object attribute change button 431.

In operation 505, the processor 120 may recognize the object based on the attribute. For example, the processor 120 may recognize a person as the object when it is selected (or configured) as 'person recognition', and may recognize a thing as the object when it is selected as 'thing recognition'. When recognizing a person as the object, the processor 120 may recognize each person differently according to a face recognition algorithm. The face recognition may mean that a first person and a second person are differently recognized when two persons are recognized from the preview image.

According to various embodiments, the processor 120 may continue to recognize the object from the preview image even after operation 505, thereby performing operations subsequent to operation 505. When a new object is recognized by operation 505 while the operations subsequent to operation 505 are performed, the processor 120 may perform at least one of operations 507 to 525 with respect to the newly recognized object.

In operation 507, the processor 120 may display a visual cue based on the recognized object. The visual cue may be displayed on the object recognized from the preview image, and may guide the application of a doodle function or the fact that drawing is possible. The visual cue may include at least one of a figure (e.g., a circle, a square, a polygon, etc.), text (e.g., a name or a contact), or an image (e.g., an image stored in a contact or a photo album). The visual cue may be displayed identically or differently for each recognized object. For example, the processor 120 may display the color or shape of a figure provided as the visual cue differently for each object, or may display identification information (e.g., a text or an image) differently. The identification information may be displayed at an edge portion of the object or a specific designated position. The processor 120 may recognize the object even while performing operation 507. When a new object is recognized, the processor 120 may display a visual cue to correspond to corresponding to the new object.

The processor 120 may display the visual cue based on the edge of the object. For example, when the recognized object is a single person, the processor 120 may provide the facial contour (or edge) of the recognized single person in a circular form, as the visual cue. The processor 120 may further provide text or an image as the visual cue when there is information identifying the recognized person. Alternatively, when the recognized object is a thing (e.g., a chair, a sea, or a desk), the processor 120 may provide an edge portion of each object or a figure (e.g., a rectangle) including each object as the visual cue. According to various embodiments, the processor 120 may display the visual cue for a predetermined time, and may then remove the visual cue. Also, the processor 120 may determine whether to display a drawable region based on the attribute of the recognized object. When the object is a person, the processor 120 may display the drawable region while gradually expanding the visual cue. When the object is a thing, the processor 120 may not display the drawable region.

According to various embodiments, the processor 120 may not display the visual cue according to the configuration of the electronic device 101 or the user's configuration. Operation 507 may be omitted.

In operation 509, the processor 120 may detect a drawing. The drawing means that a user performs drawing in the form of a dot, line, or surface using the user's body (e.g., a finger, a hand, and the like) or a pen (or an external drawing pen) included (or mounted) in the electronic device 101. The processor 120 may provide a user interface capable of changing attribute information (e.g., a form, a shape, a thickness (or a size), or a color) of the pen (or drawing). The processor 120 may determine (or configure) the attribute information of the pen based on a user input, and may receive a drawing input for the object using the determined attribute information of the pen. When the object is a person, the processor 120 may display the drawable region when a point (or position) at which the drawing input is detected is outside the drawable region. The processor 120 may temporarily display the drawable region and may then remove the drawable region, thereby guiding a user to which region the drawing input is possible. The processor 120 may display a graphic element generated by the drawing on the display device 160 in real time, simultaneously, or sequentially based on the drawing detection. The processor 120 may recognize the object even while performing operation 509. The processor 120 may detect the drawing to correspond to an object newly recognized by operation 509.

In operation 511, the processor 120 may identify the attribute of the object in which the drawing has been detected. The processor 120 may identify whether the attribute of the object in which the drawing is detected is a person or a thing.

In operation 513, the processor 120 may determine whether the attribute of the object is a person. The processor 120 may perform operation 515 when the attribute of the object configured after operation 503 is a 'person', and may perform operation 521 when the attribute of the object is a 'thing'. According to various embodiments, the processor 120 may recognize all objects (e.g., persons or things) that are recognizable in operation 505 and may determine the attribute of the object at a point at which the drawing is detected.

When the attribute of the object is a 'person', in operation 515, the processor 120 may generate relationship information between the object and the graphic element. For example, when the attribute of the object is a 'person', the processor 120 may obtain coordinate information on which the drawing is detected based on the feature point of the object. For example, the feature point of the object (e.g., a person) may include at least one of the eyes, nose, mouth, ears, forehead, cheeks, chin, facial contour, hair, hairstyle, or body (e.g., a neck, a shoulder, or an arm). The processor 120 may generate relationship information between the feature point of the object and the graphic element by mapping the feature point of the object and the coordinate information of the drawing. The relationship information may be obtained by associating the graphic element with the object based on coordinate information on which the drawing is detected.

For example, when the detected drawing corresponds to person's cheeks, the processor 120 may generate the relationship information by mapping coordinate information corresponding to the person's cheeks and coordinate information of the drawing. The processor 120 may store the relationship information in a memory (e.g., the memory 130 of FIG. 1). The processor 120 may store the graphic element together with the relationship information. When stopping (or terminating) the camera application, the processor 120 may delete the relationship information or the graphic element from the memory 130. Alternatively, the processor 120 may maintain at least one of the relationship information or the graphic element without deleting them from the memory 130.

In operation 517, the processor 120 may track the object. The processor 120 may track a change in the object in the preview image obtained in real time from the camera module 180. For example, when the object is a person, the processor 120 may track the presence or absence, size, angle (or posture), or location of the object in the preview image.

In operation 519, the processor 120 may display the graphic element corresponding to the object based on the relationship information. When the object is a person, the processor 120 may control the graphic element to be displayed at a location mapped to the feature point of the object based on the relationship information. The processor 120 may control a display of the graphic element according to at least one of the presence or absence, size, angle (or posture), or location of the object. For example, when the size of the object is changed, the processor 120 may vary and display the size of the graphic element in proportion to the size of the object based on the relationship information. When the angle of the object is changed, the processor 120 may vary and display the angle of the graphic element in proportion to the angle of the object based on the relationship information. When the location of the object is changed, the processor 120 may vary and display the size of the graphic element in proportion to the location of the object based on the relationship information. Alternatively, the processor 120 may display the graphic element in association with the object, when the object is identified, and may not display the graphic element for the object when the object is not identified in the preview image. The fact that the object is not identified means that face recognition (or identification) is not performed.

When the attribute of the object is a 'thing', in operation 521, the processor 120 may identify a spatial coordinate value of the graphic element. The processor 120 may obtain the location information or posture information of the electronic device 101 at the time when the drawing is detected, as the spatial coordinate value. The location information of the electronic device 101 may include at least one of latitude, longitude, or altitude. The posture information of the electronic device 101 is sensing information detected by a sensor module (e.g., the sensor module 176 of FIG. 1), and may include, for example, acceleration data or gyro data. The processor 120 may store the spatial coordinate value of the graphic element in the memory (e.g., the memory 130 of FIG. 1). The processor 120 may store the graphic element together with the spatial coordinate value. When stopping (or terminating) the camera application, the processor 120 may delete the spatial coordinate value or the graphic element from the memory 130. Alternatively, the processor 120 may maintain at least one of the spatial coordinate value or the graphic element without deleting them from the memory 130.

In operation 523, the processor 120 may track a change in the electronic device 101. The change in the electronic device 101 may mean that at least one of the location information or posture (or angle) information of the electronic device 101 is changed. For example, when the location (e.g., latitude, longitude, and altitude) of the electronic device 101 is changed, the location or size (e.g., perspective) of the object may be different. Alternatively, when the posture information of the electronic device 101 is changed, the angle or posture at which the object is displayed on the preview image obtained from the camera module 180 may be changed.

In operation 525, the processor 120 may display the graphic element based on the spatial coordinate value. For example, the spatial coordinate value of the graphic element corresponds to an absolute coordinate value, and the processor 120 may control at least one of the size (or a thickness), a location, or an angle of displaying the graphic element according to the change in the electronic device 101. Unlike the graphic element for a person object, the graphic element for a thing object may not correspond to the object (e.g., a thing).

Figure 6A:
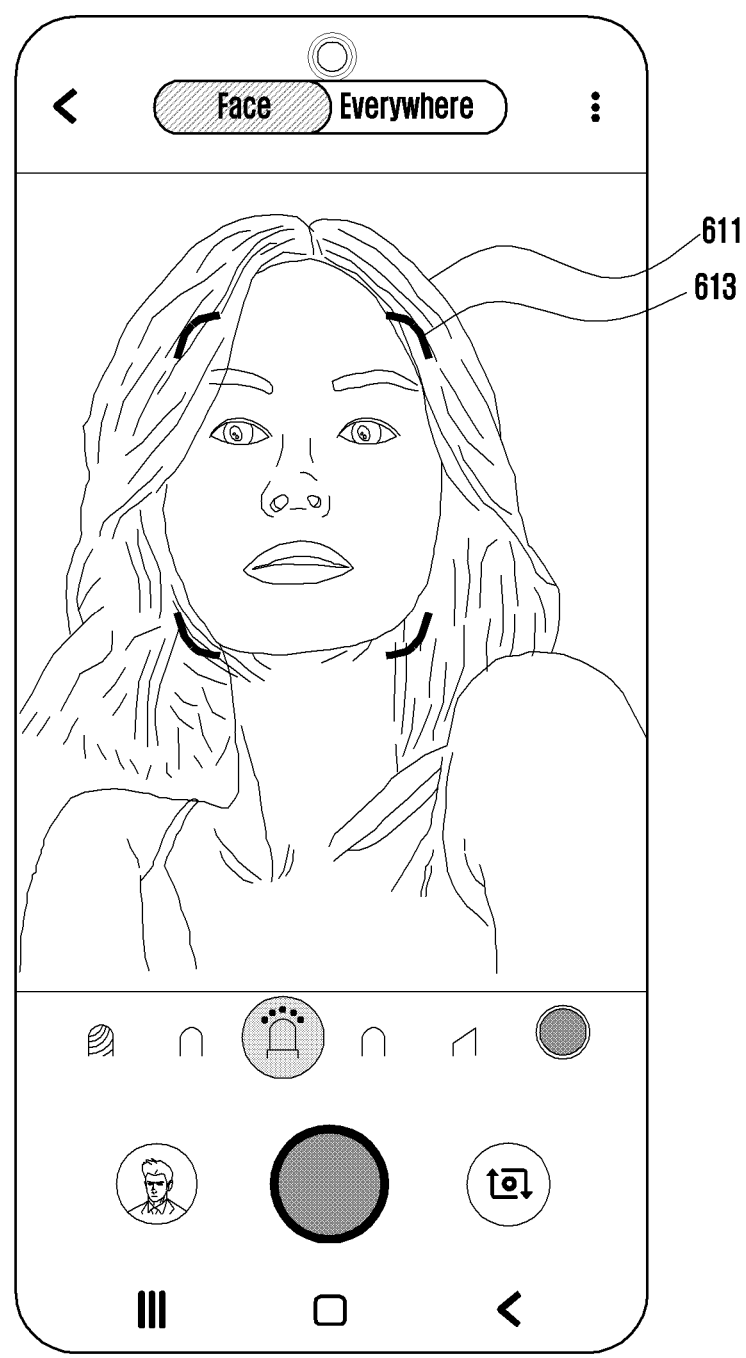
FIGS. 6A, 6B and 6C are diagrams illustrating an example of a visual cue provided to a person in an electronic device according to various embodiments of the disclosure.
Figure 6B:
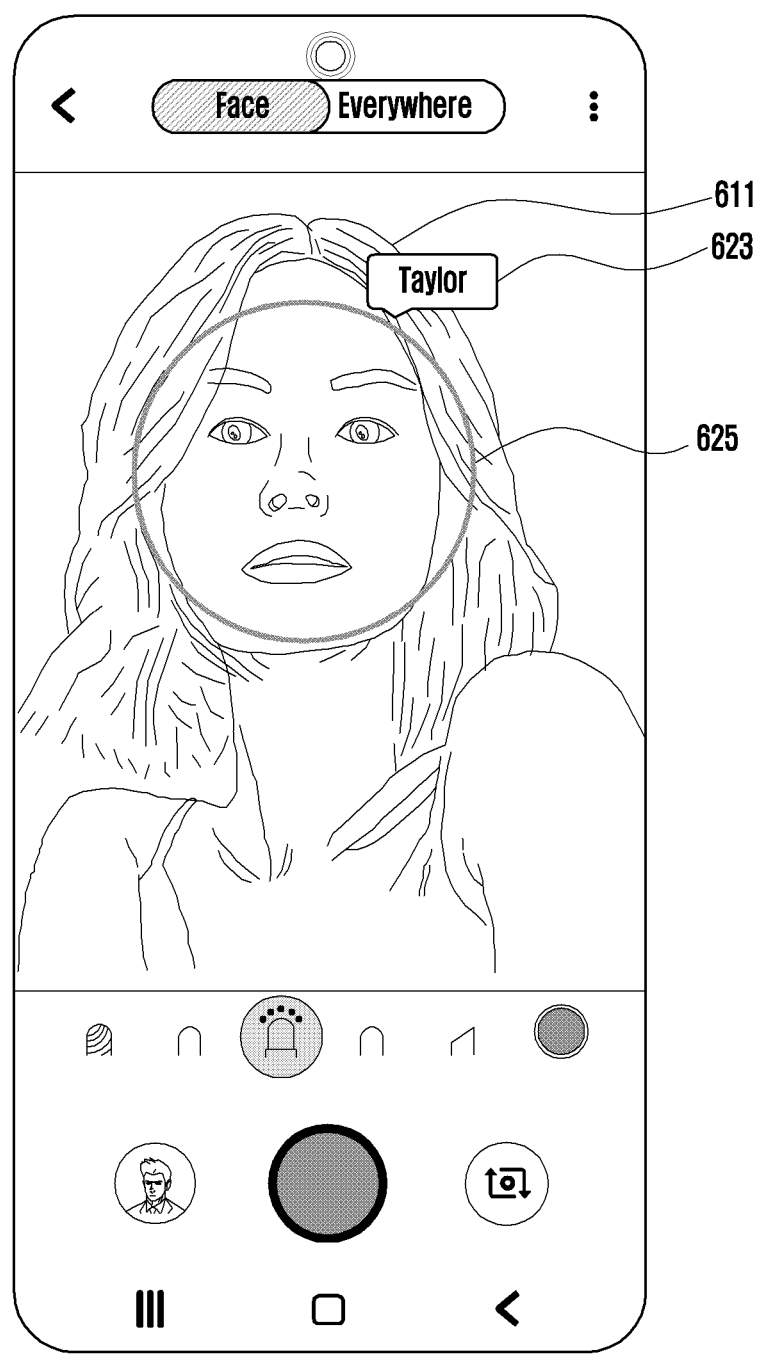
Figure 6C:
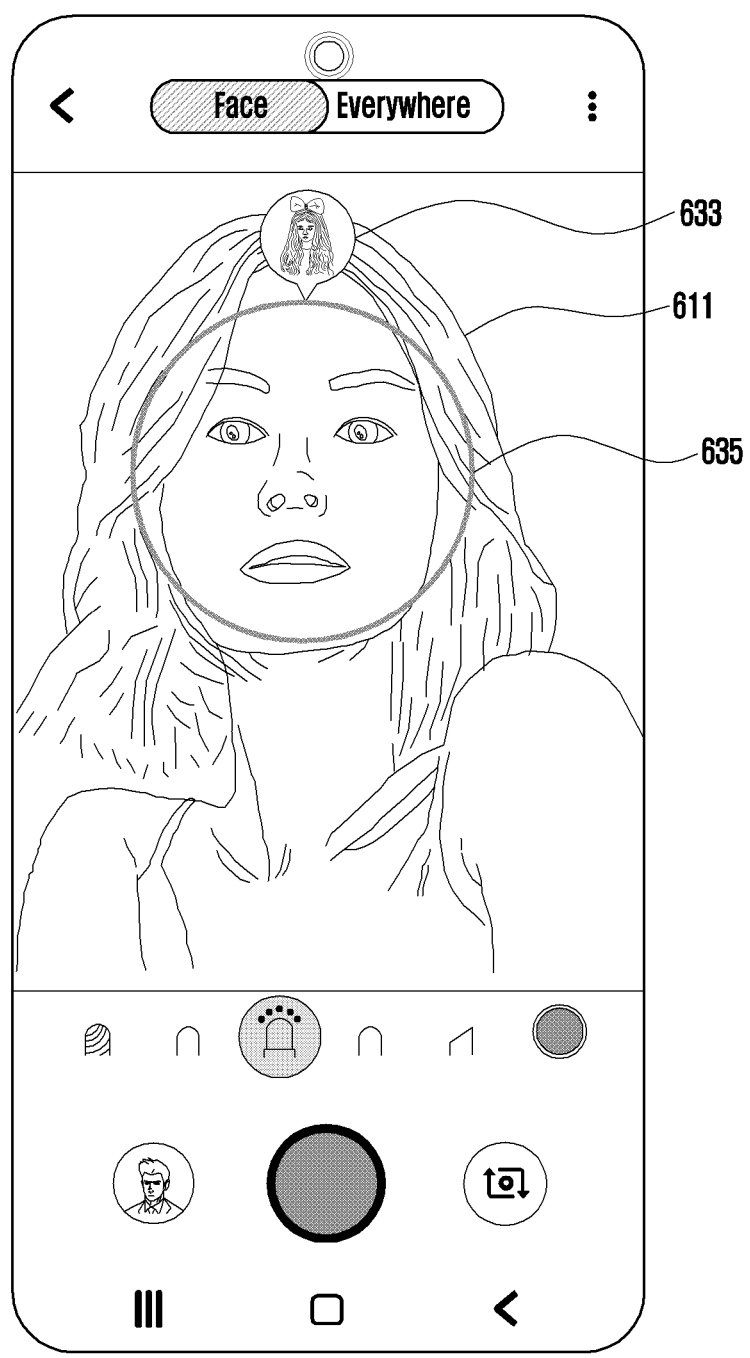

FIG. 6A is a diagram illustrating an example of a visual cue provided to a person in an electronic device according to an embodiment of the disclosure, FIG. 6B is a diagram illustrating an example of a visual cue provided to a person in an electronic device according to an embodiment of the disclosure, and FIG. 6C is a diagram illustrating an example of a visual cue provided to a person in an electronic device according to an embodiment of the disclosure.

FIG. 6A is a diagram illustrating an example of a first visual cue provided to a person in an electronic device according to an embodiment of the disclosure.

Referring to FIG. 6A, a processor (e.g., the processor 120 of FIG. 1) of an electronic device (e.g., the electronic device 101) may display a first user interface 610 including a first visual cue 613 based on an edge (or contour) of an object 611 on a display (e.g., the display device 160 of FIG. 1). The first visual cue 613 may indicate a rectangular edge (e.g., a facial contour) of the object 611.

FIG. 6B is a diagram illustrating an example of a second visual cue provided to a person in an electronic device according to an embodiment of the disclosure.

Referring to FIG. 6B, a processor (e.g., the processor 120 of FIG. 1) of an electronic device (e.g., the electronic device 101) may display a second user interface 620 including a second visual cue based on the edge (or contour) of the object 611 on the display device 160. The second visual cue may include a figure (e.g., a circular) visual cue 625 and a text (e.g., a name) visual cue 623. The figure visual cue 625 may be obtained by representing a face edge portion through face recognition as a circle. The text visual cue 623 may be provided when the recognized face has been previously configured (or registered) with Taylor (e.g., identification information) even once. When the identification information corresponding to the object is received, the processor 120 may store the received identification information in a memory (e.g., the memory 130 of FIG. 1). The processor 120 may search whether there is a face mapped to the recognized face among images stored in the memory 130 (e.g., a contact or photo album), and may provide the corresponding identification information to the text visual cue 623 when there is the mapped face.

The processor 120 may change the identification information based on a user input. The processor 120 may provide a keypad for changing the identification information when a user input for selecting the identification information is received. Alternatively, the processor 120 may provide an image stored in the memory 130 when the user input for selecting the identification information is received.

FIG. 6C is a diagram illustrating an example of a third visual cue provided to a person in an electronic device according to an embodiment of the disclosure.

Referring to FIG. 6C, a processor (e.g., the processor 120 of FIG. 1) of an electronic device (e.g., the electronic device 101) may display a third user interface 630 including a third visual cue based on the edge (or contour) of the object 611 on the display device 160. The third visual cue may include a figure (e.g., a circular) visual cue 635 and an image (e.g., a photo) visual cue 633. The figure visual cue 635 may be obtained by representing a face edge portion through face recognition as a circle. The image visual cue 635 may be provided when the recognized face has been previously configured (or registered) as an image (e.g., identification information) even once. The processor 120 may search whether there is a face mapped to the recognized face among images stored in the contact or photo album, and may provide the corresponding identification information to the image visual cue 633 when there is the mapped face.

Figure 7A:
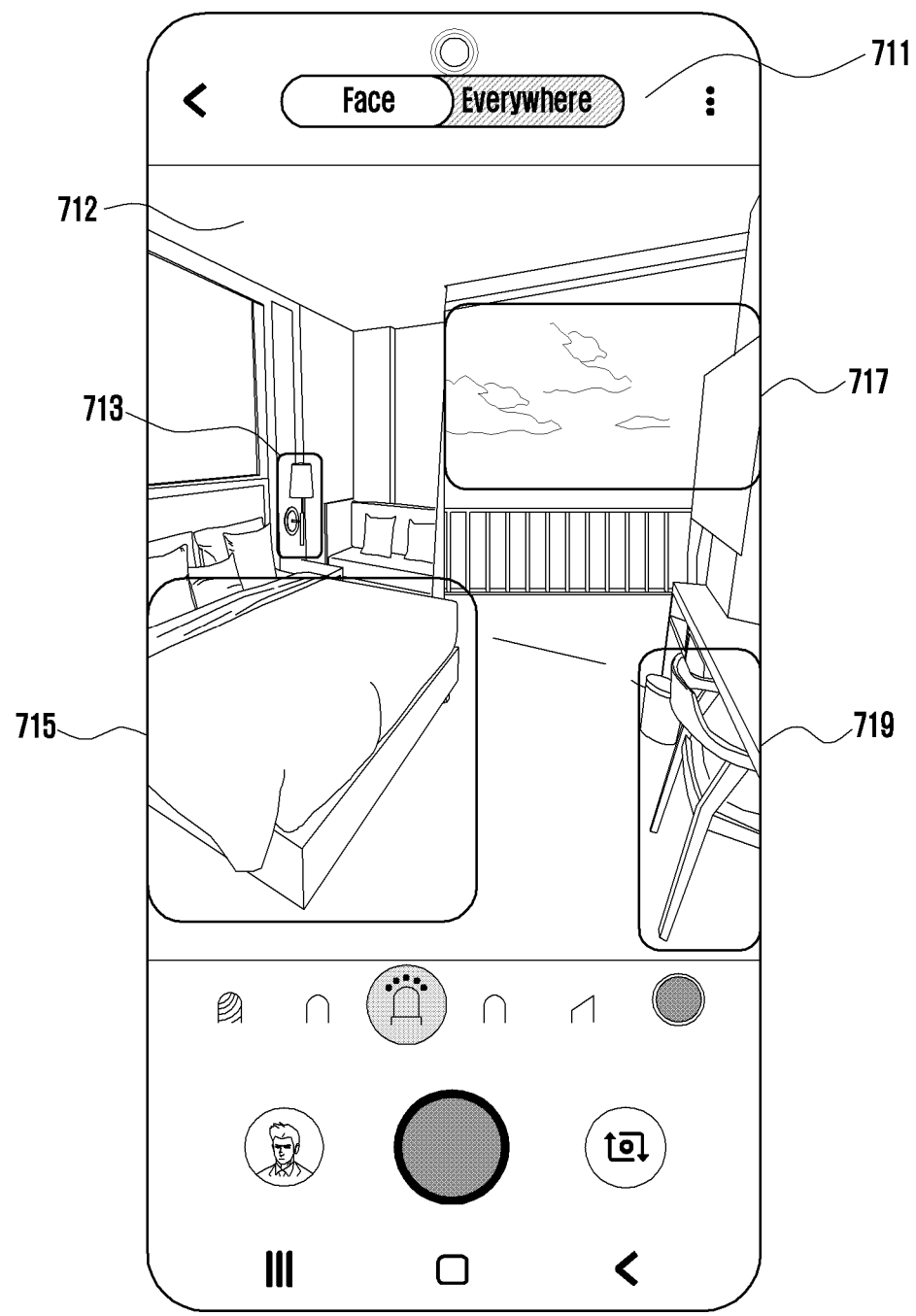
FIGS. 7A and 7B are diagrams illustrating an example of a visual cue provided to a thing in an electronic device according to various embodiments of the disclosure.
Figure 7B:
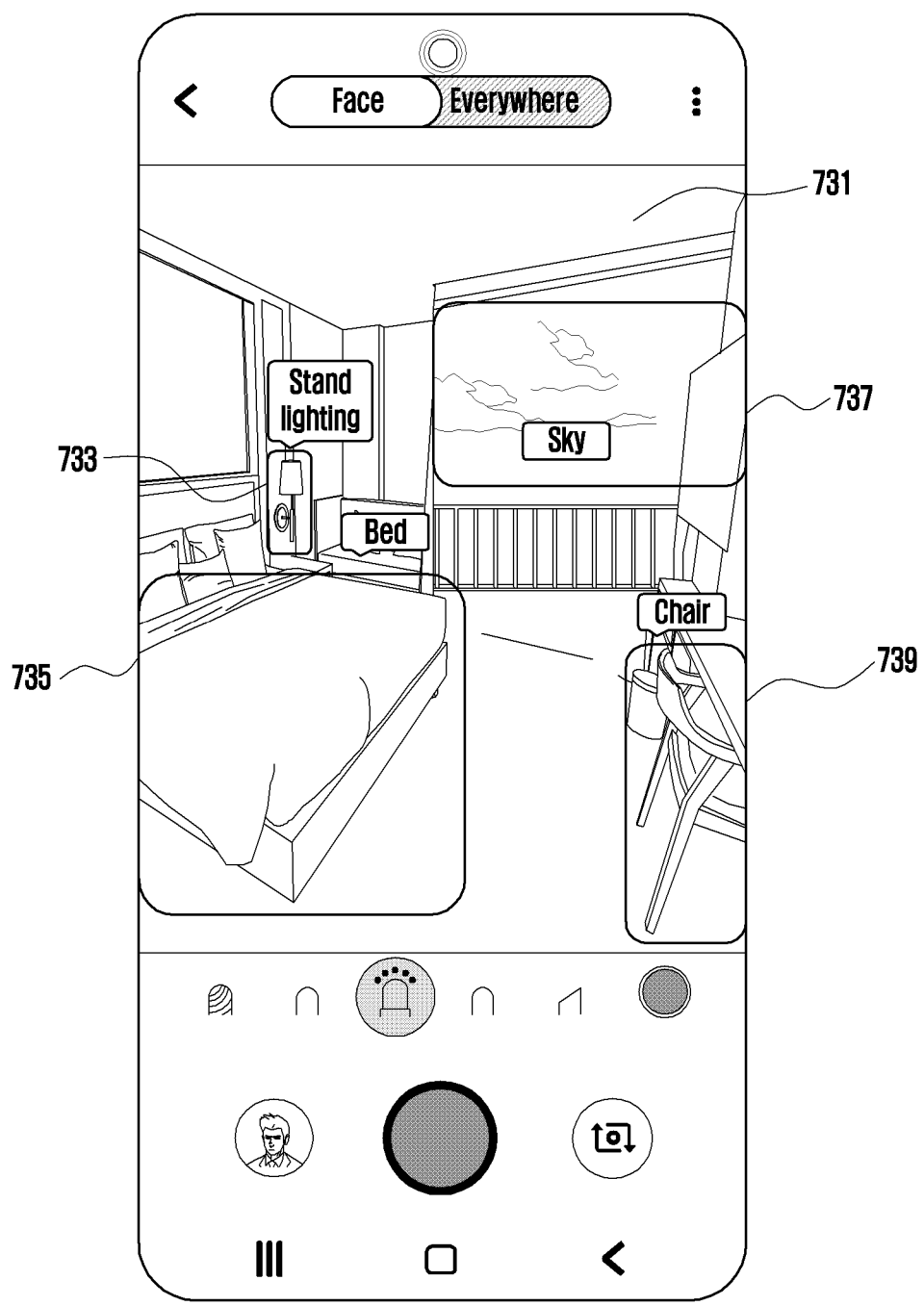

FIG. 7A is a diagram illustrating an example of a visual cue provided to a thing in an electronic device according to an embodiment of the disclosure, and FIG. 7B is a diagram illustrating an example of a visual cue provided to a thing in an electronic device according to an embodiment of the disclosure.

FIG. 7A is a diagram illustrating an example of a first visual cue provided to a thing in an electronic device according to an embodiment of the disclosure.

Referring to FIG. 7A, a processor (e.g., the processor 120 of FIG. 1) of an electronic device (e.g., the electronic device 101) may display a first user interface 710 including a first visual cue (e.g., 713, 715, 717, or 719) based on an edge (or contour) of an object on a display (e.g., the display device 160 of FIG. 1). The first user interface 710 may include an object attribute change button 711, a preview image 712, and the first visual cue. The object attribute change button 711 is a button for changing the attribute of an object, and the first user interface 710 shows an example in which the object attribute change button 711 is configured to a 'thing'. When the object attribute change button 711 is configured to a 'thing', the processor 120 may recognize the thing from the preview image 712.

The processor 120 may display the first visual cue based on the edge of the thing through thing recognition. The first visual cue may be displayed in the form of a figure. For example, the first visual cue may include at least one of a visual cue 713 corresponding to a stand lighting, a visual cue 715 corresponding to a bed, a visual cue 717 corresponding to the sky, and a visual cue 719 corresponding to a chair.

FIG. 7B is a diagram illustrating an example of a second visual cue provided to a thing in an electronic device according to an embodiment of the disclosure.

Referring to FIG. 7B, a processor (e.g., the processor 120 of FIG. 1) of an electronic device (e.g., the electronic device 101) may display a second user interface 730 including a second visual cue (e.g., 733, 735, 737, or 739) based on an edge (or contour) of an object on the display device 160. The second user interface 730 may include a preview image 731 and a second visual cue. The second visual cue may include a figure and text. When identification information corresponding to the object is received, the processor 120 may store the received identification information in a memory (e.g., the memory 130 of FIG. 1). When the identification information corresponding to the object recognized as a thing is stored in the memory 130, the processor 120 may provide the second visual cue including the figure and the identification information. The second visual cue may include at least one of the figure (e.g., rectangle) and text (stand lighting) visual cue 733 corresponding to the stand lighting, the figure (e.g., rectangle) and text (e.g., bed) visual cue 735 corresponding to the bed, the figure (e.g., rectangle) and text (e.g., sky) visual cue 737 corresponding to the sky, and the figure (e.g., rectangle) and text (e.g., chair) visual cue 739 corresponding to the chair.

Figure 8:
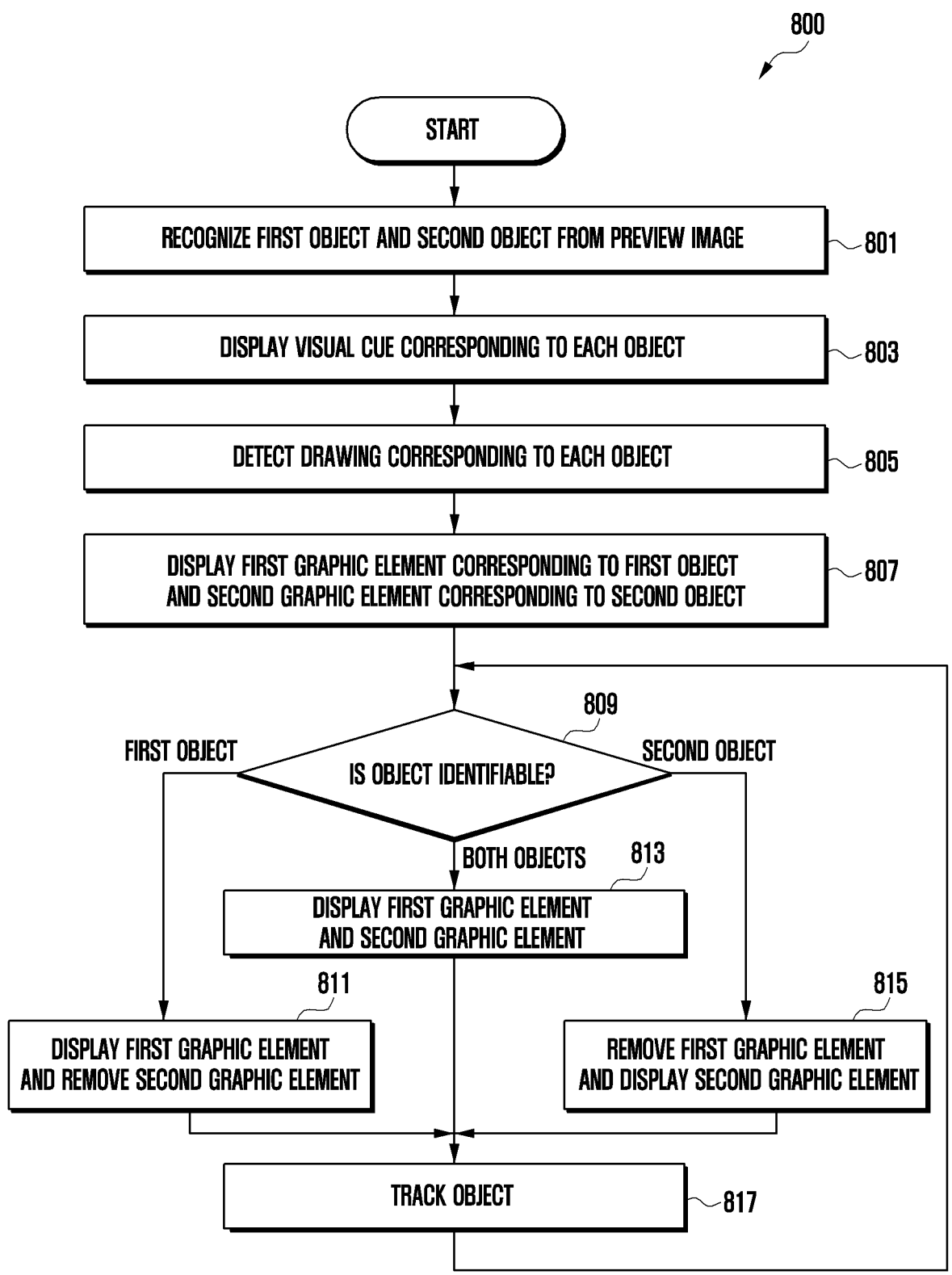
FIG. 8 is a flowchart illustrating a method of controlling a display of a graphic element according to whether to identify an object in an electronic device according to an embodiment of the disclosure.

FIG. 8 is a flowchart illustrating a method of controlling a display of a graphic element according to whether to identify an object in an electronic device according to an embodiment of the disclosure.

Referring to FIG. 8, in a method 800, in operation 801, a processor (e.g., the processor 120 of FIG. 1) of an electronic device (e.g., the electronic device 101) according to various embodiments may recognize a first object and a second object from a preview image. The preview image may refer to an image (or a video) acquired in real time from the camera module 180. The object may include a person (or a human) or a thing (e.g., an article). Hereinafter, for convenience of description, the object is described as a 'person', but the object may be a thing. The processor 120 may identify how many persons are recognized from the preview image for each recognized person. The face recognition may mean that a first object and a second object are differently recognized when two objects are recognized from the preview image.

In operation 803, the processor 120 may display a visual cue corresponding to each of the objects. The visual cue may be respectively displayed on the objects recognized from the preview image, and may guide the application of a doodle function or the fact that drawing is possible. The visual cue may include at least one of a figure (e.g., a circle), text, or an image. The processor 120 may display a first visual cue corresponding to the first object and a second visual cue corresponding to the second object. The visual cue may be displayed identically or differently for each recognized object. The processor 120 may display the color or shape of the figure provided as the visual cue differently for each object, or may display identification information (e.g., text or image) differently. The identification information may be displayed at an edge portion of the object or a specific designated position. The processor 120 may recognize the object even while performing operation 803.

According to various embodiments, the processor 120 may determine whether to display a drawable region based on the attribute of the recognized object. The processor 120 may display the drawable region when the object is a 'person', and may not display the drawable region when the object is a 'thing'. The processor 120 may gradually display the displayed visual cue to display the drawable region. The processor 120 may enlarge the first visual cue of the first object to display a first drawable region, and may enlarge the second visual cue of the second object to display a second drawable region.

In operation 805, the processor 120 may detect a drawing input corresponding to each object. The drawing may mean that a user directly performs drawing in the form of a point, line, or surface using his or her body or a pen (e.g., an external drawing pen mounted on the electronic device 101). The processor 120 may obtain coordinate information on which the drawing is detected based on the feature point of the object. The processor 120 may generate relationship information between the feature point of the object and the graphic element by mapping the feature point of the object and the coordinate information of the drawing. The relationship information may associate the graphic element with the object based on the coordinate information on which the drawing is detected. The processor 120 may generate first relationship information by mapping a first graphic element to the feature point of the first object, and may generate second relationship information by mapping a second graphic element to the feature point of the second object. The processor 120 may store the relationship information for each object in the memory 130. The processor 120 may recognize the object even while performing operation 805.

According to various embodiments, a user may input a drawing differently for each object. For example, the processor 120 may detect an input drawing a crown shape (e.g., a first graphic element) with respect to the first object, and may detect an input drawing a ribbon shape (e.g., a second graphic element) with respect to the second object. The processor 120 may recognize that the first object and the second object are different through face recognition, and may analyze (or detect) to which person of the first object or the second object the drawing is input based on the detection point (e.g., coordinate information) of the drawing.

For example, the processor 120 may determine that a drawing is detected in the first object when the drawing is input in a first drawable region of the first object, and may determine that a drawing is detected in the second object when a drawing is input in a second drawable region of the second object. When the first object and the second object are close to each other and the drawable regions overlaps, the processor 120 may determine which object the drawing is closer to, based on the feature point of the object (e.g., head, facial contour, eyes, nose, mouth, or the like), thereby determining to which object of the first object or the second object the drawing is input.

In operation 807, the processor 120 may display a first graphic element corresponding to the first object and a second graphic element corresponding to the second object. The processor 120 may control to display the graphic element at a location mapped to the feature point of the object based on the relationship information. For example, the processor 120 may display the first graphic element based on first relationship information stored in the memory 130 and may display the second graphic element based on second relationship information. The processor 120 may control the display of the graphic element according to at least one of the presence or absence, size, angle (or posture), or location of the object. The processor 120 may recognize the object even while performing operation 807.

In operation 809, the processor 120 may determine whether object identification is possible. The processor 120 may identify (or recognize) the first object and the second object from the preview image obtained in real time from the camera module 180. For example, the processor 120 may track a presence or an absence, a size, an angle (or a posture), or a location of the first object or the second object in the preview image. The processor 120 may perform at least one of operation 811, operation 813, or operation 815 based on whether the first object or the second object is identifiable. The processor 120 may recognize the object even while performing operation 809.

When only the first object is identified, in operation 811, the processor 120 may display the first graphic element corresponding to the first object and may remove the second graphic element corresponding to the second object. When only the first object is identified from the preview image acquired in real time and the second object is not identified, the processor 120 may display only the first graphic element and may not display the second graphic element. The processor 120 may display the first graphic element corresponding to the first object based on the first relationship information. The processor 120 may perform operations 803 to 809 when a new object is recognized by recognizing the object even while performing operation 811. The processor 120 may perform operation 811 and may perform operation 817.

When the first object and the second object are identified, in operation 813, the processor 120 may display the first graphic element corresponding to the first object, and may display the second graphic element corresponding to the second object. When both the first object and the second object are identified from the preview image acquired in real time, the processor 120 may display the first graphic element and the second graphic element. The processor 120 may vary and display the first graphic element and the second graphic element in proportion to a change (e.g., a size, a position, or an angle) in the first object or the second object. The processor 120 may display the first graphic element corresponding to the first object based on the first relationship information, and may display the second graphic element corresponding to the second object based on the second relationship information. The processor 120 may perform operations 803 to 809 when a new object is recognized by recognizing the object even while performing operation 813. The processor 120 may perform operation 813 and may perform operation 817.

When only the second object is identified, in operation 815, the processor 120 may remove the first graphic element corresponding to the first object, and may display the second graphic element corresponding to the second object. When only the second object is identified from the preview image acquired in real time and the first object is not identified, the processor 120 may display only the second graphic element and may not display the first graphic element. The processor 120 may display the second graphic element corresponding to the second object based on the second relationship information. The processor 120 may perform operations 803 to 809 when a new object is recognized by recognizing the object even while performing operation 811.

According to various embodiments, the processor 120 may perform operation 801 while performing at least one of operations after operation 801. When a new object is recognized while performing at least one of operations after operation 801, the processor 120 may perform operations of displaying a visual cue for the newly recognized object, detecting drawing for the new object, and displaying a graphic element for the new object.

In operation 817, the processor 120 may track the object. The processor 120 may track a change in the object in the preview image acquired in real time from the camera module 180. For example, when the object is a human, the processor 120 may track a presence or an absence, a size, an angle (or a posture), or a location of the object in the preview image. When the object is a thing, the processor 120 may track a change in the electronic device 101. After performing operation 817, the processor 120 may return to operation 809 to determine whether object identification is possible, and may perform at least one of operation 811, 813, or 815 based on whether the first object or the second object is identifiable. The processor 120 may recognize the object even while performing operation 817.

According to various embodiments, the processor 120 may take a video in at least one of operations 801 to 817 while performing operations 801 to 817 according to a user's request.

Figure 9A:
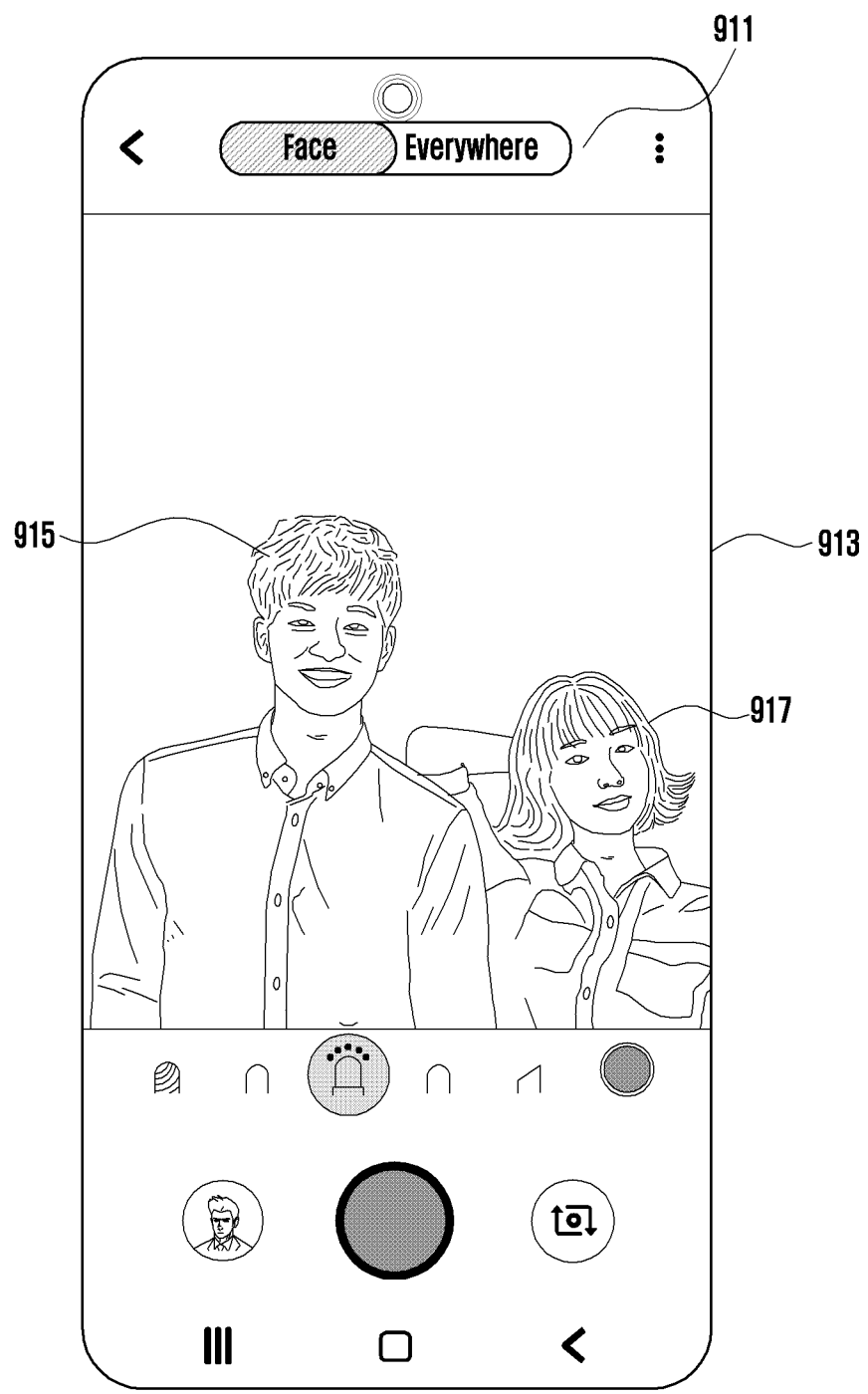
FIGS. 9A, 9B, 9C and 9D are diagrams illustrating an example of providing different visual cues for each object in an electronic device according to various embodiments of the disclosure.
Figure 9B:
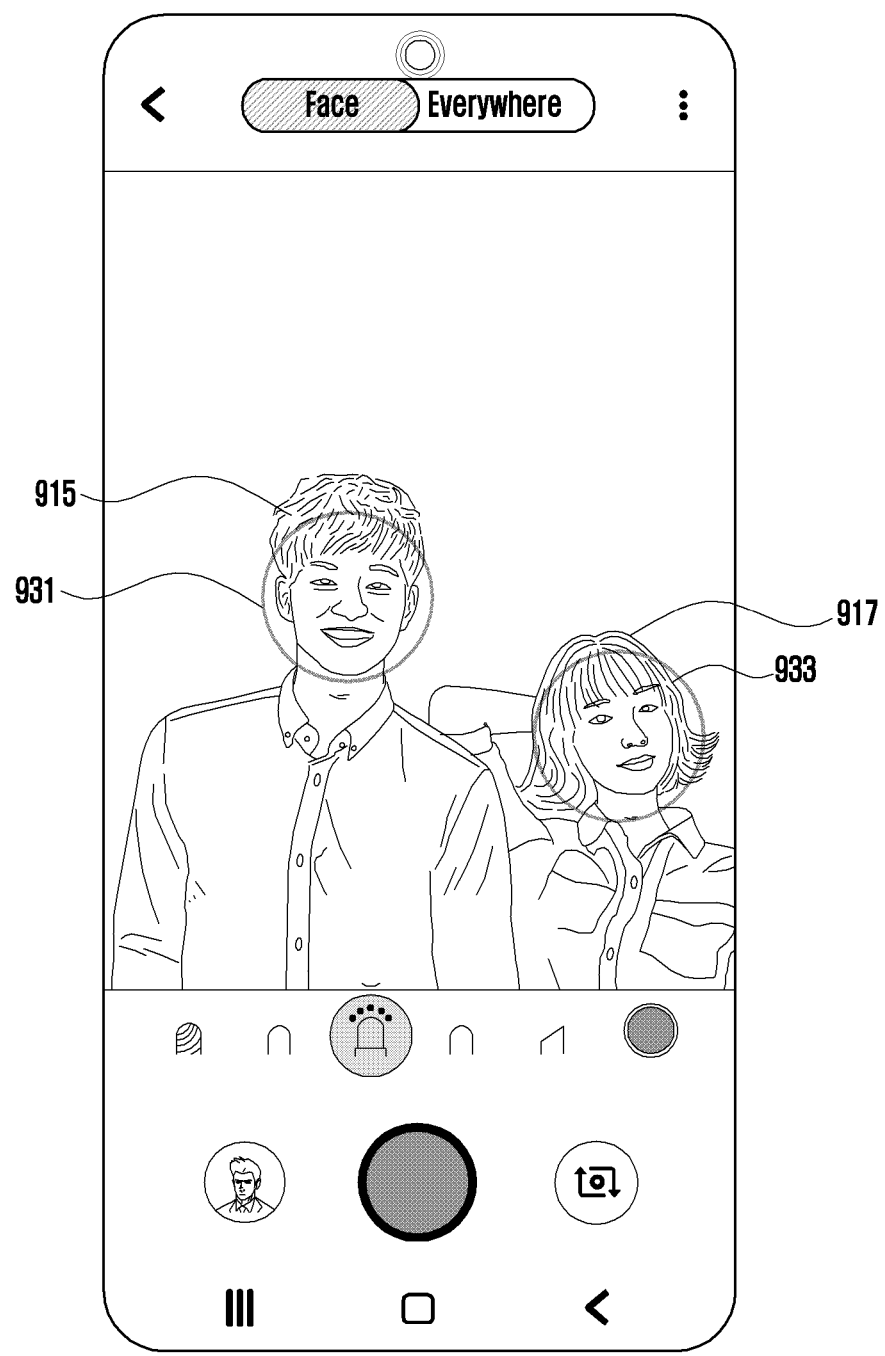
Figure 9C:
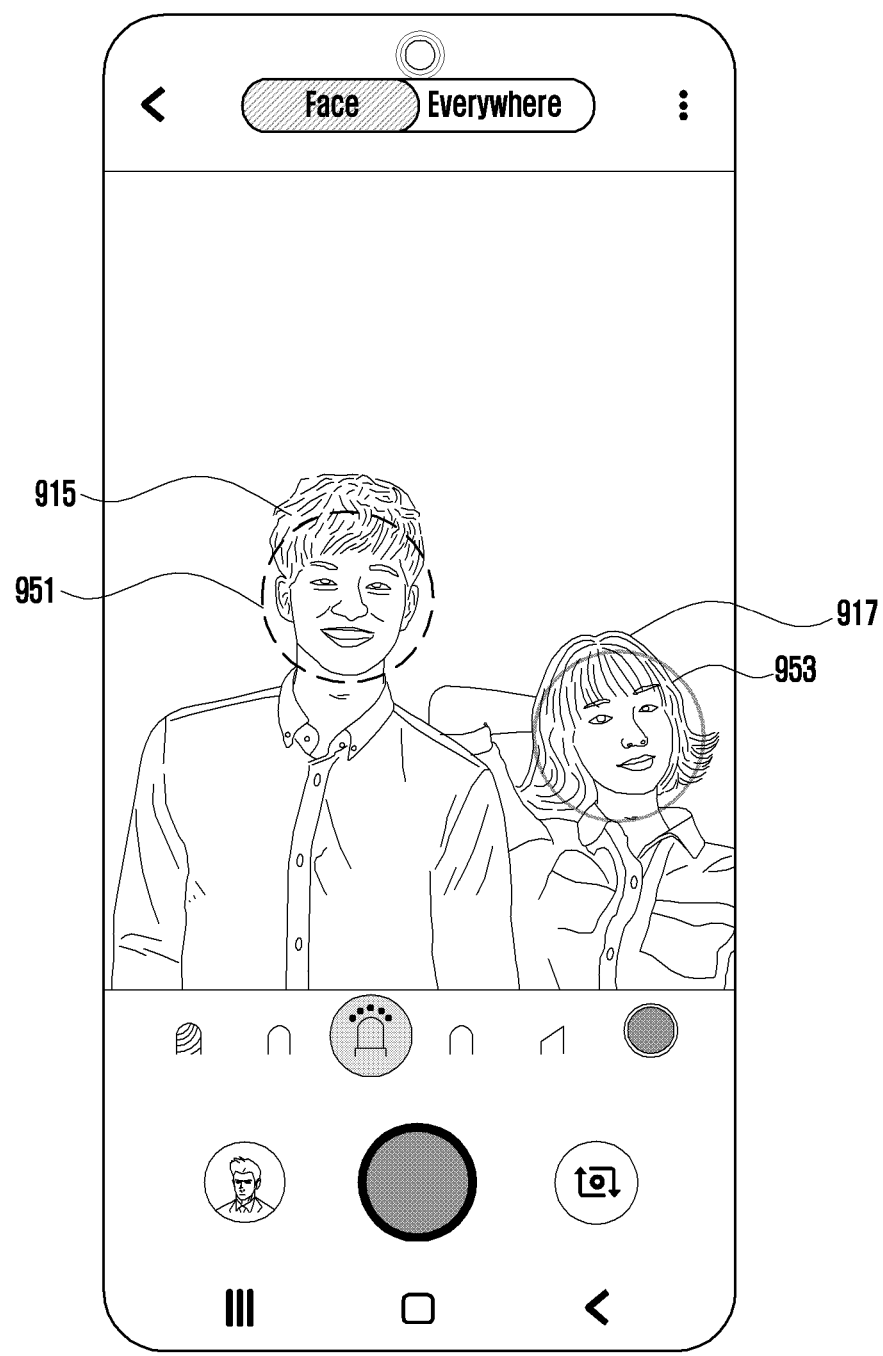
Figure 9D:
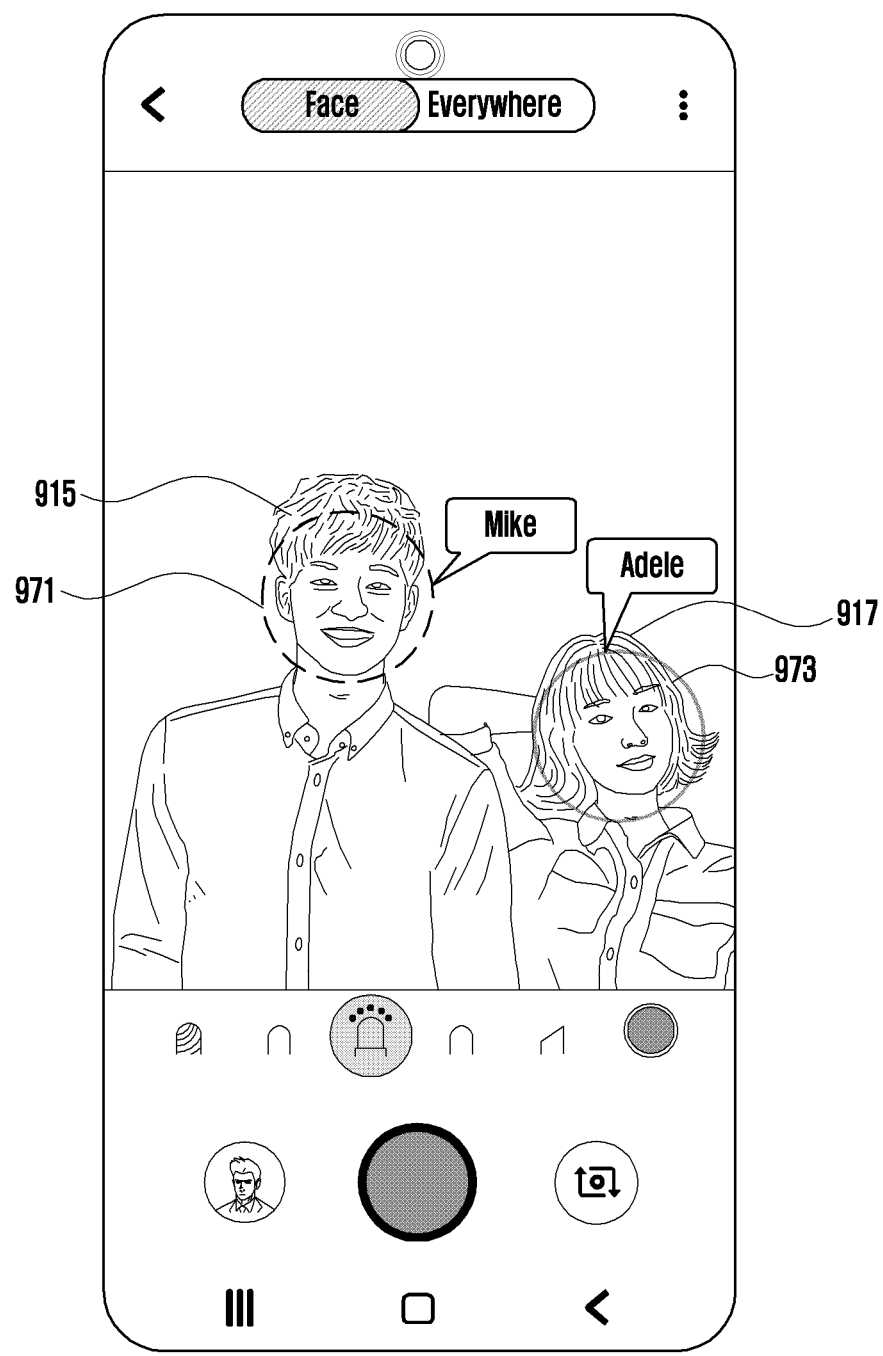

FIG. 9A is a diagram illustrating an example of providing different visual cues for each object in an electronic device according to an embodiment of the disclosure, FIG. 9B is a diagram illustrating an example of providing different visual cues for each object in an electronic device according to an embodiment of the disclosure, FIG. 9C is a diagram illustrating an example of providing different visual cues for each object in an electronic device according to an embodiment of the disclosure, and FIG. 9D is a diagram illustrating an example of providing different visual cues for each object in an electronic device according to an embodiment of the disclosure.

FIG. 9A is a diagram illustrating an example of displaying a preview image in an electronic device according to an embodiment of the disclosure.

Referring to FIG. 9A, a processor (e.g., the processor 120 of FIG. 1) of an electronic device (e.g., the electronic device 101) may display a first user interface 910 including a preview image 913 on a display (e.g., the display device 160 of FIG. 1). The first user interface 910 may include an object attribute change button 911 and the preview image 913. When the object attribute change button 911 is configured (or selected) as a person (e.g., a face), the processor 120 may recognize the person from the preview image 913. When the object attribute change button 911 is configured to a thing (e.g., everywhere), the processor 120 may recognize the object from the preview image 913. Since the object attribute change button 911 is configured to the person, the processor 120 may recognize the person to recognize a first object 915 and a second object 917.

FIG. 9B is a diagram illustrating an example of displaying a visual cue to correspond to an object in an electronic device according to an embodiment of the disclosure.

Referring to FIG. 9B, when the object identification is completed, the processor 120 may display a second user interface 930 on the display device 160. The second user interface 930 may include a first visual cue 931 corresponding to the first object 915 and a second visual cue 933 corresponding to the second object 917. The first visual cue 931 and the second visual cue 933 may be displayed on the object (e.g., person) recognized from the preview image, respectively. The processor 120 may display the first visual cue 931 and the second visual cue 933 in the same form (or shape). For example, the processor 120 may display the first visual cue 931 based on the facial contour of the first object 915, and may display the second visual cue 933 based on the facial contour of the second object 917. According to various embodiments, when the first object 915 and the second object 917 are analyzed to have different facial contour sizes, the processor 120 may display the sizes of the first visual cue 931 and the second visual cue differently. When the first object 915 and the second object 917 are analyzed to have the same facial contour size, the processor 120 may identically display the first visual cue 931 and the second visual cue 933.

FIG. 9C is a diagram illustrating another example of displaying a visual cue to correspond to an object in an electronic device according to an embodiment of the disclosure.

Referring to FIG. 9C, when the object identification is completed, the processor 120 may display a third user interface 950 on the display device 160. The third user interface 950 may include a first visual cue 951 corresponding to the first object 915 and a second visual cue 953 corresponding to the second object 917. The first visual cue 951 and the second visual cue 953 may be displayed on the object (e.g., person) recognized from the preview image, respectively. The processor 120 may display the first visual cue 951 and the second visual cue 953 in different forms. For example, the processor 120 may display at least one of the shape, form, color, or size of the first visual cue 951 differently from at least one of the shape, form, color, or size of the second visual cue 953. The first visual cue 951 may be indicated by a dotted line (or red), and the second visual cue 953 may be indicated by a solid line (or black).

FIG. 9D is a diagram illustrating another example of displaying a visual cue to correspond to an object in an electronic device according to an embodiment of the disclosure.

Referring to FIG. 9D, when the object identification is completed, the processor 120 may display a fourth user interface 970 on the display device 160. The fourth user interface 970 may include a first visual cue 971 corresponding to the first object 915 and a second visual cue 973 corresponding to the second object 917. The processor 120 may display the first visual cue 971 and the second visual cue 973 in different forms. As to the first visual cue 971, a figure (e.g., a black circle) may be displayed based on the facial contour of the first object 915 and text (e.g., Mike) may be displayed as identification information. As to the second visual cue 973, a figure (e.g., a red circle) may be displayed based on the facial contour of the second object 917 and text (e.g., Adele) may be displayed as identification information.

According to various embodiments, when the first object 915 has been previously configured (or registered) as 'Mike' even once and the second object 917 has been configured (or registered) as 'Adele', the identification information may be displayed. The processor 120 may change the identification information based on a user input. The processor 120 may provide a keypad for changing the identification information when a user input for selecting the identification information is received. Alternatively, the processor 120 may provide an image stored in the memory 130 when the user input for selecting the identification information is received.

Figure 10A:
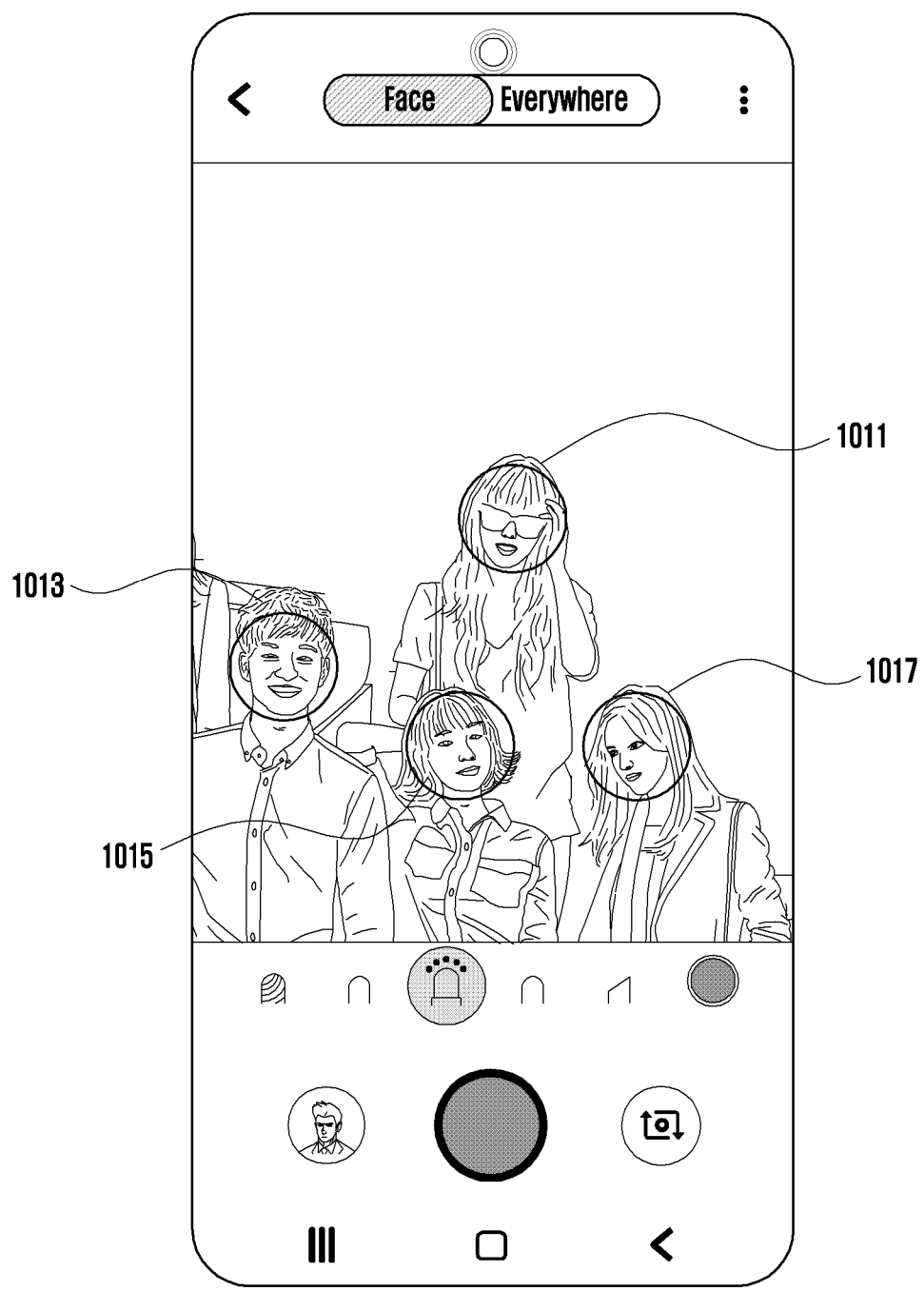
FIGS. 10A, 10B and 10C are diagrams illustrating an example of providing different visual cues for each object in an electronic device according to various embodiments of the disclosure.
Figure 10B:
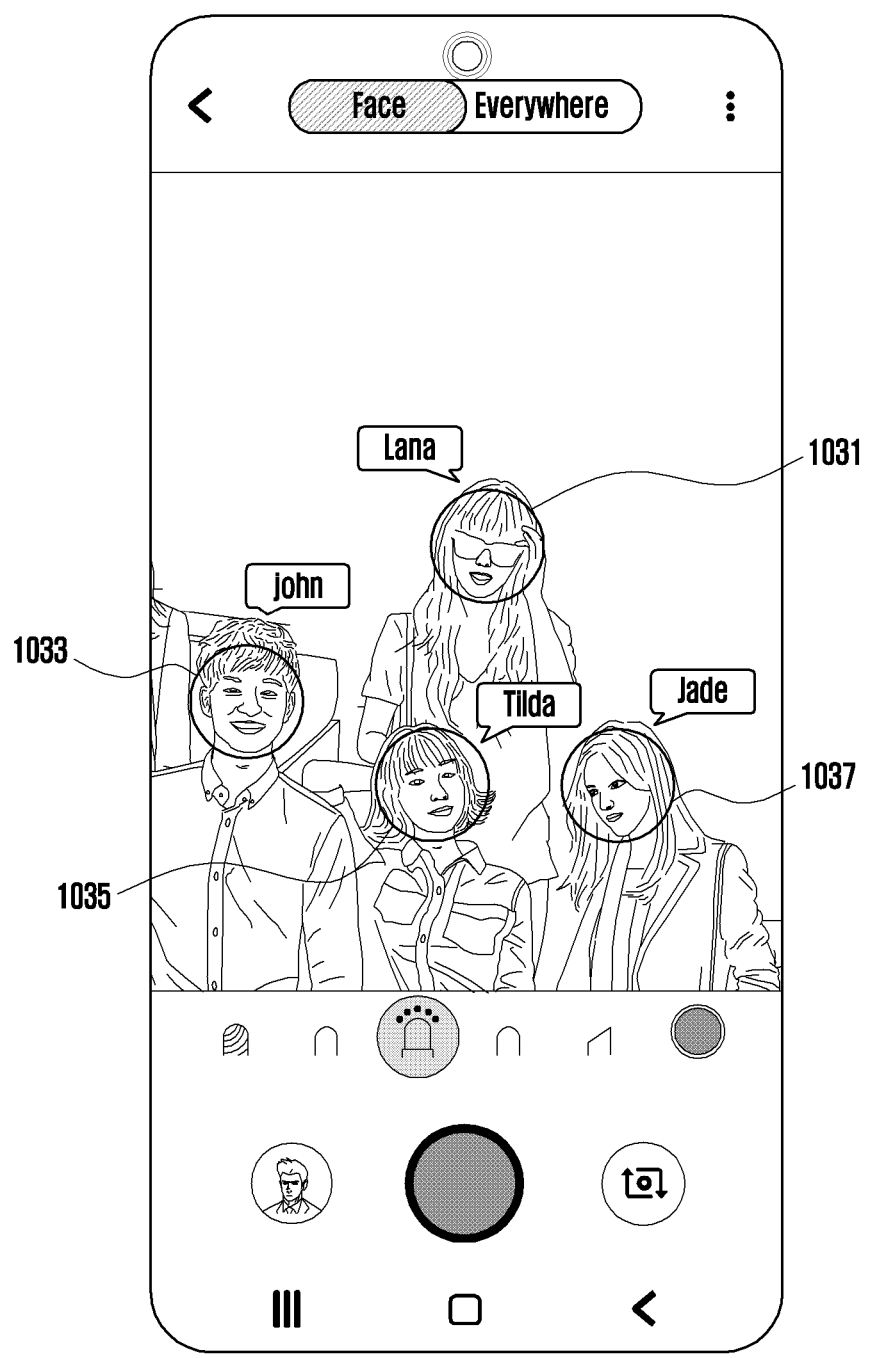
Figure 10C:
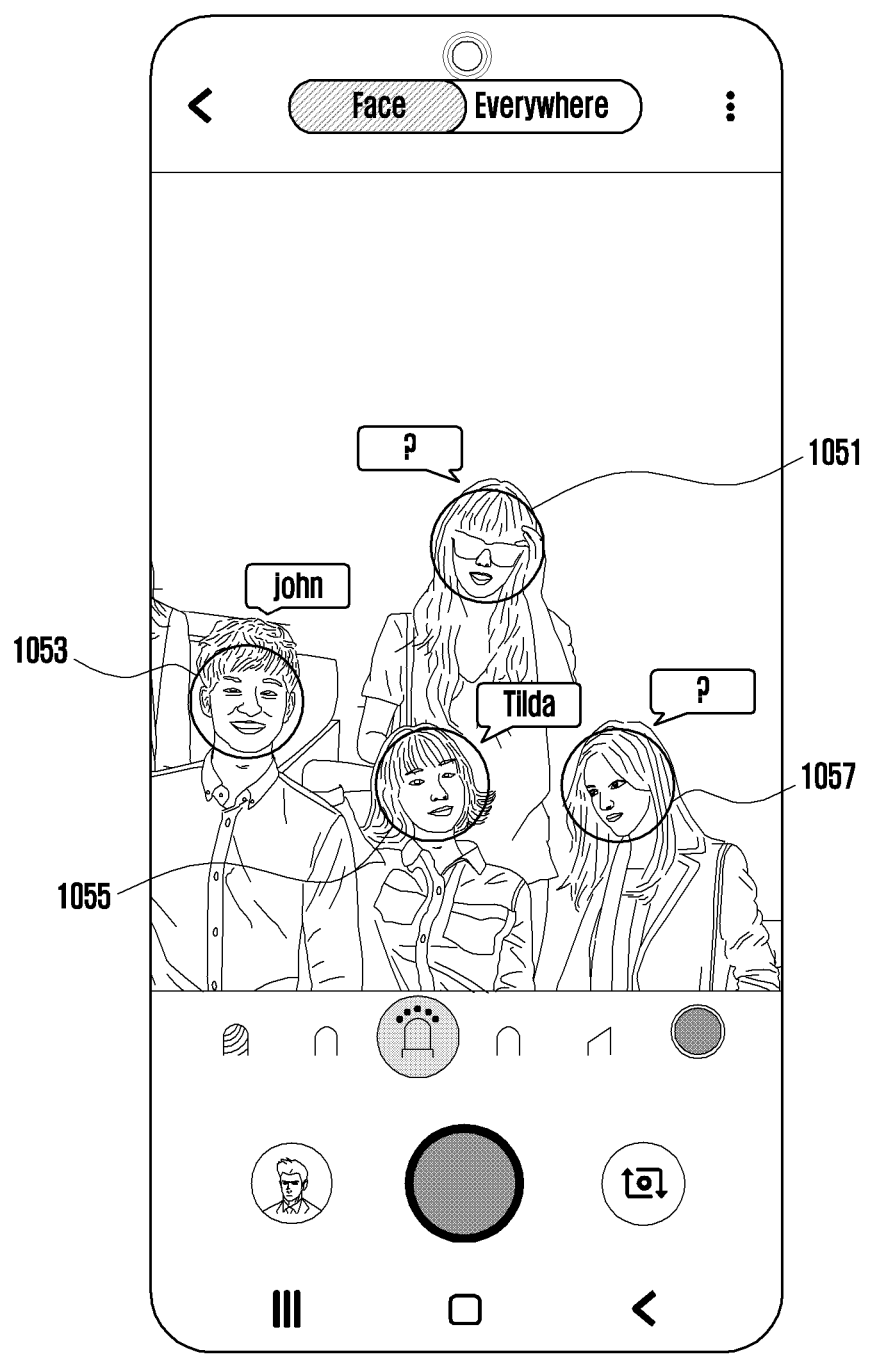

FIG. 10A is a diagram illustrating an example of providing different visual cues for each object in an electronic device according to an embodiment of the disclosure, FIG. 10B is a diagram illustrating an example of providing different visual cues for each object in an electronic device according to embodiment of the disclosure, and FIG. 10C is a diagram illustrating an example of providing different visual cues for each object in an electronic device according to an embodiment of the disclosure.

FIG. 10A is a diagram illustrating an example of displaying a visual cue to correspond to an object in an electronic device according to an embodiment of the disclosure.

Referring to FIG. 10A, the processor 120 may identify an object from a preview image, and may display a first user interface 1010 on the display device 160 when the object identification is completed. The first user interface 1010 may include a first visual cue 1011 corresponding to a first object, a second visual cue 1013 corresponding to a second object, a third visual cue 1015 corresponding to a third object, or a fourth visual cue 1017 corresponding to a fourth object. The first visual cue 1011 to the fourth visual cue 1017 may be displayed on the object (e.g., a person) recognized from the preview image, respectively. The processor 120 may display the first visual cue 1011 to the fourth visual cue 1017 in the same form (or a shape).

For example, the processor 120 may display the first visual cue 1011 based on the facial contour of the first object, the second visual cue 1013 based on the facial contour of the second object, the third visual cue 1015 based on the facial contour of the third object, and the fourth visual cue 1017 based on the facial contour of the fourth object. According to various embodiments, when the facial contour sizes of the first object to the fourth object are analyzed to be different from each other, the processor 120 may display the sizes of the first visual cue 1011 to the fourth visual cue 1017 differently. When the sizes of the facial contours of the first to fourth objects are analyzed to be the same, the processor 120 may identically display the sizes of the first visual cues 1011 to the fourth visual cues 1017.

FIG. 10B is a diagram illustrating another example of displaying a visual cue to correspond to an object in an electronic device according to an embodiment of the disclosure.

Referring to FIG. 10B, the processor 120 may identify an object from a preview image, and may display a second user interface 1030 on the display device 160 when the object identification is completed. The second user interface 1030 may include a first visual cue 1031 corresponding to a first object, a second visual cue 1033 corresponding to a second object, a third visual cue 1035 corresponding to a third object, or a fourth visual cue 1037 corresponding to a fourth object. The first visual cue 1031 to the fourth visual cue 1037 may be displayed on the object (e.g., person) recognized from the preview image, respectively. The processor 120 may display the first visual cue 1031 to the fourth visual cue 1037 in different forms (or shapes), respectively. As to the first visual cue 1031, a figure (e.g., a black circle) may be displayed based on the facial contour of the first object, and text (e.g., Lana) may be displayed as identification information. As to the second visual cue 1033, a figure (e.g., a red circle) may be displayed based on the facial contour of the second object, and text (e.g., John) may be displayed as identification information. As to the third visual cue 1035, a figure (e.g., a pink circle) may be displayed based on the facial contour of the third object, and text (e.g., Tilda) may be displayed as identification information. As to the fourth visual cue 1037, a figure (e.g., an orange circle) may be displayed based on the facial contour of the fourth object, and text (e.g., Jade) may be displayed as identification information.

According to various embodiments, when the identification information for the first object has been previously configured (or registered) as 'Lana' even once, the identification information for the second object has been previously configured (or registered) as 'John', the identification information for the third object has been previously configured (or registered) as 'Tilda', and the identification information for the fourth object has been previously configured (or registered) as 'Jade', the processor 120 may display the identification information corresponding to each object. The processor 120 may change the identification information based on a user input. The processor 120 may provide a keypad for changing the identification information when a user input for selecting the identification information is received. Alternatively, the processor 120 may provide an image stored in the memory 130 when a user input for selecting the identification information is received.

FIG. 10C is a diagram illustrating another example of displaying a visual cue to correspond to an object in an electronic device according to an embodiment of the disclosure.

Referring to FIG. 10C, the processor 120 may identify an object from a preview image, and may display a third user interface 1050 on the display device 160 when the object identification is completed. The third user interface 1050 may include a first visual cue 1051 corresponding to a first object, a second visual cue 1053 corresponding to a second object, a third visual cue 1055 corresponding to a third object, or a fourth visual cue 1057 corresponding to a fourth object. As to the first visual cue 1051, a figure (e.g., a black circle) may be displayed based on the facial contour of the first object. The first visual cue 1051 may include a symbol (e.g., a question mark) that guides the fact that identification information for the first object can be registered. As to the second visual cue 1053, a figure (e.g., a red circle) may be displayed based on the facial contour of the second object, and text (e.g., John) may be displayed as identification information. As to the third visual cue 1055, a figure (e.g., a pink circle) may be displayed based on the facial contour of the second object, and text (e.g., Tilda) may be displayed as identification information. As to the fourth visual cue 1057, a figure (e.g., an orange circle) may be displayed based on the facial contour of the fourth object. The fourth visual cue 1057 may include a symbol (e.g., a question mark) that guides the fact that identification information for the fourth object can be registered.

According to various embodiments, the identification information (e.g., John or Tilda) may be displayed when the same has been previously configured (or registered) even once. The processor 120 may change the identification information based on a user input. A user may input first identification information for the first object by selecting a symbol for the first object. The user may input fourth identification information for the fourth object by selecting a symbol for the fourth object. The processor 120 may provide a keypad for changing the identification information when a user input for selecting the identification information is received. Alternatively, the processor 120 may provide an image stored in the memory 130 when the user input for selecting the identification information is received. In a case in which the first identification information or the fourth identification information is registered, when the first object or the fourth object is recognized (or identified) thereafter, the processor 120 may provide the visual cue together with the first identification information or the fourth identification information.

Figure 11A:
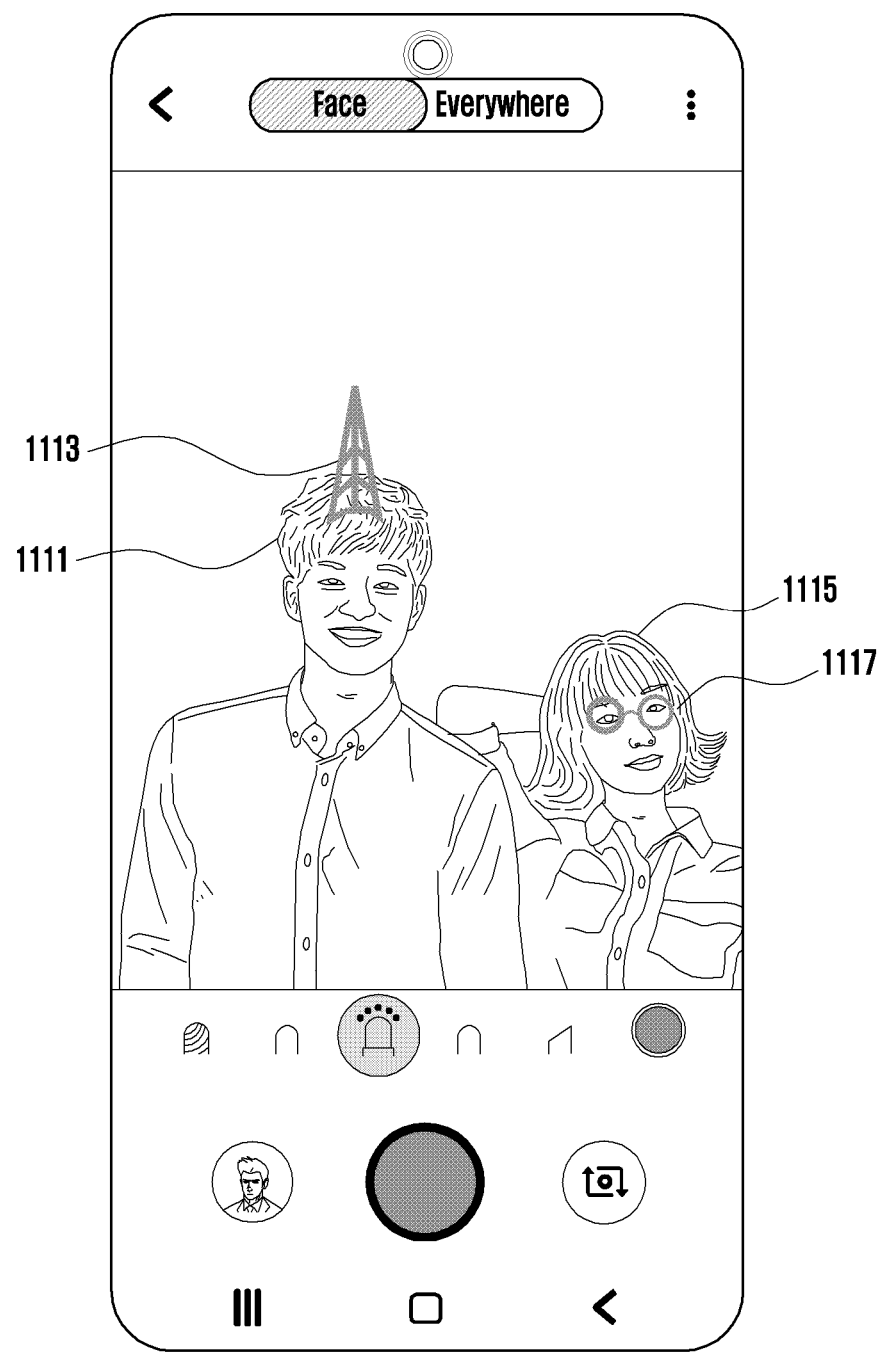
FIGS. 11A, 11B and 11C are diagrams illustrating an example of controlling a display of a graphic element according to whether to identify a person in an electronic device according to various embodiments of the disclosure.
Figure 11B:
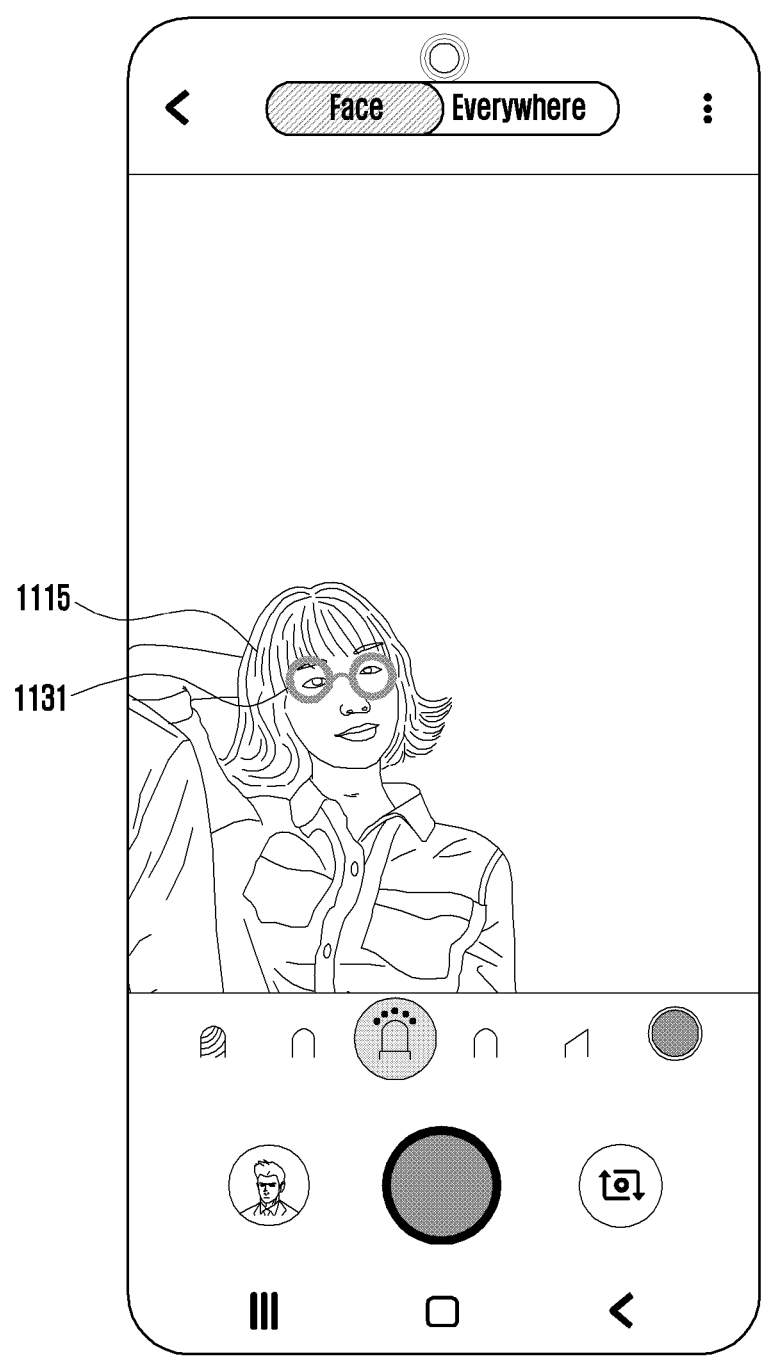
Figure 11C:
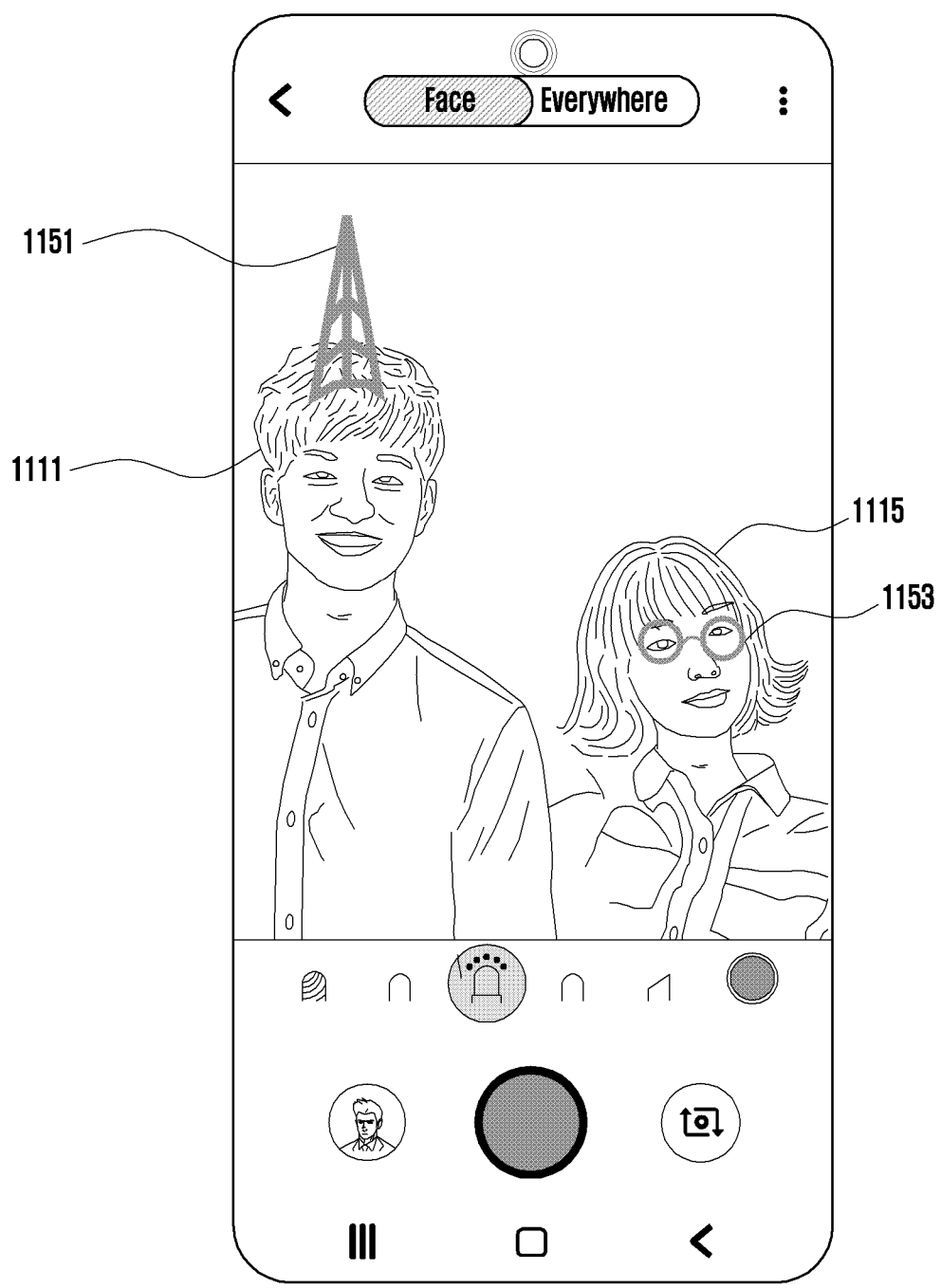

FIG. 11A is a diagram illustrating an example of controlling a display of a graphic element according to whether to identify a person in an electronic device according to an embodiment of the disclosure, FIG. 11B is a diagram illustrating an example of controlling a display of a graphic element according to whether to identify a person in an electronic device according to embodiment of the disclosure, and FIG. 11C is a diagram illustrating an example of controlling a display of a graphic element according to whether to identify a person in an electronic device according to an embodiment of the disclosure.

FIG. 11A is a diagram illustrating an example of displaying a graphic element to correspond to an object in an electronic device according to an embodiment of the disclosure.

Referring to FIG. 11A, when a graphic element is generated by drawing, the processor 120 may display the first user interface 1110 on the display device 160. The first user interface 1110 may include a first graphic element 1113 corresponding to a first object 1111 and a second graphic element 1117 corresponding to a second object 1115. The first graphic element 1113 may be generated when a user inputs a drawing for the first object 1111. The second graphic element 1117 may be generated when a user inputs a drawing for the second object 1115. The processor 120 may generate first relationship information of the first graphic element 1113 by mapping the feature point of the first object

1111 and coordinate information of the user's drawing. The processor 120 may generate second relationship information of the second graphic element 1117 by mapping the feature point of the second object 1115 and coordinate information of the user's drawing. The processor 120 may display the first graphic element 1113 corresponding to the first object 1111 based on the first relationship information, and may display the second graphic element 1117 corresponding to the second object 1115 based on the second relationship information. The first graphic element 1113 may be different from the second graphic element 1117. Since the first graphic element 1113 is generated based on the feature point of the first object 1113, even if a user inputs the corresponding drawing in the same manner as the second graphic element 1117, the first graphic element 1113 may be different from the second graphic element 1117 because the objects are different.

FIG. 11B is a diagram illustrating an example of displaying a graphic element by tracking an object in an electronic device according to an embodiment of the disclosure.

Referring to FIG. 11B, after displaying the first user interface 1110, the processor 120 may track the object to display the second user interface 1130 on the display device 160. The second user interface 1130 may include a second graphic element 1131 corresponding to the second object 1115. Since the display of the second graphic element 1131 is controlled based on the feature point of the second object 1115, when the second object 1115 is changed in the preview image, the second graphic element 1131 may be changed together and displayed. The processor 120 may control the display of the first graphic element 1113 or the second graphic element 1131 according to a change in at least one of the presence or absence, size, angle (or posture), or location of the first object 1111 or the second object 1115. When the first object 1111 is not recognized in the preview image obtained after the first user interface 1110 is displayed and only the second object 1115 is recognized, the processor 120 may not display the first graphic element 1113 corresponding to the first object 1111 and may display the second graphic element 1131 corresponding to the second object 1115. Unlike the second graphic element 1117, it can be seen that the location and size of the second graphic element 1131 has been changed.

FIG. 11C is a diagram illustrating another example of displaying a graphic element by tracking an object in an electronic device according to an embodiment of the disclosure.

Referring to FIG. 11C, the processor 120 may display the first user interface 1110 or the second user interface 1130 and may then track the object to display the third user interface 1150 on the display device 160. The third user interface 1150 may include a first graphic element 1151 corresponding to a first object 1111 and a second graphic element 1153 corresponding to a second object 1115. The processor 120 may control the display of the first graphic element 1151 or the second graphic element 1153 according to a change in at least one of the presence or absence, size, angle (or posture), or location of the first object 1111 or the second object 1115. When the first object 1111 and the second object 1115 are recognized in the preview image obtained after the first user interface 1110 or the second user interface 1130 is displayed, the processor 120 may display the first graphic element 1151 corresponding to the first object 1111 and the second graphic element 1153 corresponding to the second object 1115. Unlike the first graphic element 1113, it can be seen that the location or size of the first graphic element 1151 has been changed. Unlike the second graphic element 1117 or the second graphic element 1131, it can be seen that the location or size of the second graphic element 1153 has been changed.

Figure 12A:
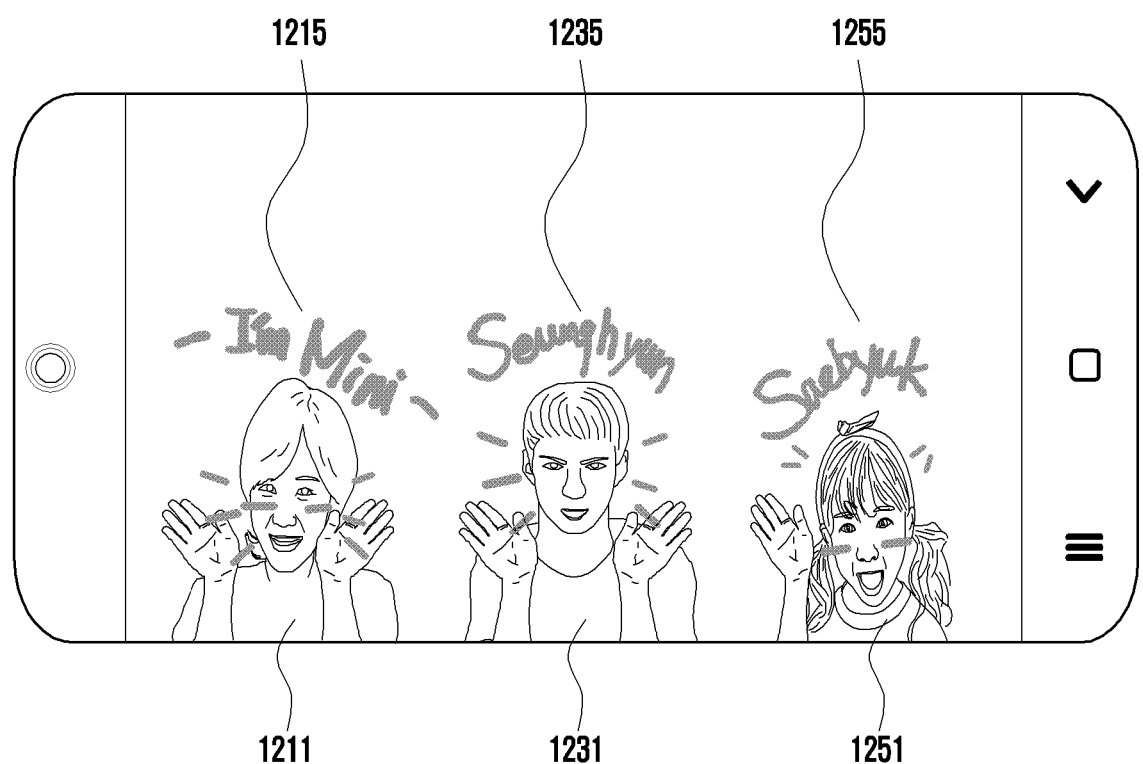
FIGS. 12A, 12B, 12C and 12D are diagrams illustrating an example of controlling a display of a graphic element according to whether to identify a person in an electronic device according to various embodiments of the disclosure.
Figure 12B:
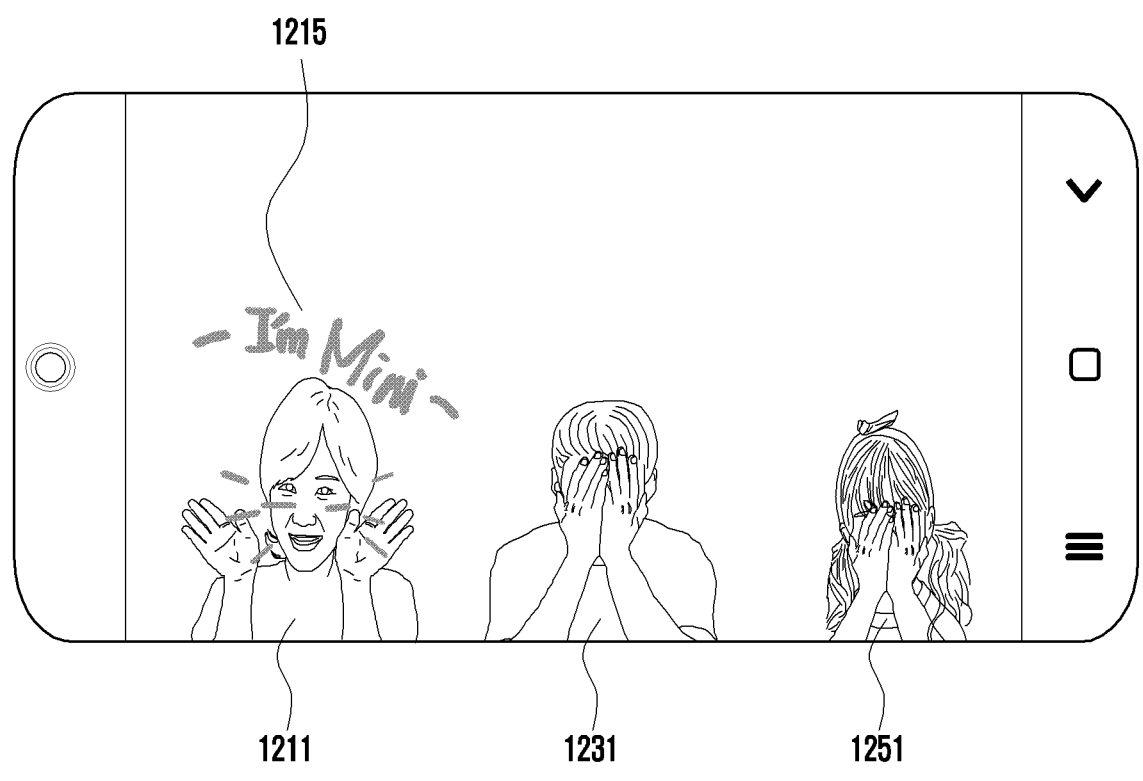
Figure 12C:
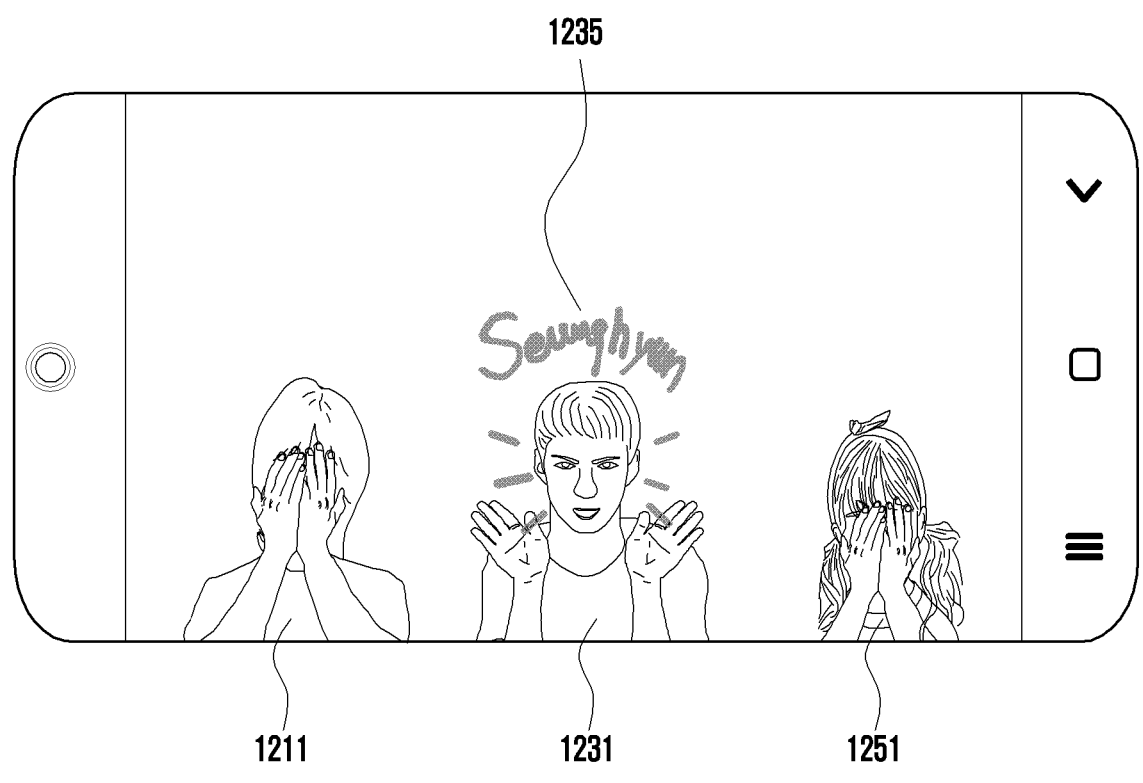
Figure 12D:
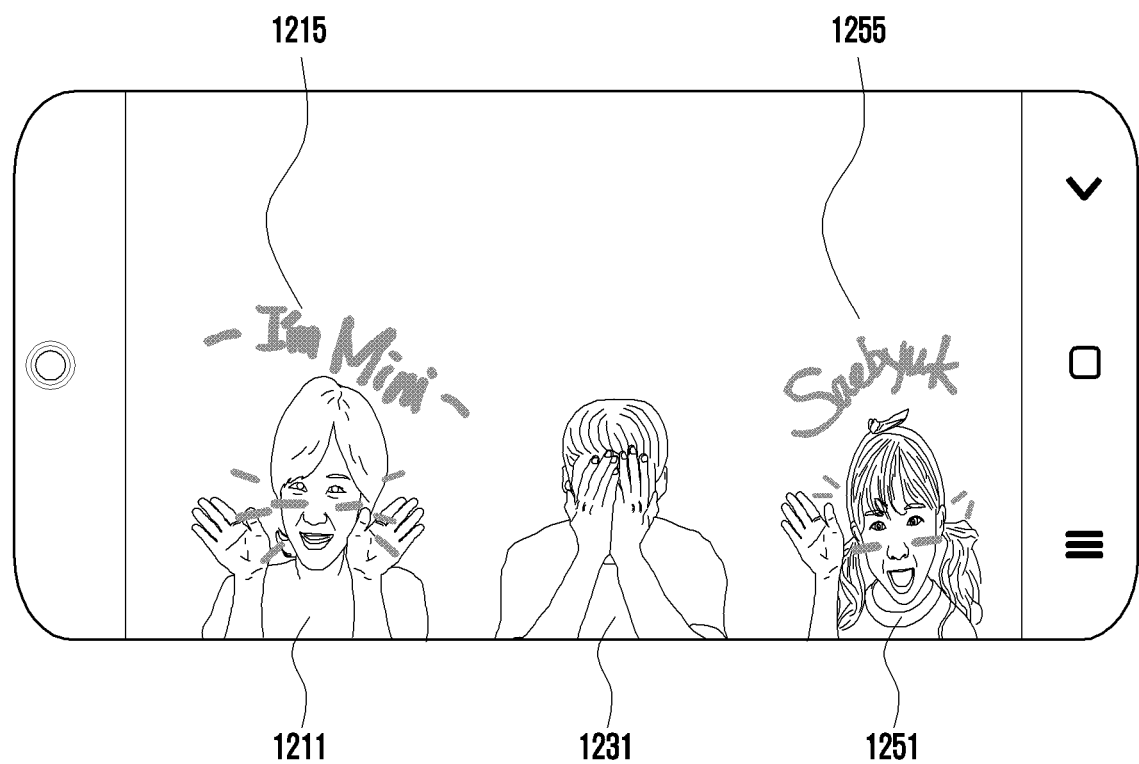

FIG. 12A is a diagram illustrating an example of controlling a display of a graphic element according to whether to identify a person in an electronic device according to an embodiment of the disclosure, FIG. 12B is a diagram illustrating an example of controlling a display of a graphic element according to whether to identify a person in an electronic device according to an embodiment of the disclosure, FIG. 12C is a diagram illustrating an example of controlling a display of a graphic element according to whether to identify a person in an electronic device according to an embodiment of the disclosure, and FIG. 12D is a diagram illustrating an example of controlling a display of a graphic element according to whether to identify a person in an electronic device according to an embodiment of the disclosure.

FIG. 12A is a diagram illustrating an example of displaying a graphic element to correspond to an object in an electronic device according to an embodiment of the disclosure.

Referring to FIG. 12A, when a graphic element is generated by drawing, the processor 120 may display a first user interface 1210 on the display device 160. The first user interface 1210 may include a first graphic element 1215 corresponding to a first object 1211, a second graphic element 1235 corresponding to a second object 1231, or a third graphic element 1255 corresponding to a third object 1251. The first graphic element 1215 may be generated when a user inputs a drawing for the first object 1211. The second graphic element 1235 may be generated when a user inputs a drawing for the second object 1231. The third graphic element 1255 may be generated when a user inputs a drawing for the third object 1251. The processor 120 may generate first relationship information of the first graphic element 1215 by mapping the feature point of the first object 1211 and coordinate information of the user's drawing. The processor 120 may generate second relationship information of the second graphic element 1235 by mapping the feature point of the second object 1231 and coordinate information of the user's drawing. The processor 120 may generate third relationship information of the third graphic element 1255 by mapping the feature point of the third object 1251 and coordinate information of the user's drawing.

The processor 120 may display the first graphic element 1215 corresponding to the first object 1211 based on the first relationship information, the second graphic element 1235 corresponding to the second object 1231 based on the second relationship information, and the third graphic element 1255 corresponding to the third object 1251 based on the third relationship information. The first graphic element 1215 to the third graphic element 1255 may be different.

FIG. 12B is a diagram illustrating an example of displaying a graphic element by tracking an object in an electronic device according to an embodiment of the disclosure.

Referring to FIG. 12B, after displaying the first user interface 1210, the processor 120 may track the object to display a second user interface 1230 on the display device 160. The second user interface 1230 may include a first graphic element 1215 corresponding to the first object 1211. Since the display of the first graphic element 1215 is controlled based on the feature point of the first object 1211, when the first object 1211 is changed in the preview image, the first graphic element 1215 may be changed and displayed together. The processor 120 may control the display of the first graphic element 1215 to the third graphic element

1255 according to a change in at least one of a presence or an absence, a size, an angle (or a posture), or a location of the first object 1211 to the third object 1251.

In the second user interface 1230, the second object 1231 and the third object 1251 cover the faces of the second object 1231 and the third object 1251, so that the processor 120 may not recognize the faces of the second object 1231 and the third object 1251. In the second user interface 1230, the processor 120 may not recognize the second object 1231 and the third object 1251, and may recognize only the first object 1211. In this case, the processor 120 may not display the second graphic element 1235 corresponding to the second object 1231 and the third graphic element 1255 corresponding to the third object 1251, and may display the first graphic element 1215 corresponding to the first object 1211. The processor 120 may change the first graphic element 1215 based on a change (e.g., a location, an angle, or a size) in the first object 1211.

FIG. 12C is a diagram illustrating another example of displaying a graphic element by tracking an object in an electronic device according to an embodiment of the disclosure.

Referring to FIG. 12C, after displaying the first user interface 1210, the processor 120 may track the object to display a third user interface 1250 on the display device 160. The third user interface 1250 may include a second graphic element 1235 corresponding to the second object 1231. Since the display of the second graphic element 1235 is controlled based on the feature point of the second object 1231, when the second object 1231 is changed in the preview image, the second graphic element 1235 may be changed and displayed together. The processor 120 may control the display of the first graphic element 1215 to the third graphic element 1255 according to a change in at least one of a presence or an absence, a size, an angle (or a posture), or a location of the first object 1211 to the third object 1251.

In the third user interface 1250, the first object 1211 and the third object 1251 cover the faces of the first object 1211 and the third object 1251, so that the processor 120 may not recognize the faces of the first object 1211 and the third object 1251. In the third user interface 1250, the processor 120 may not recognize the first object 1211 and the third object 1251, and may recognize only the second object 1231. In this case, the processor 120 may not display the first graphic element 1215 corresponding to the first object 1211 and the third graphic element 1255 corresponding to the third object 1251, and may display the second graphic element 1235 corresponding to the second object 1231. The processor 120 may change the second graphic element 1235 based on a change (e.g., location, angle, or size) in the second object 1231.

FIG. 12D is a diagram illustrating another example of displaying a graphic element by tracking an object in an electronic device according to an embodiment of the disclosure.

Referring to FIG. 12D, after displaying the first user interface 1210, the processor 120 may track the object to display a fourth user interface 1270 on the display device 160. The fourth user interface 1270 may include a first graphic element 1215 corresponding to the first object 1211 and a third graphic element 1255 corresponding to the third object 1251. Since the display of the first graphic element 1215 or the third graphic element 1255 is controlled based on the feature point of the first object 1211 or the third object 1251, when the first object 1211 or the third object 1251 is changed in the preview image, the first graphic element 1215 or the third graphic element 1255 may be changed and displayed together. The processor 120 may control the display of the first graphic element 1215 to the third graphic element 1255 according to a change in at least one of the presence or absence, size, angle (or posture), or location of the first object 1211 to the third object 1251.

In the fourth user interface 1270, the second object 1231 covers the face of the second object 1231, so that the processor 120 may not recognize the face of the second object 1231. In the fourth user interface 1270, the processor 120 may not recognize the second object 1231, and may recognize only the first object 1211 and the third object 1251. In this case, the processor 120 may display the first graphic element 1215 corresponding to the first object 1211 and the third graphic element 1255 corresponding to the third object 1251, and may not display the second graphic element 1235 corresponding to the second object 1231. The processor 120 may change the first graphic element 1215 and the third graphic element 1255 based on changes (e.g., location, angle, or size) in the first object 1211 and the third object 1251.

According to various embodiments, the processor 120 may take a video while the first user interface 1210 to the fourth user interface 1270 are displayed based on a user input. For example, the processor 120 may sequentially or non-sequentially photograph the first user interface 1210, the second user interface 1230, the third user interface 1250, and the fourth user interface 1270 to generate a single video. Alternatively, the processor 120 may take a video while at least one of the first user interface 1210 to the fourth user interface 1270 is displayed.

Figure 13A:
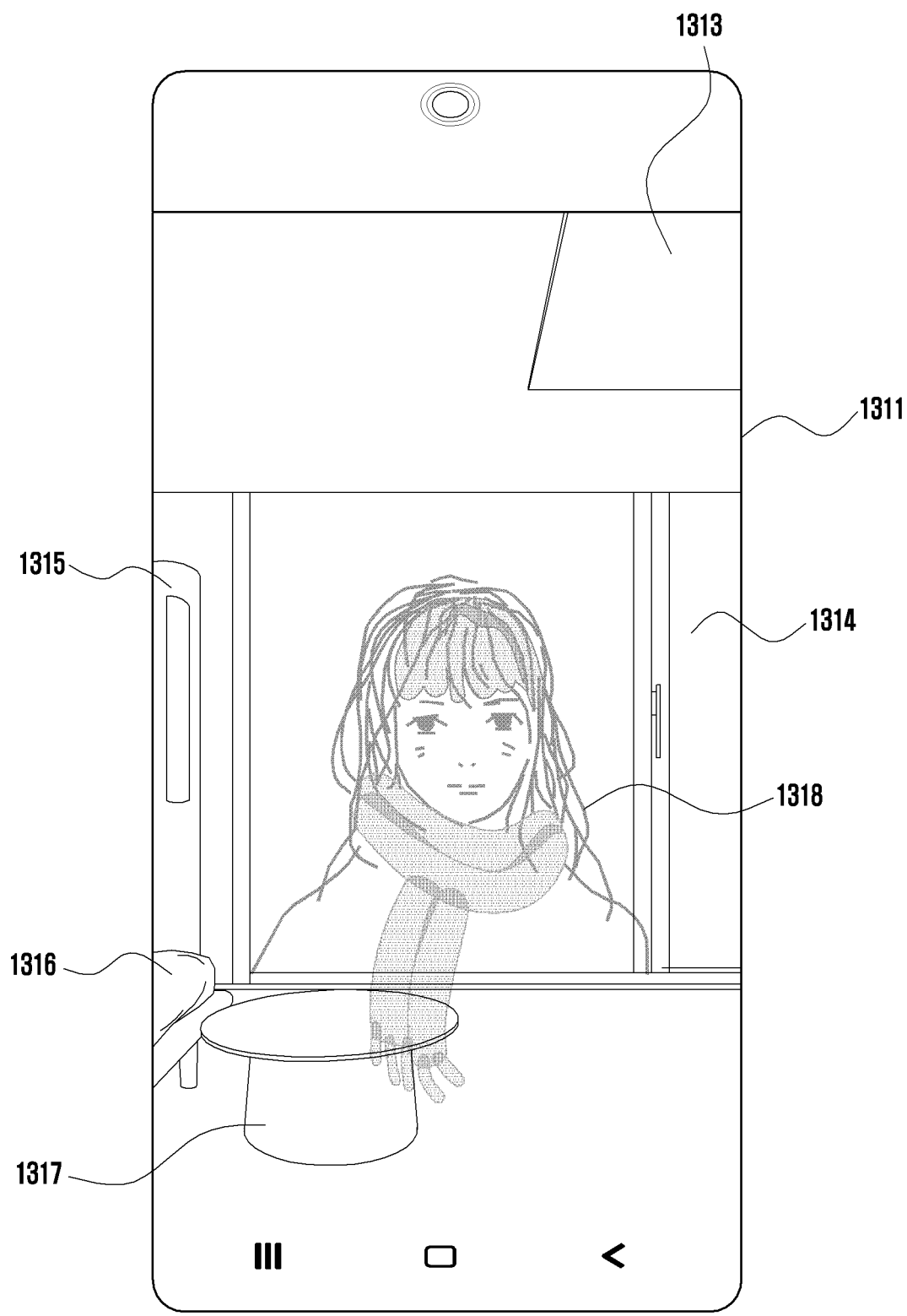
FIGS. 13A, 13B, 13C and 13D are diagrams illustrating an example of controlling a display of a graphic element by tracking a change in an electronic device according to various embodiments of the disclosure.
Figure 13B:
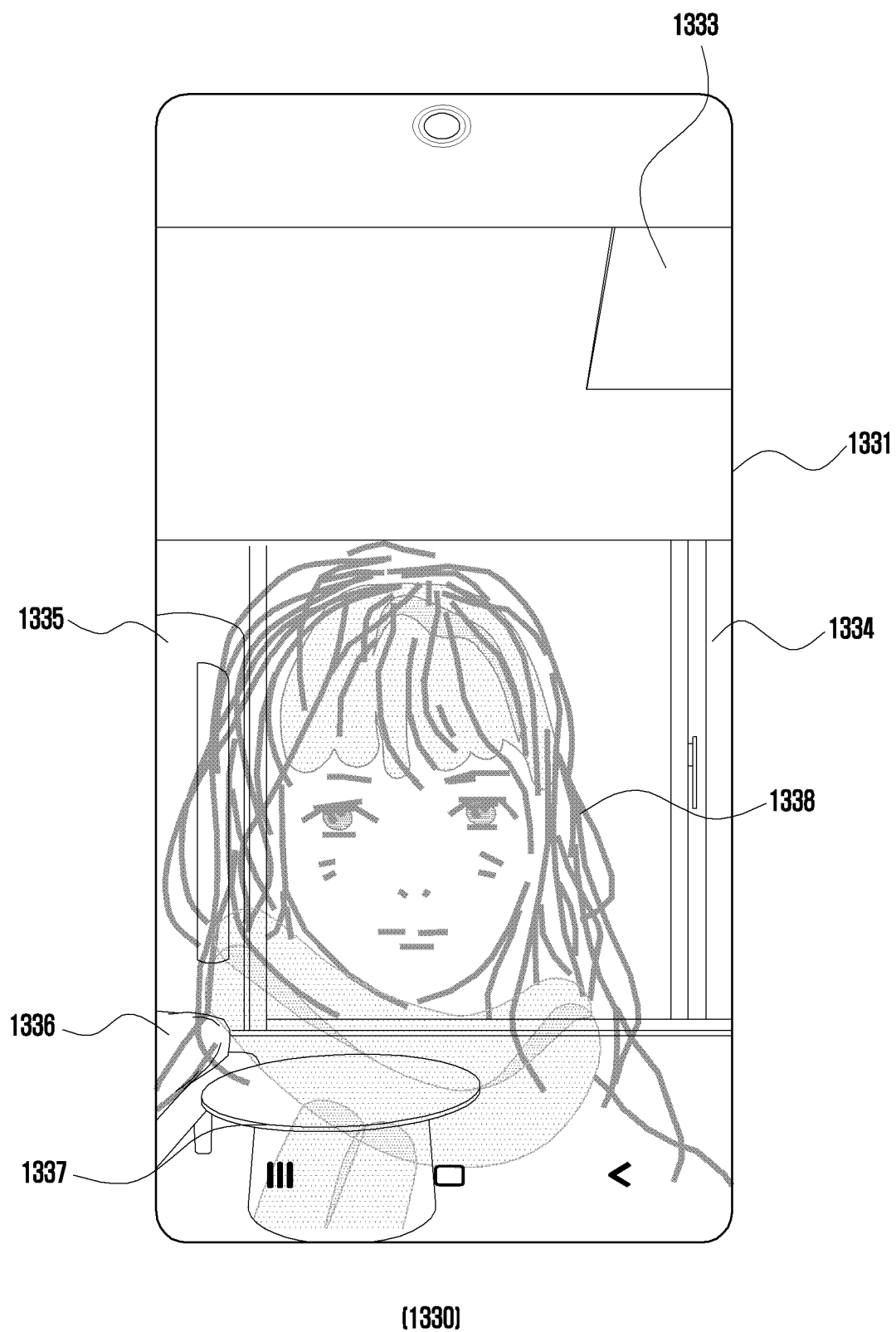
Figure 13C:
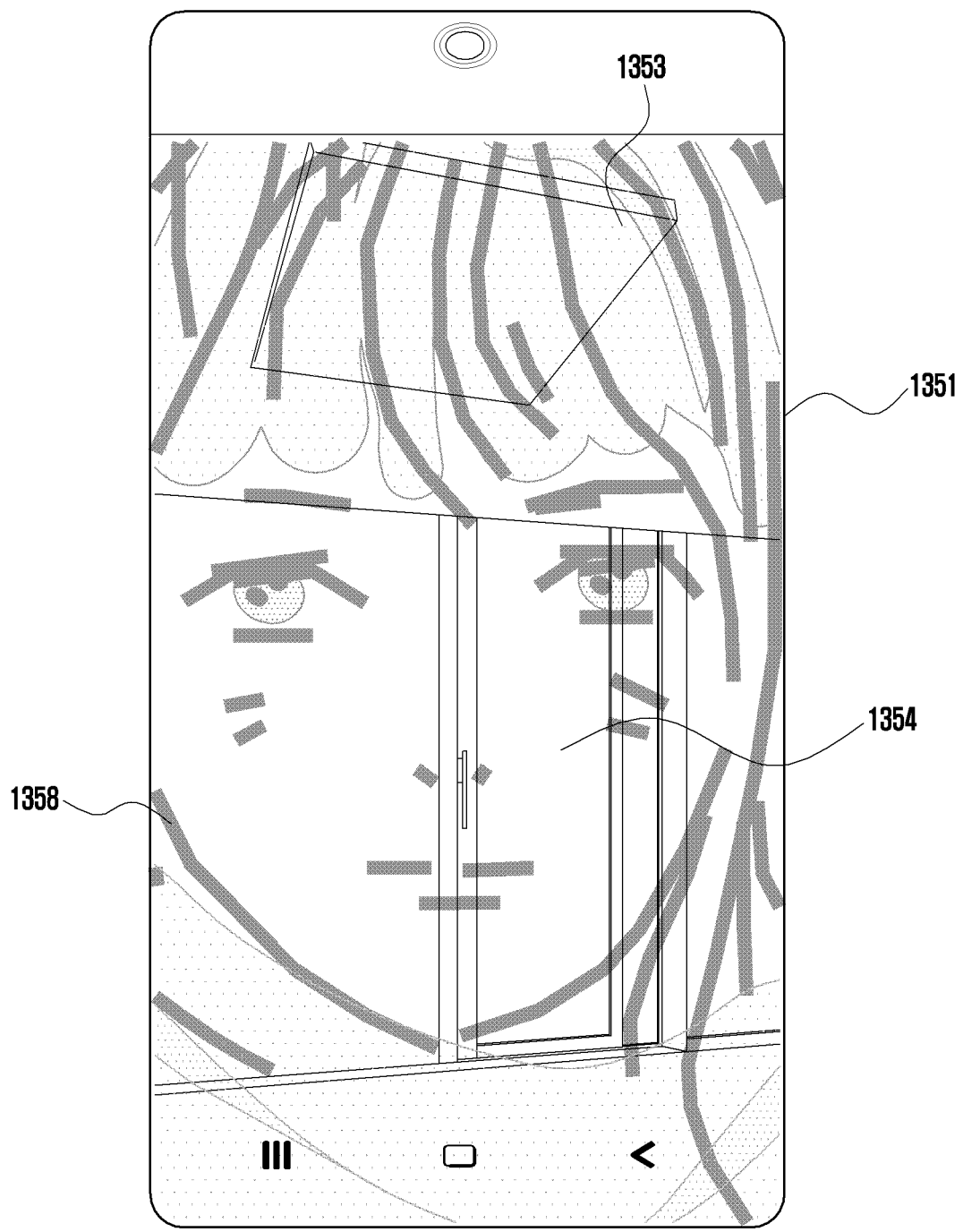
Figure 13D:
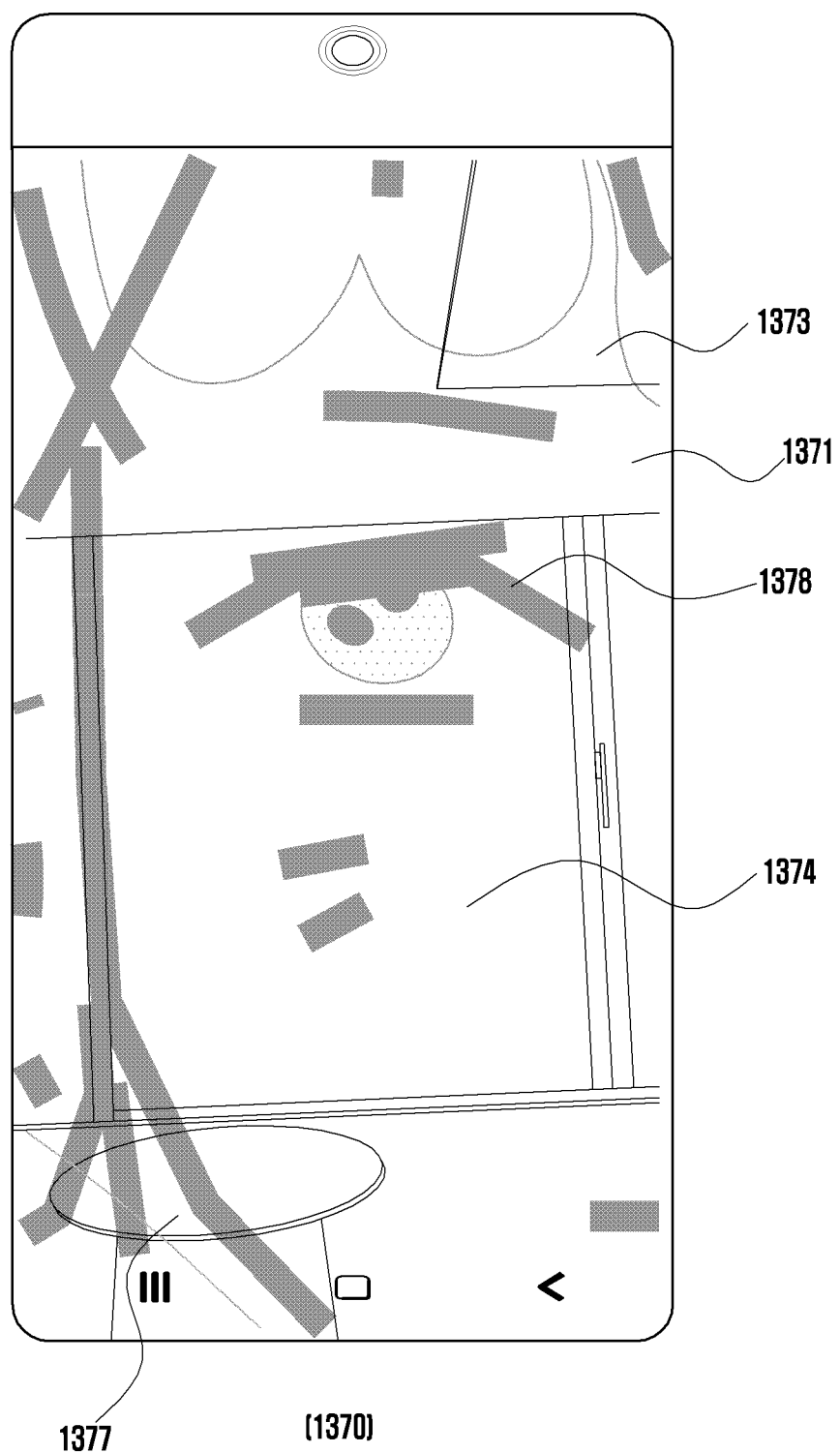

FIG. 13A is a diagram illustrating an example of controlling a display of a graphic element by tracking a change in an electronic device according to an embodiment of the disclosure, FIG. 13B is a diagram illustrating an example of controlling a display of a graphic element by tracking a change in an electronic device according to an embodiment of the disclosure, FIG. 13C is a diagram illustrating an example of controlling a display of a graphic element by tracking a change in an electronic device according to an embodiment of the disclosure, and FIG. 13D is a diagram illustrating an example of controlling a display of a graphic element by tracking a change in an electronic device according to an embodiment of the disclosure.

FIG. 13A is a diagram illustrating an example of displaying a graphic element to correspond to an object in an electronic device according to an embodiment of the disclosure.

Referring to FIG. 13A, when a graphic element by drawing is generated, the processor 120 may display a first user interface 1310 on the display device 160. The first user interface 1310 may include a first preview image 1311 and a first graphic element 1318. When the attribute of an object is configured to a 'thing', the processor 120 may recognize the thing from the first preview image 1311 obtained from the camera module 180. The processor 120 may recognize a stand lighting 1313, a window 1314, an air conditioner 1315, a chair 1316, and a table 1317 as things. The processor 120 may identify a spatial coordinate value at the time when the drawing is detected while the first preview image 1311 is displayed, and may display the first graphic element 1318 at a point at which the drawing is detected. In FIG. 13A, although the first graphic element 1318 is described as one, it is also possible to recognize each point, face, or line as one graphic element without releasing a pen after touching the pen. The first graphic element 1318 illustrates an example in which a plurality of graphic elements are combined and completed as a single picture.

The processor 120 may acquire location information or posture information of the electronic device 101 as a spatial coordinate value. The location information of the electronic device 101 may include at least one of latitude, longitude, or altitude. The posture information of the electronic device 101 may include sensing information detected by a sensor module (e.g., the sensor module 176 of FIG. 1). The processor 120 may store the spatial coordinate value of the first graphic element 1318 identified by the detected drawing in a memory (e.g., the memory 130 of FIG. 1). The processor 120 may store the first graphic element 1318 together with the spatial coordinate value.

FIG. 13B is a diagram illustrating an example of displaying a graphic element by tracking changes in an electronic device according to an embodiment of the disclosure.

Referring to FIG. 13B, after displaying the first user interface 1310, the processor 120 may track a change in the electronic device 101 and may display a second user interface 1330 on the display device 160. The second user interface 1330 may include a second preview image 1331 and a second graphic element 1338. The second preview image 1331 is different from the first preview image 1311. For example, it can be seen that the location, a shape, or a size of the thing (e.g., the stand lighting 1313, the window 1314, the air conditioner 1315, the chair 1316, or the table 1317) included in the first preview image 1311 are different from the location, shape, or size of the thing (e.g., a stand lighting 1333, a window 1334, an air conditioner 1335, a chair 1336, or a table 1337) included in the second preview image 1331.

The processor 120 may track a change in the electronic device 101 when acquiring the second preview image 1331, and may display the second graphic element 1338 based on the spatial coordinate value of the first graphic element 1318 stored in the memory 130. Since the location information or posture information of the electronic device 101 in the first user interface 1310 is different from the location information or posture information of the electronic device 101 in the second user interface 1330, the first graphic element 1318 and the second graphic element 1338 may be displayed differently. The second graphic element 1338 may be displayed closer than the first graphic element 1318, so that it can be seen that some pictures are not visible.

FIG. 13C is a diagram illustrating another example of displaying a graphic element by tracking changes in an electronic device according to an embodiment of the disclosure.

Referring to FIG. 13C, after displaying the first user interface 1310 or the second user interface 1330, the processor 120 may track a change in the electronic device 101 to display a third user interface 1350 on the display device 160. The third user interface 1350 may include a third preview image 1351 and a third graphic element 1358. The third preview image 1351 may be different from the first preview image 1311 or the second preview image 1331. For example, it can be seen that some of the things (e.g., the stand lighting 1313, the window 1314, the air conditioner 1315, the chair 1316, or the table 1317) included in the first preview image 1311 or the second preview image 1331 are not included in the third preview image 1351. The third preview image 1351 may include only the stand lighting 1353 and the window 1354.

The processor 120 may track a change in the electronic device 101 when acquiring the third preview image 1351, and may display the third graphic element 1358 based on the spatial coordinate value of the first graphic element 1318 stored in the memory 130. Since the location information or posture information of the electronic device 101 in the first user interface 1310 or the second user interface 1330 is different from the location information or posture information of the electronic device 101 in the third user interface 1350, the third graphic element 1358 may be displayed different from the first graphic element 1318 or the second graphic element 1338. The third graphic element 1358 may be displayed closer than the first graphic element 1318 or the second graphic element 1338, so that it can be seen that some pictures (e.g., shawl, upper body, and hair) are not visible.

FIG. 13D is a diagram illustrating another example of displaying a graphic element by tracking a change in an electronic device according to an embodiment of the disclosure.

Referring to FIG. 13D, after displaying at least one of the first user interface 1310 to the third user interface 1350, the processor 120 may track a change in the electronic device 101 to display a fourth user interface 1370 on the display device 160. The fourth user interface 1370 may include a fourth preview image 1371 and a fourth graphic element 1378. The fourth preview image 1371 may be different from the first preview image 1311 to the third preview image 1351. For example, it can be seen that some of the things (e.g., the stand lighting 1313, the window 1314, the air conditioner 1315, the chair 1316, or the table 1317) included in the first preview image 1311 to the third preview image 1351 are not included in the fourth preview image 1371. The fourth preview image 1371 may include only a stand lighting 1373, a window 1374, and a table 1377.

The processor 120 may track a change in the electronic device 101 when acquiring the fourth preview image 1371, and may display the fourth graphic element 1378 based on the spatial coordinate value of the first graphic element 1318 stored in the memory 130. Since the location information or posture information of the electronic device 101 in any one of the first user interface 1310 to the third user interface 1350 is different from the location information or posture information of the electronic device 101 in the fourth user interface 1370, the fourth graphic element 1378 may be displayed differently from the first graphic element 1318 to the third graphic element 1358. The fourth graphic element 1378 may be displayed closer than the first graphic element 1318 to the third graphic element 1358, so that it can be seen that some pictures (e.g., part of the face, hair, and upper body) are not visible.

According to various embodiments, the processor 120 may take a video from a time point at which the first user interface 1310 is displayed. The processor 120 may take a video while the first user interface 1310 to the fourth user interface 1370 are displayed based on a user input. In the video, the first user interface 1310 to the fourth user interface 1370 may be variably or sequentially included. Alternatively, the processor 120 may take a video while at least one of the first user interface 1310 to the fourth user interface 1370 is displayed.

Figure 14A:
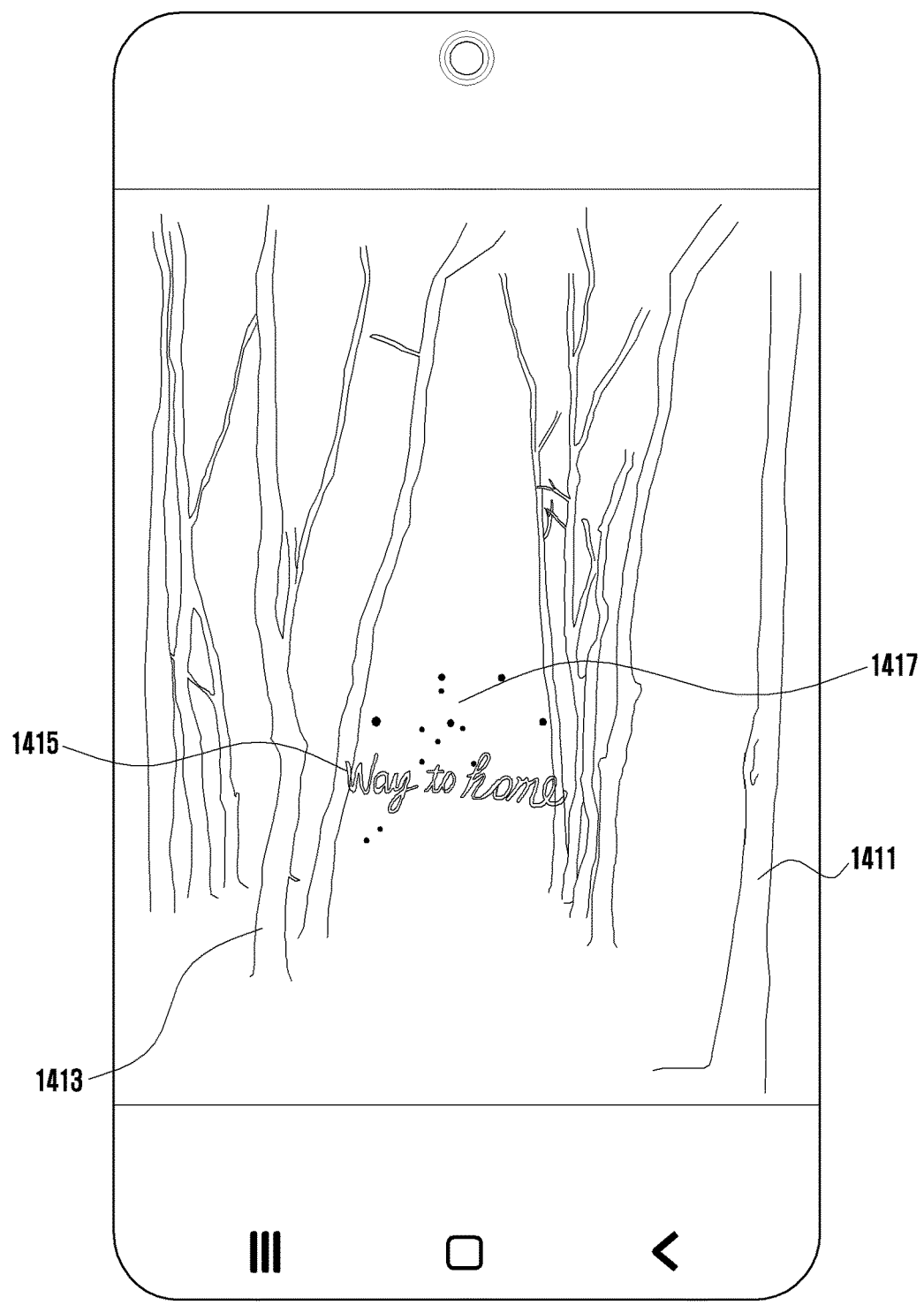
FIGS. 14A, 14B and 14C are diagrams illustrating an example of a display of a graphic element by tracking a change in an electronic device according to various embodiments of the disclosure.
Figure 14B:
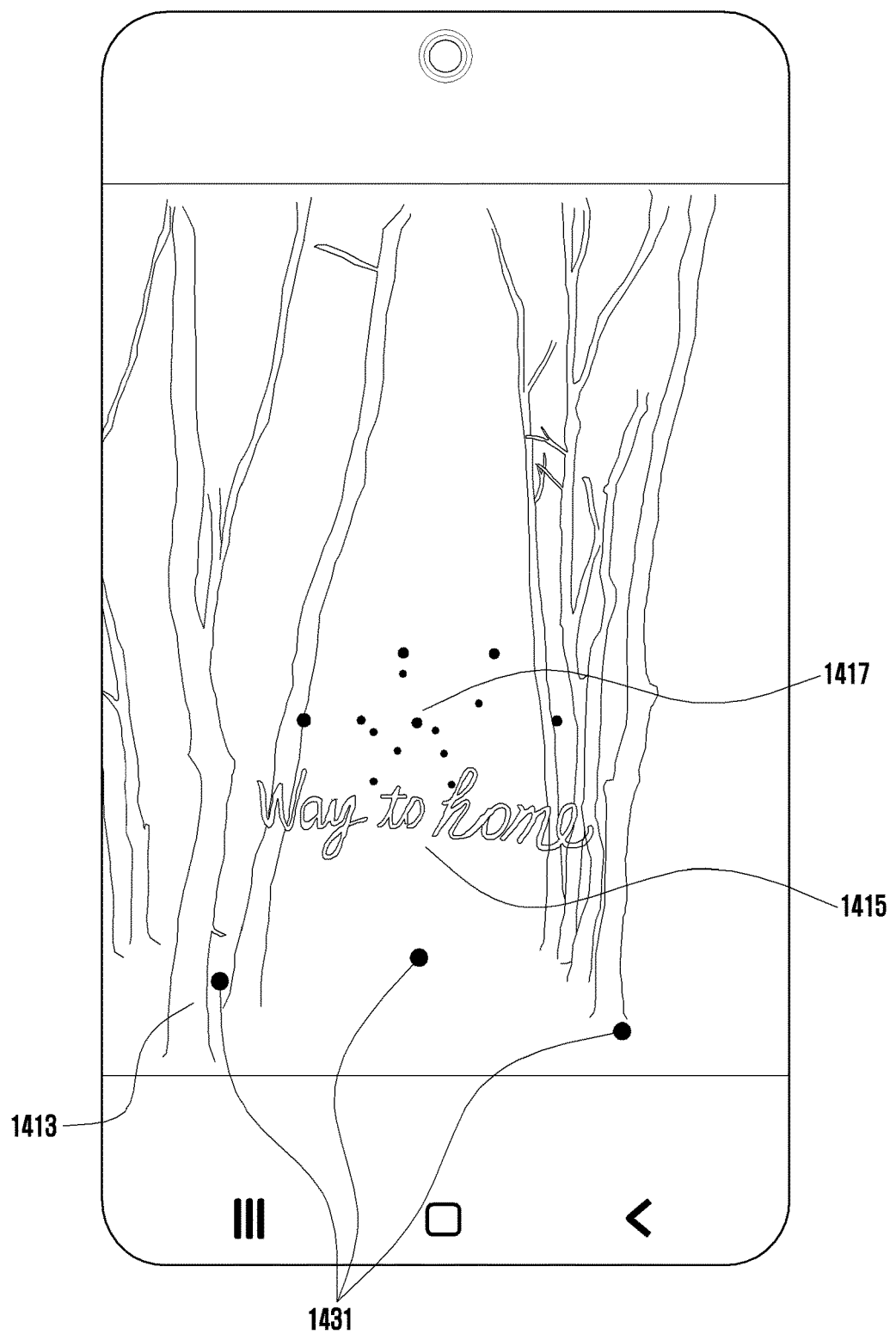
Figure 14C:
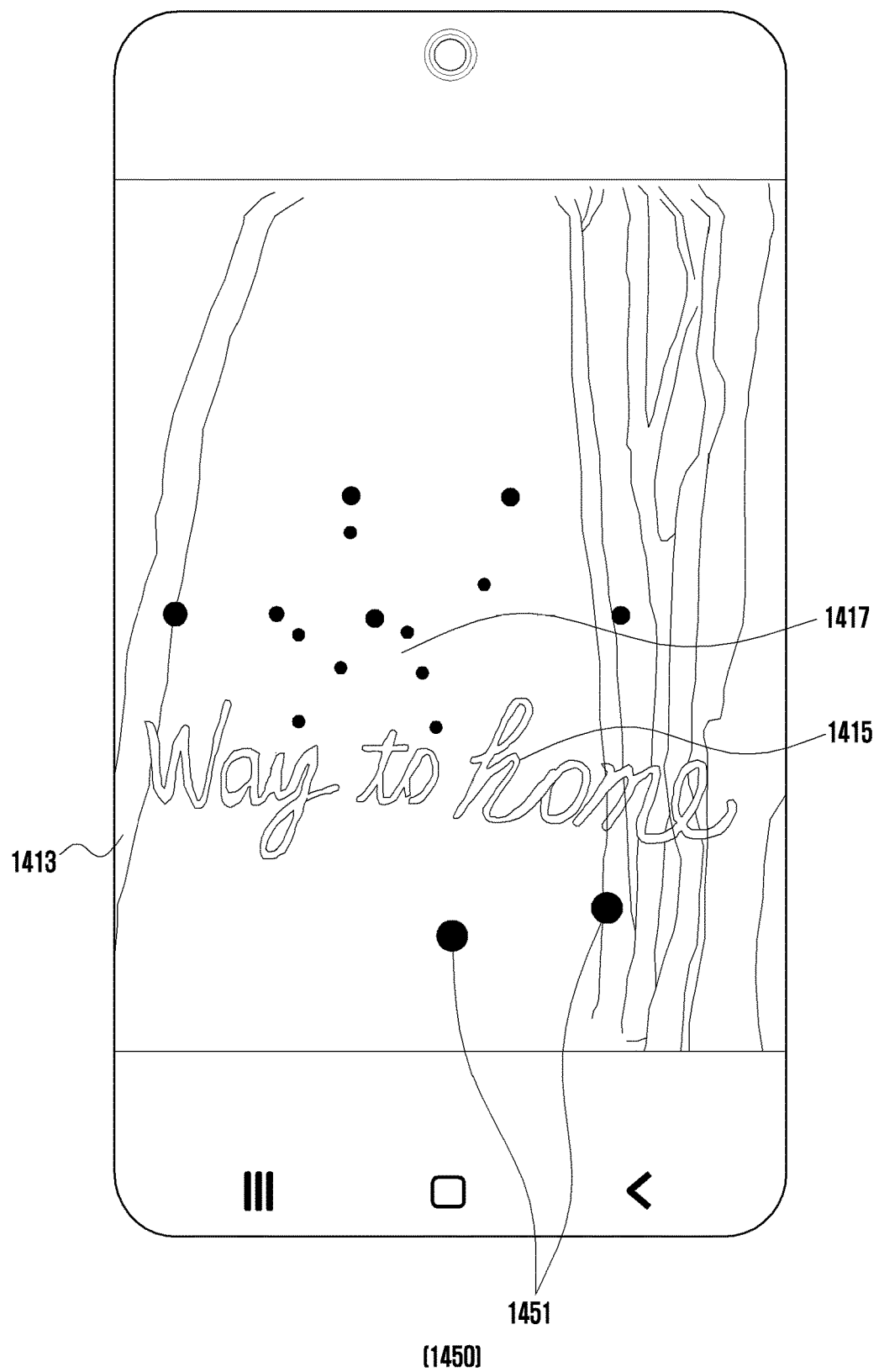

FIG. 14A is a diagram illustrating an example of controlling a display of a graphic element by tracking a change in an electronic device according to an embodiment of the disclosure, FIG. 14B is a diagram illustrating an example of controlling a display of a graphic element by tracking a change in an electronic device according to an embodiment of the disclosure, and FIG. 14C is a diagram illustrating an example of controlling a display of a graphic element by tracking a change in an electronic device according to an embodiment of the disclosure.

FIG. 14A is a diagram illustrating an example of displaying a graphic element by tracking a change in an electronic device in an electronic device according to an embodiment of the disclosure.

Referring to FIG. 14A, when a graphic element by drawing is generated, the processor 120 may display a first user interface 1410 on the display device 160. The first user interface 1410 may include a first graphic element 1415 and a second graphic element 1417. The first graphic element 1415 may be a handwriting-like text, and the second graphic element 1417 may be a figure such as a dot or circle. When the attribute of an object is configured to a 'thing', the processor 120 may recognize the object from the preview image obtained from the camera module 180. The processor 120 may recognize trees (e.g., 1411 and 1413) as things. The processor 120 may detect a drawing at a location farther than the display on the first user interface 1410 at an arbitrary time point before the first user interface 1410 is displayed, and may generate a first graphic element 1415 and a second graphic element 1417 by the detected drawing. For example, a user may input a drawing while moving (e.g., front/back and left/right) a location (e.g., the location of the electronic device 101). The processor 120 may identify the spatial coordinate value at the time point at which the drawing is detected, and may store the identified spatial coordinate value in a memory (e.g., the memory 130 of FIG. 1). The processor 120 may store the first graphic element 1415 and the second graphic element 1417 together with the spatial coordinate value. The processor 120 may display the first user interface 1410 based on at least one of the spatial coordinate value of the graphic element stored in the memory 130, the location information of the electronic device 101, and the posture information thereof.

According to various embodiments, since the user inputs the drawing while moving the location, some graphic elements may not be displayed in the first user interface 1410. Since the image obtained from the camera module 180 of the electronic device 101 has a narrower angle of view than the user's eye or a shorter distance to be photographed, some graphic elements may not be visible in the current location of the electronic device 101.

FIG. 14B is a diagram illustrating another example of displaying a graphic element by tracking a change in an electronic device according to an embodiment of the disclosure.

Referring to FIG. 14B, when a graphic element by drawing is generated, the processor 120 may display a second user interface 1430 on the display device 160. The second user interface 1430 may include a first graphic element 1415, a second graphic element 1417, and a third graphic element 1431. The processor 120 may display the second user interface 1430 based on at least one of the spatial coordinate value of the graphic element stored in the memory 130, location information of the electronic device 101, and posture information thereof. The first graphic element 1415 and the second graphic element 1417 included in the first user interface 1410 may be largely displayed on the second user interface 1430 according to the location movement of the electronic device 101. In addition, some graphic elements not included in the first user interface 1410 (e.g., a portion of the second graphic element 1417 or the third graphic element 1431) may be displayed in the second user interface 1430. Since the location information or posture information of the electronic device 101 in the first user interface 1410 is different from the location information or posture information of the electronic device 101 in the second user interface 1430, the displayed graphic elements may be different. For example, as to the tree 1411 seen in the first user interface 1410, only the tree 1413 may be visible and the tree 1411 may not be visible in the second user interface 1430.

FIG. 14C is a diagram illustrating another example of displaying a graphic element by tracking a change in an electronic device according to an embodiment of the disclosure.

Referring to FIG. 14C, when a graphic element by drawing is generated, the processor 120 may display a third user interface 1450 on the display device 160. The third user interface 1450 may include a first graphic element 1415, a second graphic element 1417, and a fourth graphic element 1451. The processor 120 may display the third user interface 1450 based on at least one of the spatial coordinate value of the graphic element stored in the memory 130, the location information of the electronic device 101, and the posture information thereof. The first graphic element 1415 and the second graphic element 1417 included in the first user interface 1410 or the second user interface 1430 may be largely displayed in the third user interface 1450 according to the location movement of the electronic device 101. The third graphic element 1431 included in the second user interface 1430 may not be displayed in the third user interface 1450.

Since the electronic device 101 has moved while passing the spatial coordinate value of the third graphic element 1431, the third graphic element 1431 may not be displayed at the current location of the electronic device 101. Since the graphic element is displayed based on the spatial coordinate value, when the electronic device 101 generates a graphic element (e.g., the third graphic element 1431) with a distance to the front/back or left/right, the graphic element may not be displayed when the electronic device 101 passes the spatial coordinate value. In addition, a fourth graphic element 1451 not included in the first user interface 1410 or the second user interface 1430 may be displayed in the third user interface 1450. Since the location information or posture information of the electronic device 101 in the first user interface 1410 is different from the location information or posture information of the electronic device 101 in the second user interface 1430, the graphic elements to be displayed may be different.

According to various embodiments, an object may be recognized from a preview image to add a graphic element by drawing to the object, and the object may be tracked in real time from the preview image, thereby variably displaying the graphic element corresponding to the object.

According to various embodiments, a user may directly input a drawing for each object identified from a preview image, and a graphic element by the input drawing may be applied differently for each object, thereby improving user satisfaction.

According to various embodiments, when an object is identifiable from a preview image, a graphic element may be displayed. When the object is not identifiable, the graphic element may be removed without displaying the graphic element, thereby controlling the display of the graphic element according to whether the object is identified.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera module;
a display;
a memory; and
a processor configured to be operatively connected to the camera module, the display, and the memory,
wherein the processor is further configured to:
display a preview image obtained from the camera module on the display,
recognize an object from the preview image,
detect a drawing input based on the object on the displayed preview image,
generate a graphic element by the detected drawing input,
display the graphic element to correspond to the object by tracking the object on the displayed preview image,
track a change in the object from the preview image obtained in real time while the drawing input is detected or the graphic element is displayed,
track a presence or an absence, a size, an angle, or a location of the object when an attribute of the object is a person, and
track a change in the electronic device when the attribute of the object is a thing.

2. The electronic device of claim 1,
wherein the object comprises at least one of the person or the thing, and
wherein the processor is further configured to:
recognize the person as the object when the camera module is driven by a front camera, and
recognize the person or the thing as the object when the camera module is driven by a rear camera.

3. The electronic device of claim 1, wherein the processor is further configured to display a visual cue guiding that the drawing is possible, on the display based on the recognized object.

4. The electronic device of claim 1, wherein the processor is further configured to display the drawable region on the display when the attribute of the object is the person.

5. The electronic device of claim 1, wherein the processor is further configured to:
acquire coordinate information in which the drawing input is detected, based on a feature point of the object when the attribute of the object is the person, and
generate relationship information by mapping the feature point of the object and the coordinate information of the drawing input.

6. The electronic device of claim 5, wherein the processor is further configured to temporarily store the generated relationship information in the memory in association with graphic information.

7. The electronic device of claim 5, wherein the processor is further configured to display the graphic element on the object based on the relationship information.

8. The electronic device of claim 1, wherein the processor is further configured to:
acquire location information or posture information of the electronic device at a time point at which the drawing input is detected as a spatial coordinate value when the attribute of the object is the thing, and
temporarily store the spatial coordinate value in the memory in association with graphic information.

9. The electronic device of claim 8, wherein the processor is further configured to display the graphic element on the display based on the spatial coordinate value.

10. The electronic device of claim 1, wherein the processor is further configured to vary and display at least one of a size, an angle, or a location of the graphic element in proportion to at least one of the size, the angle, or the location of the object included in the preview image obtained in real time from the camera module.

11. The electronic device of claim 1, wherein the processor is further configured to remove the graphic element for the object when the object is not identified in the preview image obtained in real time from the camera module.

12. The electronic device of claim 1, wherein the processor is further configured to:
display a first graphic element corresponding to a first object and a second graphic element corresponding to a second object in a first preview image,
recognize the first object and the second object from a second preview image obtained after the first preview image, and
remove the first graphic element corresponding to the first object when the first object is not recognized in the second preview image and display the second graphic element corresponding to the second object.

13. A method of operating an electronic device, the method comprising:
displaying a preview image obtained from a camera module of the electronic device on a display of the electronic device;
recognizing an object from the preview image;
detecting a drawing input based on the object;
generating a graphic element by the detected drawing input; and
displaying the graphic element to correspond to the object by tracking the object on the displayed preview image; and
tracking a change in the object from the preview image obtained in real time while the drawing input is detected or the graphic element is displayed,
wherein the tracking the change in the object comprises:
tracking a presence or an absence, a size, an angle, or a location of the object when an attribute of the object is a person, and
tracking a change in the electronic device when the attribute of the object is a thing.

14. The method of claim 13, further comprising:
displaying a visual cue guiding that the drawing is possible, on the display based on the recognized object.

15. The method of claim 13, further comprising:
displaying a drawable region on the display when the attribute of the object is the person.

16. The method of claim 13, wherein the displaying of the graphic element comprises:
acquiring coordinate information in which the drawing input is detected, based on a feature point of the object when the attribute of the object is the person;
generating relationship information by mapping the feature point of the object and the coordinate information of the drawing input; and
displaying the graphic element on the object based on the relationship information.

17. The method of claim 13, wherein the displaying of the graphic element comprises:
acquiring location information or posture information of the electronic device as a spatial coordinate value at a time point at which the drawing input is detected when the attribute of the object is the thing; and
displaying the graphic element on the display based on the spatial coordinate value.

18. The method of claim 13, further comprising:
tracking a change in the object from a preview image obtained in real time while the drawing input is detected or the graphic element is displayed; and
controlling a display of the graphic element based on the tracked change in the object.

\* \* \* \* \*